(12) United States Patent
Hsu et al.

(10) Patent No.: US 11,262,545 B2
(45) Date of Patent: Mar. 1, 2022

(54) IMAGING LENS ASSEMBLY, IMAGE CAPTURING UNIT AND ELECTRONIC DEVICE

(71) Applicant: LARGAN PRECISION CO., LTD., Taichung (TW)

(72) Inventors: Po-Lun Hsu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 327 days.

(21) Appl. No.: 16/565,272

(22) Filed: Sep. 9, 2019

(65) Prior Publication Data

US 2021/0018725 A1 Jan. 21, 2021

(30) Foreign Application Priority Data

Jul. 19, 2019 (TW) ................................. 108125535

(51) Int. Cl.
| | | |
|---|---|---|
| G02B 13/18 | (2006.01) | |
| G02B 9/62 | (2006.01) | |
| G02B 13/00 | (2006.01) | |
| H04N 5/225 | (2006.01) | |
| H04N 5/247 | (2006.01) | |
| G03B 17/17 | (2021.01) | |

(52) U.S. Cl.
CPC ........... G02B 13/0045 (2013.01); G02B 9/62 (2013.01); G02B 13/0065 (2013.01); G03B 17/17 (2013.01); H04N 5/2254 (2013.01); H04N 5/247 (2013.01)

(58) Field of Classification Search
CPC .. G02B 13/0045; G02B 9/62; G02B 13/0065; G03B 17/17; H04N 5/2254; H04N 5/247
USPC .................................. 359/713, 752, 756, 757
See application file for complete search history.

(56) References Cited

U.S. PATENT DOCUMENTS

| | | | |
|---|---|---|---|
| 4,634,235 | A | 1/1987 | Fujioka |
| 2015/0247989 | A1 | 9/2015 | Sakai |
| 2016/0077332 | A1* | 3/2016 | Baba ........................ G02B 9/62 |
| | | | 359/757 |
| 2017/0146775 | A1 | 5/2017 | Jung |
| 2017/0146776 | A1 | 5/2017 | Kang et al. |

FOREIGN PATENT DOCUMENTS

| | | |
|---|---|---|
| JP | 1982-186728 A | 11/1982 |
| JP | 1983-033211 A | 2/1983 |
| JP | 1984-083121 A | 5/1984 |
| JP | H01-129217 A | 5/1989 |
| WO | 2020/259607 A1 | 12/2020 |

* cited by examiner

Primary Examiner — William Choi
(74) Attorney, Agent, or Firm — Maschoff Brennan

(57) ABSTRACT

An imaging lens assembly includes a total of six lens elements. The six lens elements are, in order from an object side to an image side: a first lens element, a second lens element, a third lens element, a fourth lens element, a fifth lens element and a sixth lens element. The first lens element with positive refractive power has an object-side surface being convex in a paraxial region thereof.

40 Claims, 34 Drawing Sheets

IMAGING LENS ASSEMBLY, IMAGE CAPTURING UNIT AND ELECTRONIC DEVICE

RELATED APPLICATIONS

This application claims priority to Taiwan Application 108125535, filed on Jul. 19, 2019, which is incorporated by reference herein in its entirety.

BACKGROUND

Technical Field

The present disclosure relates to an imaging lens assembly, an image capturing unit and an electronic device, more particularly to an imaging lens assembly and an image capturing unit applicable to an electronic device.

Description of Related Art

For various applications, high quality optical systems have been applied to different kinds of electronic devices, such as vehicle devices, image recognition systems, entertainment devices, sport devices and intelligent home assistance systems. In order to provide wider applications, electronic devices equipped with one or more optical systems have become the mainstream product in the market, and the optical systems are developed with various optical characteristics according to different requirements.

In recent years, there is an increasing demand for electronic devices featuring compact size, and thus conventional optical systems, especially the optical systems featuring a large aperture or telephoto, are difficult to be applied to the electronic devices with high-end specification and compact size. The shortcomings of the conventional telephoto optical system are overly long total track length, low image quality and too large size. Therefore, there is a need to develop a telephoto optical system featuring compact size and high image quality with a configuration of a reduced size in a specific direction or capability of changing the direction of the optical axis.

SUMMARY

According to one aspect of the present disclosure, an imaging lens assembly includes a total of six lens elements. The six lens elements are, in order from an object side to an image side, a first lens element, a second lens element, a third lens element, a fourth lens element, a fifth lens element and a sixth lens element.

The first lens element with positive refractive power has an object-side surface being convex in a paraxial region thereof.

When an axial distance between the object-side surface of the first lens element and an image-side surface of the sixth lens element is Td, an axial distance between the image-side surface of the sixth lens element and an image surface is BL, a focal length of the first lens element is f1, a focal length of the fifth lens element is f5, a focal length of the sixth lens element is f6, a sum of central thicknesses of all lens elements of the imaging lens assembly is ΣCT, a central thickness of the first lens element is CT1, an axial distance between the third lens element and the fourth lens element is T34, an axial distance between the fourth lens element and the fifth lens element is T45, and an axial distance between the fifth lens element and the sixth lens element is T56, the following conditions are satisfied:

$0.50 < Td/BL < 1.40$;

$|f1/f5| + |f1/f6| < 1.40$;

$1.0 < \Sigma CT/CT1 < 2.90$; and $0.60 < (T34+T56)/T45 < 10$.

According to another aspect of the present disclosure, an imaging lens assembly includes a total of six lens elements. The six lens elements are, in order from an object side to an image side, a first lens element, a second lens element, a third lens element, a fourth lens element, a fifth lens element and a sixth lens element.

The first lens element with positive refractive power has an object-side surface being convex in a paraxial region thereof. The third lens element has positive refractive power. There is at least one inflection point among the fourth lens element, the fifth lens element and the sixth lens element.

When an axial distance between the object-side surface of the first lens element and an image-side surface of the sixth lens element is Td, an axial distance between the image-side surface of the sixth lens element and an image surface is BL, a focal length of the first lens element is f1, a focal length of the fifth lens element is f5, a focal length of the sixth lens element is f6, a sum of central thicknesses of all lens elements of the imaging lens assembly is ΣCT, and a central thickness of the first lens element is CT1, the following conditions are satisfied:

$0.50 < Td/BL < 1.40$;

$|f1/f5| + |f1/f6| < 1.35$; and $1.0 < \Sigma CT/CT1 < 2.90$.

According to another aspect of the present disclosure, an image capturing unit includes one of the aforementioned imaging lens assemblies and an image sensor, wherein the image sensor is disposed on the image surface of the imaging lens assembly.

According to another aspect of the present disclosure, an electronic device includes at least three image capturing units which face in the same direction and include the aforementioned image capturing unit. Maximum fields of view of the at least three image capturing units are different from one another, and a largest value and a smallest value of the maximum fields of view of the at least three image capturing units differ by at least 50 degrees.

BRIEF DESCRIPTION OF THE DRAWINGS

The disclosure can be better understood by reading the following detailed description of the embodiments, with reference made to the accompanying drawings as follows.

DETAILED DESCRIPTION

An imaging lens assembly includes a total of six lens elements. The six lens elements are, in order from an object side to an image side, a first lens element, a second lens element, a third lens element, a fourth lens element, a fifth lens element and a sixth lens element.

The first lens element has positive refractive power. Therefore, it is favorable for effectively miniaturizing the imaging lens assembly. The first lens element has an object-side surface being convex in a paraxial region thereof. Therefore, it is favorable for light from each field of view evenly entering the imaging lens assembly.

The second lens element can have negative refractive power, the second lens element can have an object-side surface being convex in a paraxial region thereof, and the second lens element can have an image-side surface being concave in a paraxial region thereof. Therefore, it is favorable for providing good image quality when in combination with the first lens element featuring positive refractive power. Moreover, the object-side surface of the second lens element can be convex in a paraxial region thereof and can have at least one concave critical point in an off-axis region thereof. Therefore, it is favorable for correcting aberrations in the peripheral region of an image surface of the imaging lens assembly, and it is also favorable for improving the overall image quality. Please refer to FIG. 37, which shows a schematic view of the concave critical point C of the object-side surface 721 of the second lens element 720 according to the 7th embodiment of the present disclosure.

The third lens element can have positive refractive power. Therefore, it is favorable for balancing the positive refractive power distribution of the imaging lens assembly so as to reduce aberrations caused by any single lens element thereof.

According to the present disclosure, at least one lens element can be made of glass material. Therefore, it is favorable for effectively reducing the sensitivity of the imaging lens assembly to the external environment, and it is also favorable for improving the stability of the imaging lens assembly in various environments. Moreover, the third lens element can be made of glass material. Moreover, the fourth lens element can be made of glass material.

According to the present disclosure, at least one lens surface of at least one lens element can be spherical. Therefore, it is favorable for reducing stray light generated from sources like surface reflections, and it is also favorable for further reducing defocusing caused by environmental factors.

Figure 19:
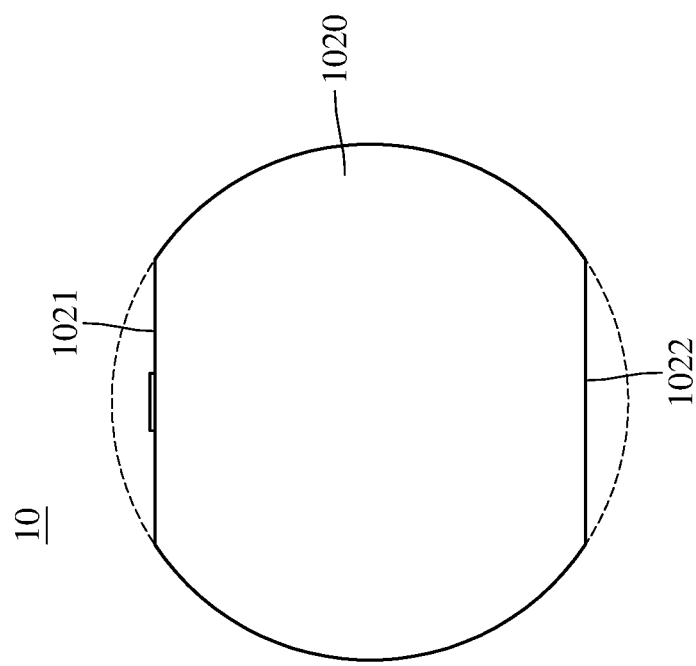
FIG. 19 is a schematic view of a second lens element of an image capturing unit according to the 10th embodiment of the present disclosure.
Figure 21:
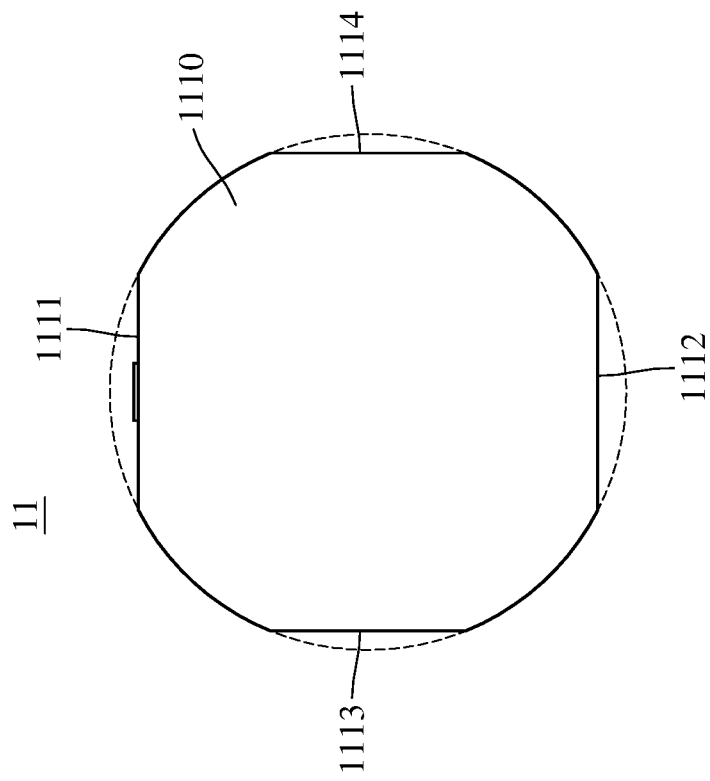
FIG. 21 is a schematic view of a first lens element of an image capturing unit according to the 11th embodiment of the present disclosure.

According to the present disclosure, at least one lens element can have at least two trimmed edges at an outer diameter position thereof. Therefore, it is favorable for reducing one axial dimension of any single lens element so as to further miniaturizing the imaging lens assembly. Moreover, at least one lens element can also have at least four trimmed edges at the outer diameter position thereof. Moreover, each of at least two lens elements can also have at least two trimmed edges at the outer diameter position thereof. Please refer to FIG. 19 and FIG. 21, FIG. 19 shows a schematic view of the two trimmed edges 1021 and 1022 at the outer diameter position of the second lens element 1020 according to the 10th embodiment of the present disclosure, and FIG. 21 shows a schematic view of the four trimmed edges 1111, 1112, 1113 and 1114 at the outer diameter position of the first lens element 1110 according to the 11th embodiment of the present disclosure.

Figure 33:
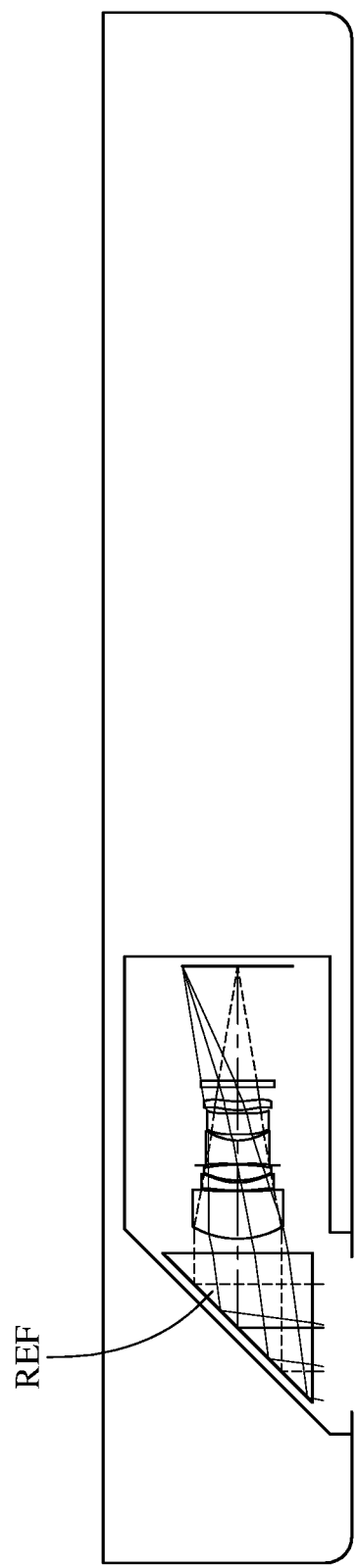
FIG. 33 shows a schematic view of a configuration of a reflector and the imaging lens assembly according to the 9th embodiment of the present disclosure in an electronic device.
Figure 34:
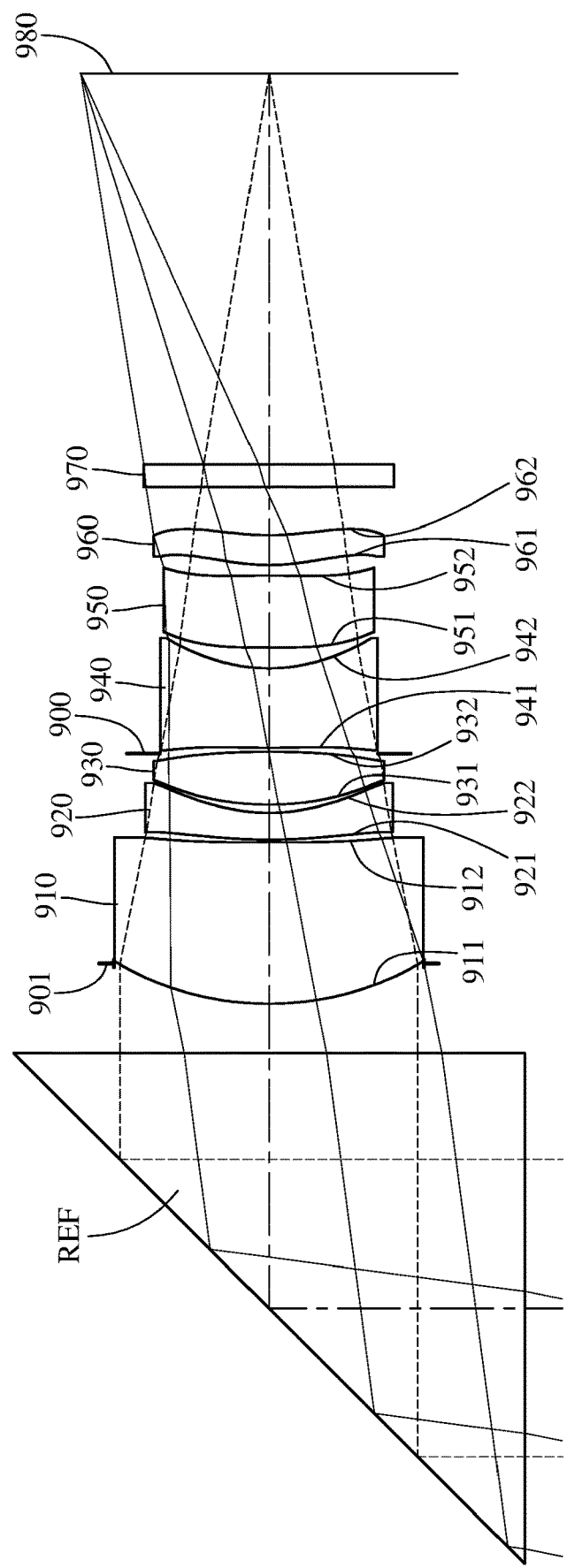
FIG. 34 shows a schematic view of an enlarged configuration of the reflector and the imaging lens assembly in FIG. 33.
Figure 35:
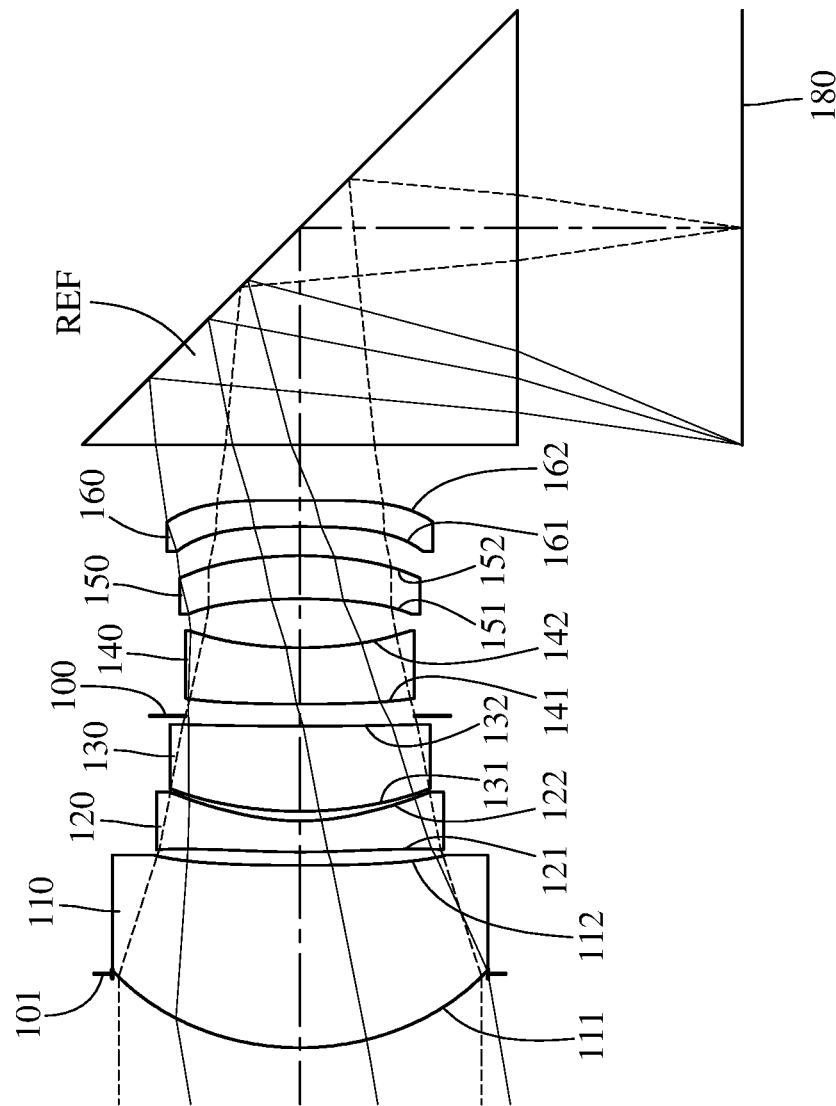
FIG. 35 shows a schematic view of a configuration of a reflector and the imaging lens assembly according to the 1st embodiment of the present disclosure in an image capturing unit.
Figure 36:
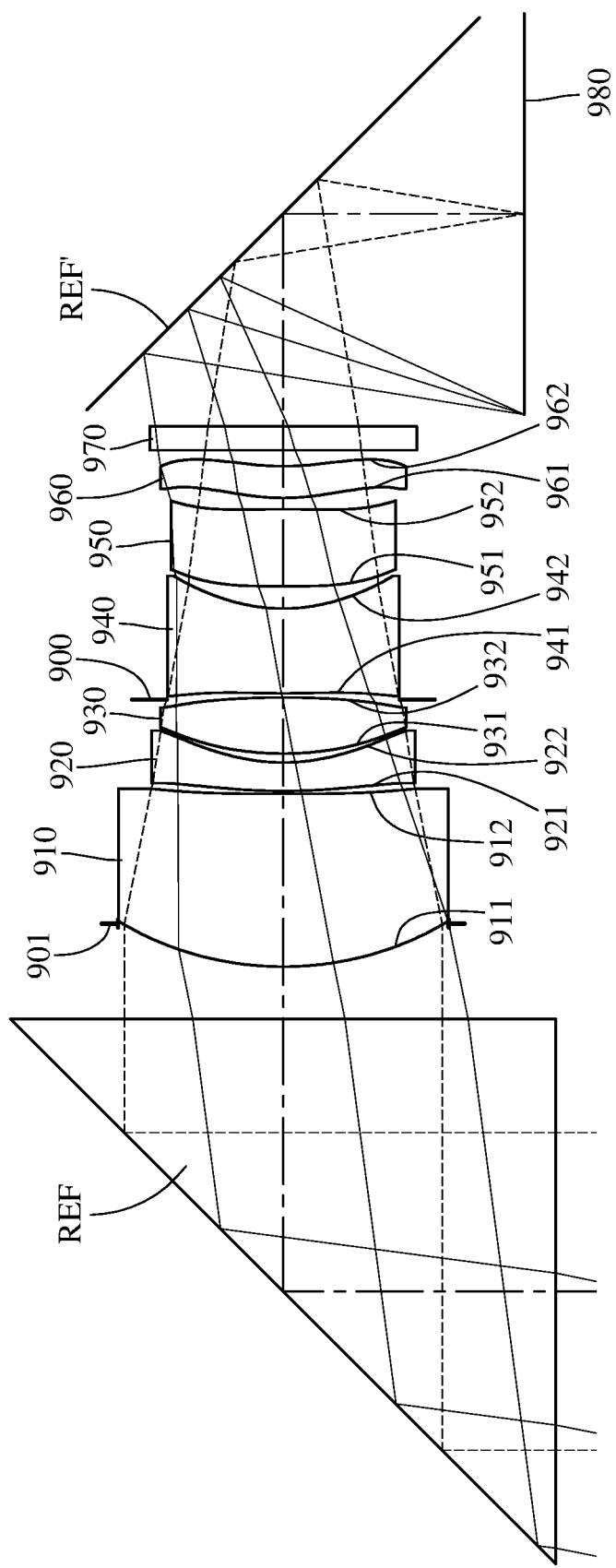
FIG. 36 shows a schematic view of another configuration of reflectors and the imaging lens assembly according to the 9th embodiment of the present disclosure in an image capturing unit.

According to the present disclosure, the imaging lens assembly can further include a reflector. The reflector is, for example, a reflective mirror or a prism. Therefore, it is favorable for changing the direction of the optical axis so as to provide a sufficient total track length of the imaging lens assembly with a better telephoto configuration, thereby achieving miniaturization of the imaging lens assembly. Moreover, the reflector can be disposed on the object side of the first lens element (or on the object side of the object-side surface of the first lens element). Please refer to FIG. 33 and FIG. 34, FIG. 33 shows a schematic view of a configuration of a reflector and the imaging lens assembly according to the 9th embodiment of the present disclosure in an electronic device, and FIG. 34 shows a schematic view of a configuration of the reflector and the imaging lens assembly in FIG. 33. The reflector is a prism REF disposed in an electronic device (not numbered) and located on the object side of the object-side surface 911 of the first lens element 910. In other words, the prism REF is disposed in the electronic device and is located between an imaged object (not shown) and the imaging lens assembly (not numbered) according to the 9th embodiment of the present disclosure, but the present disclosure is not limited to the type, number and arrangement of the reflector disclosed in FIG. 33 and FIG. 34. Please refer to FIG. 35, which shows a schematic view of a configuration of a reflector and the imaging lens assembly according to the 1st embodiment of the present disclosure in an image capturing unit. The reflector is a prism REF disposed between the sixth lens element 160 and the image surface 180 according to the 1st embodiment of the present disclosure. Please refer to FIG. 36, which shows a schematic view of another configuration of reflectors and the imaging lens assembly according to the 9th embodiment of the present disclosure in an image capturing unit. The reflectors are a prism REF and a reflective mirror REF' which are respectively disposed on the object side of the object-side surface 911 of the first lens element 910 and between the IR-cut filter 970 and the image surface 980. In other words, the prism REF is disposed between an imaged object (not shown) and the imaging lens assembly (not numbered), and the reflective mirror REF' is disposed between the IR-cut filter 970 and the image surface 980. As seen from FIG. 34 through FIG. 36, the prism REF or the reflective REF' is favorable for changing the direction of incident light rays such that the dimensions of the electronic device is not dictated by the total track length.

Figure 37:
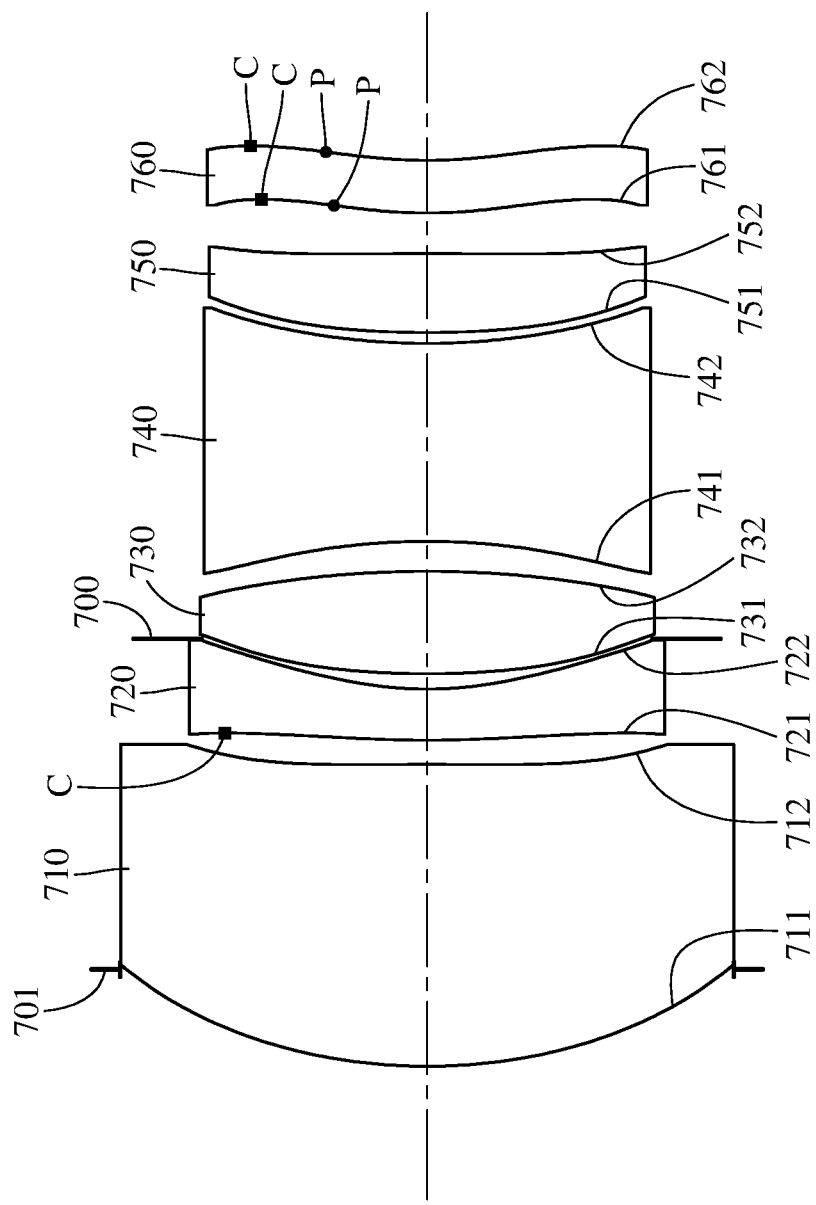
FIG. 37 shows a schematic view of several inflection points and critical points according to the 7th embodiment of the present disclosure.

There can be at least one inflection point among the fourth lens element, the fifth lens element and the sixth lens element. Specifically, there can be at least one inflection point among an object-side surface of the fourth lens element, an image-side surface of the fourth lens element, an object-side surface of the fifth lens element, an image-side surface of the fifth lens element, an object-side surface of the sixth lens element and an image-side surface of the sixth lens element. Therefore, it is favorable for correcting aberrations in the peripheral region of the image surface and for ensuring good image quality. Please refer to FIG. 37, which shows a schematic view of the inflection points P of the object-side surface 761 of the sixth lens element 760 and the image-side surface 762 of the sixth lens element 760 according to the 7th embodiment of the present disclosure. The inflection points on the object-side surface and the image-side surface of the sixth lens element in FIG. 37 are only exemplary. There may also be one or more inflection points among the other lens surfaces of the six lens elements.

There can be at least one critical point in an off-axis region among the fourth lens element, the fifth lens element and the sixth lens element. Specifically, there can be at least one critical point in an off-axis region among the object-side surface of the fourth lens element, the image-side surface of the fourth lens element, the object-side surface of the fifth lens element, the image-side surface of the fifth lens element, the object-side surface of the sixth lens element and the image-side surface of the sixth lens element. Therefore, it is favorable for increasing the shape variation of the lens elements in the off-axis region thereof so as to miniaturize the imaging lens assembly and improve image quality. Please refer to FIG. 37, which shows a schematic view of the critical points C of the object-side surface 761 and the image-side surface 762 of the sixth lens element 760 according to the 7th embodiment of the present disclosure. The critical points on the object-side surface and the image-side surface of the sixth lens element in FIG. 37 are only exemplary. There may also be one or more critical points in an off-axis region among the other lens surfaces of the six lens elements.

When an axial distance between the object-side surface of the first lens element and the image-side surface of the sixth lens element is Td, and an axial distance between the image-side surface of the sixth lens element and the image surface is BL, the following condition is satisfied: $0.50<Td/BL<1.40$. Therefore, it is favorable for providing a better telephoto configuration. Moreover, the following condition can also be satisfied: $0.60<Td/BL<1.20$.

When a focal length of the first lens element is f1, a focal length of the fifth lens element is f5, and a focal length of the sixth lens element is f6, the following condition is satisfied: $|f1/f5|+|f1/f6|<1.40$. Therefore, it is favorable for ensuring sufficient refractive power of the first lens element and miniaturization of the imaging lens assembly. Moreover, the following condition can also be satisfied: $|f1/f5|+|f1/f6|<1.35$. Moreover, the following condition can also be satisfied: $|f1/f5|+|f1/f6|<1.0$.

When a sum of central thicknesses of all lens elements of the imaging lens assembly is ΣCT, and a central thickness of the first lens element is CT1, the following condition is satisfied: $1.0<\Sigma CT/CT1<2.90$. Therefore, it is favorable for ensuring a sufficient thickness and structural strength of the first lens element with the lens barrel having a small opening so as to obtain miniaturization and an improved telephoto. Moreover, the following condition can also be satisfied: $1.25<\Sigma CT/CT1<2.50$.

When an axial distance between the third lens element and the fourth lens element is T34, an axial distance between the fourth lens element and the fifth lens element is T45, and an axial distance between the fifth lens element and the sixth lens element is T56, the following condition can be satisfied: $0.60<(T34+T56)/T45<10$. Therefore, it is favorable for having sufficient axial distances thereof so as to obtain a better telephoto configuration.

When the central thickness of the first lens element is CT1, a central thickness of the second lens element is CT2, a central thickness of the third lens element is CT3, a central thickness of the fourth lens element is CT4, a central thickness of the fifth lens element is CT5, and a central thickness of the sixth lens element is CT6, the following conditions can be satisfied: $1.0<CT1/CT2$; $1.0<CT1/CT3$; $1.0<CT1/CT4$; $1.0<CT1/CT5$; and $1.0<CT1/CT6$. Therefore, it is favorable for ensuring a sufficient thickness and structural strength of the first lens element with the lens barrel having a small opening so as to obtain miniaturization and an improved telephoto. Moreover, the following conditions can also be satisfied: $1.50<CT1/CT2$; $1.50<CT1/CT3$; $1.50<CT1/CT4$; $1.50<CT1/CT5$; and $1.50<CT1/CT6$.

When an axial distance between an object-side surface of the third lens element and the image-side surface of the sixth lens element is Dr5r12, and the axial distance between the object-side surface of the first lens element and the image-side surface of the sixth lens element is Td, the following condition can be satisfied: $0.40<Dr5r12/Td<0.70$. Therefore, it is favorable for preventing excessively large or small axial distances between each of all adjacent lens elements of the imaging lens assembly so as to improve space utilization efficiency of the lens elements. Moreover, the following condition can also be satisfied: $0.50<Dr5r12/Td<0.60$.

When an axial distance between the object-side surface of the fourth lens element and the image-side surface of the sixth lens element is Dr7r12, and the axial distance between the object-side surface of the first lens element and the image-side surface of the sixth lens element is Td, the following condition can be satisfied: $0.30<Dr7r12/Td<0.60$. Therefore, it is favorable for arranging space on the image side of the imaging lens assembly so as to better miniaturize a telephoto configuration. Moreover, the following condition can also be satisfied: $0.40<Dr7r12/Td<0.60$.

When an axial distance between the object-side surface of the first lens element and the image surface is TL, and a focal length of the imaging lens assembly is f, the following condition can be satisfied: $0.60<TL/f\leq1.0$. Therefore, it is favorable for ensuring a better telephoto configuration.

When the axial distance between the image-side surface of the sixth lens element and the image surface is BL, and a sum of axial distances between each of all adjacent lens elements of the imaging lens assembly is ΣAT, the following condition can be satisfied: $3.0<BL/\Sigma AT$. Therefore, it is favorable for obtaining sufficient space on the image side of the imaging lens assembly so as to utilize a reflector and further miniaturize a better telephoto configuration.

When the focal length of the first lens element is f1, and a focal length of the fourth lens element is f4, the following condition can be satisfied: $|f1/f4|<1.35$. Therefore, it is favorable for ensuring sufficient refractive power of the first lens element so as to allow more light to enter the imaging lens assembly for further miniaturization thereof.

When an Abbe number of the second lens element is V2, and an Abbe number of the fifth lens element is V5, the following condition can be satisfied: $20<V2+V5<50$. Therefore, it is favorable for balancing corrections of chromatic aberration between the object side and the image side of the imaging lens assembly so as to provide better telephoto image quality.

When an f-number of the imaging lens assembly is Fno, the following condition can be satisfied: $2.0<Fno<4.50$. Therefore, it is favorable for having a large aperture configuration so as to increase the amount of incident light against the brightness decay caused by the reflector.

When a maximum value among refractive indices of all lens elements of the imaging lens assembly is Nmax, the following condition can be satisfied: $Nmax<1.75$. Therefore, it is favorable for balancing corrections of chromatic aberration and astigmatism while reducing the effective radius and surface diameter of each lens element so as to further miniaturize the imaging lens assembly. Moreover, the following condition can also be satisfied: $Nmax<1.72$. Moreover, the following condition can also be satisfied: $1.66<Nmax<1.72$.

When a minimum value among Abbe numbers of all lens elements of the imaging lens assembly is Vmin, the following condition can be satisfied: $Vmin<24$. Therefore, it is favorable for effectively correcting chromatic aberration so as to improve image quality. Moreover, the following condition can also be satisfied: $Vmin<21$. Moreover, the following condition can also be satisfied: $12<Vmin<21$.

Figure 38:
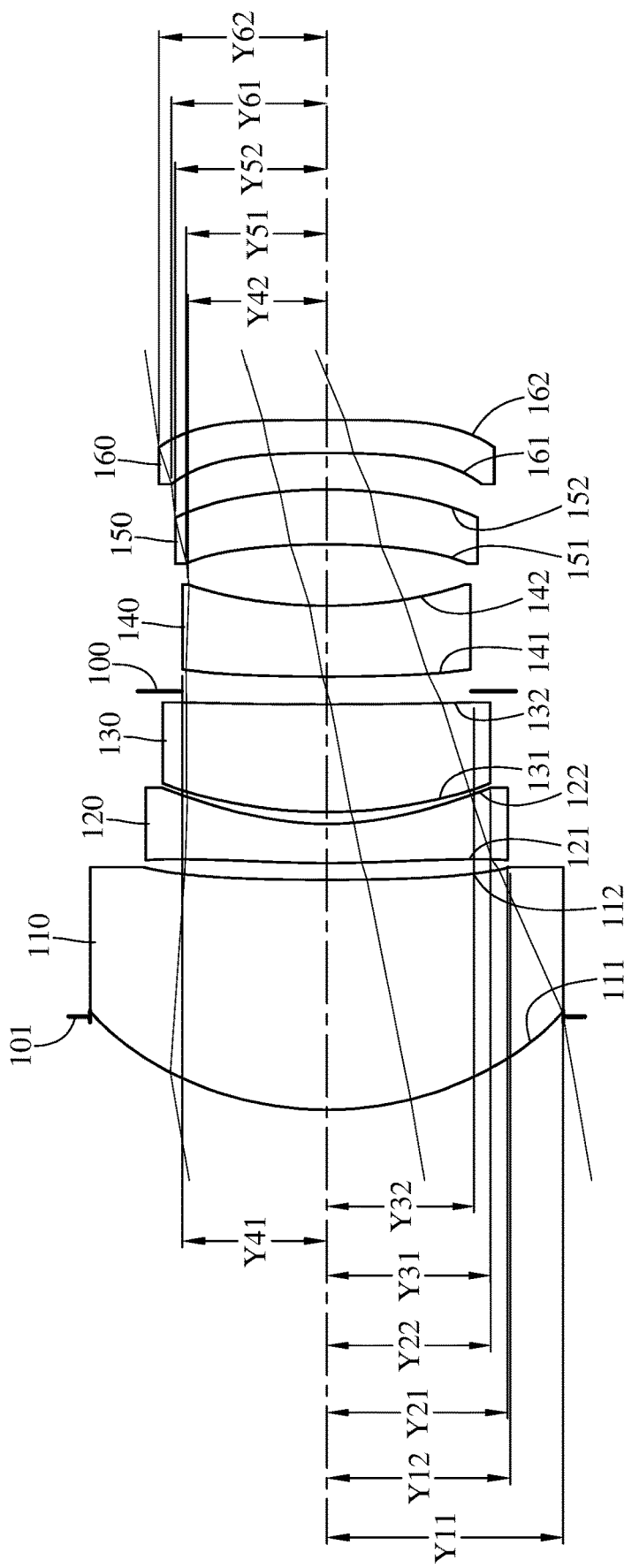
FIG. 38 shows a schematic view of Y11, Y12, Y21, Y22, Y31, Y32, Y41, Y42, Y51, Y52, Y61 and Y62 according to the 1st embodiment of the present disclosure.

When a maximum effective radius of the object-side surface of the first lens element is Y11, a maximum effective radius of an image-side surface of the first lens element is Y12, a maximum effective radius of the object-side surface of the second lens element is Y21, a maximum effective radius of the image-side surface of the second lens element is Y22, a maximum effective radius of the object-side surface of the third lens element is Y31, a maximum effective radius of an image-side surface of the third lens element is Y32, a maximum effective radius of the object-side surface of the fourth lens element is Y41, a maximum effective radius of the image-side surface of the fourth lens element is Y42, a maximum effective radius of the object-side surface of the fifth lens element is Y51, a maximum effective radius of the image-side surface of the fifth lens element is Y52, a maximum effective radius of the object-side surface of the sixth lens element is Y61, and a maximum effective radius of the image-side surface of the sixth lens element is Y62, the following conditions can be satisfied: $1.0<Y11/Y12$; $1.0<Y11/Y21$; $1.0<Y11/Y22$; $1.0<Y11/Y31$; $1.0<Y11/Y32$; $1.0<Y11/Y41$; $1.0<Y11/Y42$; $1.0<Y11/Y51$; $1.0<Y11/Y52$; $1.0<Y11/Y61$; and $1.0<Y11/Y62$. Therefore, it is favorable for utilizing a large aperture configuration to increase the amount of incident light so as to compensate brightness decay caused by a reflector. Please refer to FIG. 38, which shows a schematic view of Y11, Y12, Y21, Y22, Y31, Y32, Y41, Y42, Y51, Y52, Y61 and Y62 according to the 1st embodiment of the present disclosure.

When the focal length of the imaging lens assembly is f, the focal length of the first lens element is f1, a focal length of the second lens element is f2, a focal length of the third lens element is f3, the focal length of the fourth lens element is f4, the focal length of the fifth lens element is f5, and the focal length of the sixth lens element is f6, the following condition can be satisfied: $8.0<|f/f1|+|f/f2|+|f/f3|+|f/f4|+|f/f5|+|f/f6|$. Therefore, it is favorable for ensuring sufficient refractive power so as to miniaturize the imaging lens assembly. Moreover, the following condition can also be satisfied: $9.0<|f/f1|+|f/f2|+|f/f3|+|f/f4|+|f/f5|+|f/f6|<15$.

Figure 20:
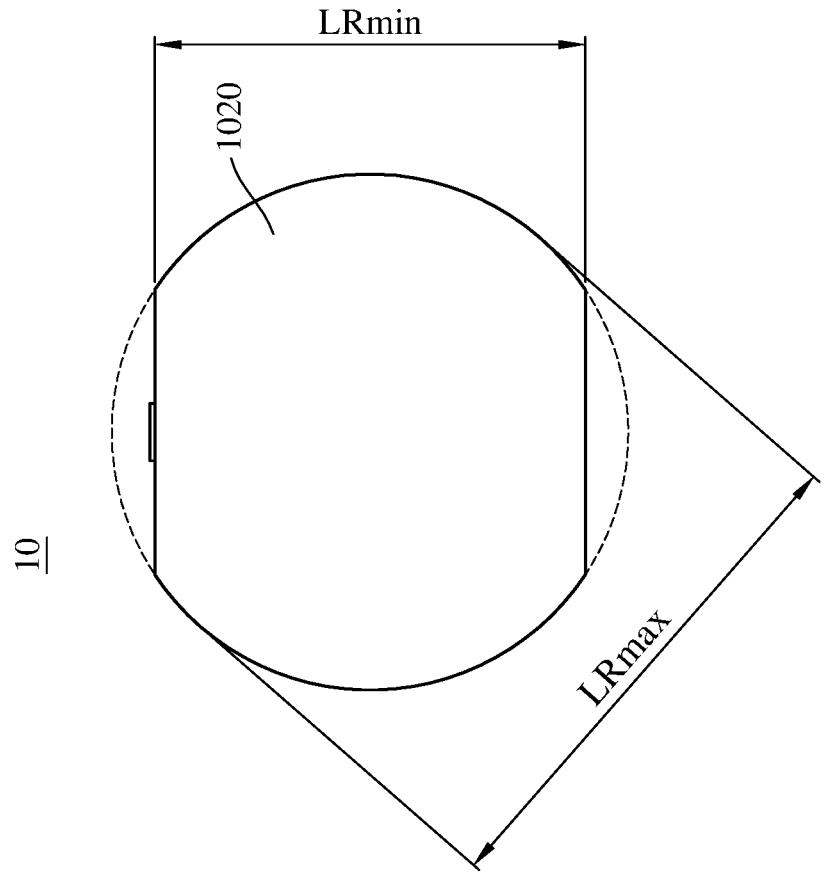
FIG. 20 shows a schematic view of LRmin and LRmax of the second lens element in FIG. 19.
Figure 22:
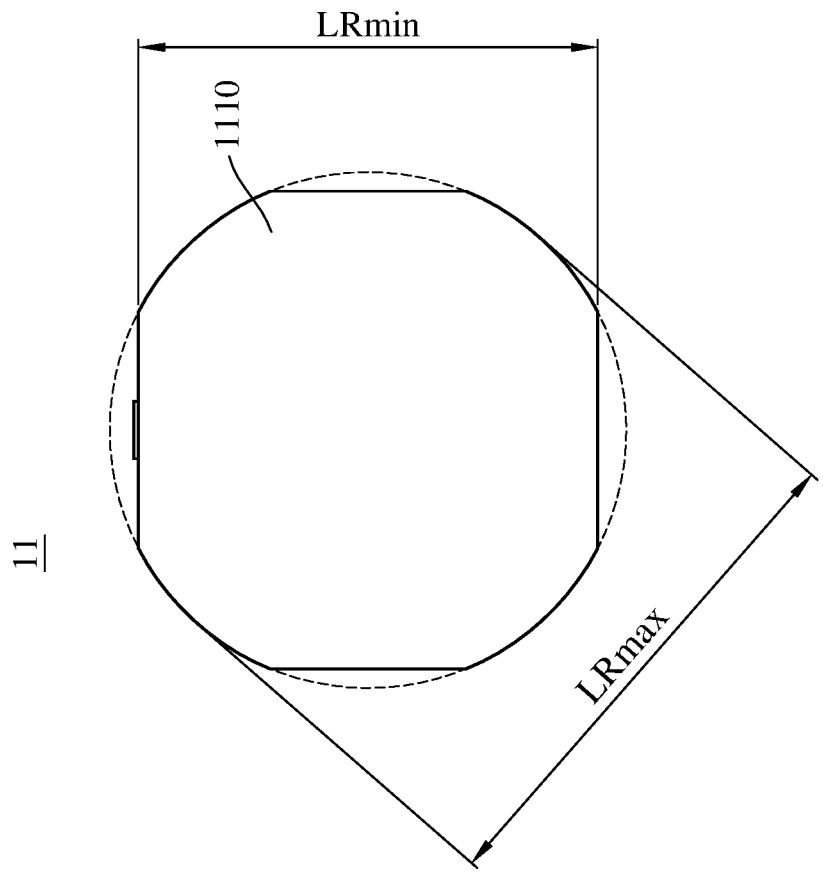
FIG. 22 shows a schematic view of LRmin and LRmax of the first lens element in FIG. 21.

In the case of at least one lens element having at least two trimmed edges at the outer diameter position thereof, when twice of a minimum distance from a center to the outer diameter position of the at least one lens element is LRmin, and twice of a maximum distance from the center to the outer diameter position of the at least one lens element is LRmax, the following condition can be satisfied: LRmin/LRmax<0.90. Therefore, it is favorable for reducing one axial dimension of any single lens element so as to further miniaturizing the imaging lens assembly. Moreover, the following condition can also be satisfied: 0.50<LRmin/LRmax<0.85. Please refer to FIG. 20 and FIG. 22, FIG. 20 shows a schematic view of LRmin and LRmax according to the 10th embodiment of the present disclosure, and FIG. 22 shows a schematic view of LRmin and LRmax according to the 11th embodiment of the present disclosure.

When the maximum effective radius of the object-side surface of the first lens element is Y11, the following condition can be satisfied: Y11<3.0 [mm]. Therefore, it is favorable for enhancing compactness of the imaging lens assembly.

When the axial distance between the object-side surface of the first lens element and the image surface is TL, the following condition can be satisfied: 8 [mm]<TL<20 [mm]. Therefore, it is favorable for balancing between a sufficient telephoto configuration and miniaturization.

When an Abbe number of the first lens element is V1, the Abbe number of the second lens element is V2, an Abbe number of the third lens element is V3, an Abbe number of the fourth lens element is V4, the Abbe number of the fifth lens element is V5, an Abbe number of the sixth lens element is V6, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, and a refractive index of the i-th lens element is Ni, at least one lens element of the imaging lens assembly can satisfy the following condition: 5<Vi/Ni<11.8, wherein i=1, 2, 3, 4, 5 or 6. Therefore, it is favorable for balancing corrections of chromatic aberration and astigmatism while reducing the effective radius and surface diameter of each lens element so as to further miniaturize the imaging lens assembly. Moreover, at least two lens elements of the imaging lens assembly can also satisfy the following condition: 5<Vi/Ni<11.8, wherein i=1, 2, 3, 4, 5 or 6.

According to the present disclosure, the aforementioned features and conditions can be utilized in numerous combinations so as to achieve corresponding effects.

According to the present disclosure, the lens elements of the imaging lens assembly can be made of either glass or plastic material. When the lens elements are made of glass material, the refractive power distribution of the imaging lens assembly may be more flexible. The glass lens element can either be made by grinding or molding. When the lens elements are made of plastic material, the manufacturing costs can be effectively reduced. Furthermore, surfaces of each lens element can be arranged to be aspheric, which allows more control variables for eliminating aberrations thereof, the required number of the lens elements can be reduced, and the total track length of the imaging lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging lens assembly, based on the corresponding image sensor, can be flat or curved, especially a curved surface being concave facing towards the object side of the imaging lens assembly.

According to the present disclosure, an image correction unit, such as a field flattener, can be optionally disposed between the lens element closest to the image side of the imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens assembly and the image surface to produce a telecentric effect, and thereby improves the image-sensing efficiency of an image sensor (for example, CCD or CMOS).

A middle stop disposed between the first lens element and the image surface is favorable for enlarging the viewing angle of the imaging lens assembly and thereby provides a wider field of view for the same.

According to the present disclosure, the imaging lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
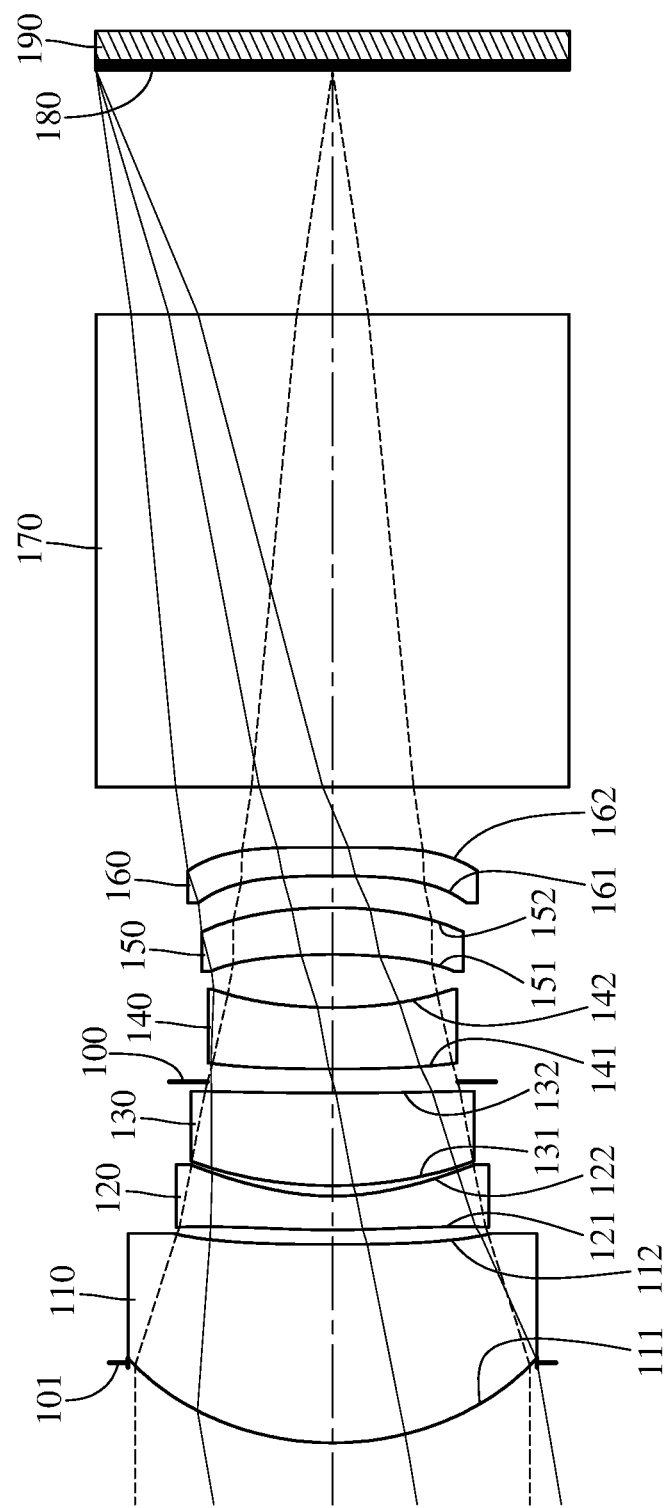
FIG. 1 is a schematic view of an image capturing unit according to the 1st embodiment of the present disclosure.
Figure 2:
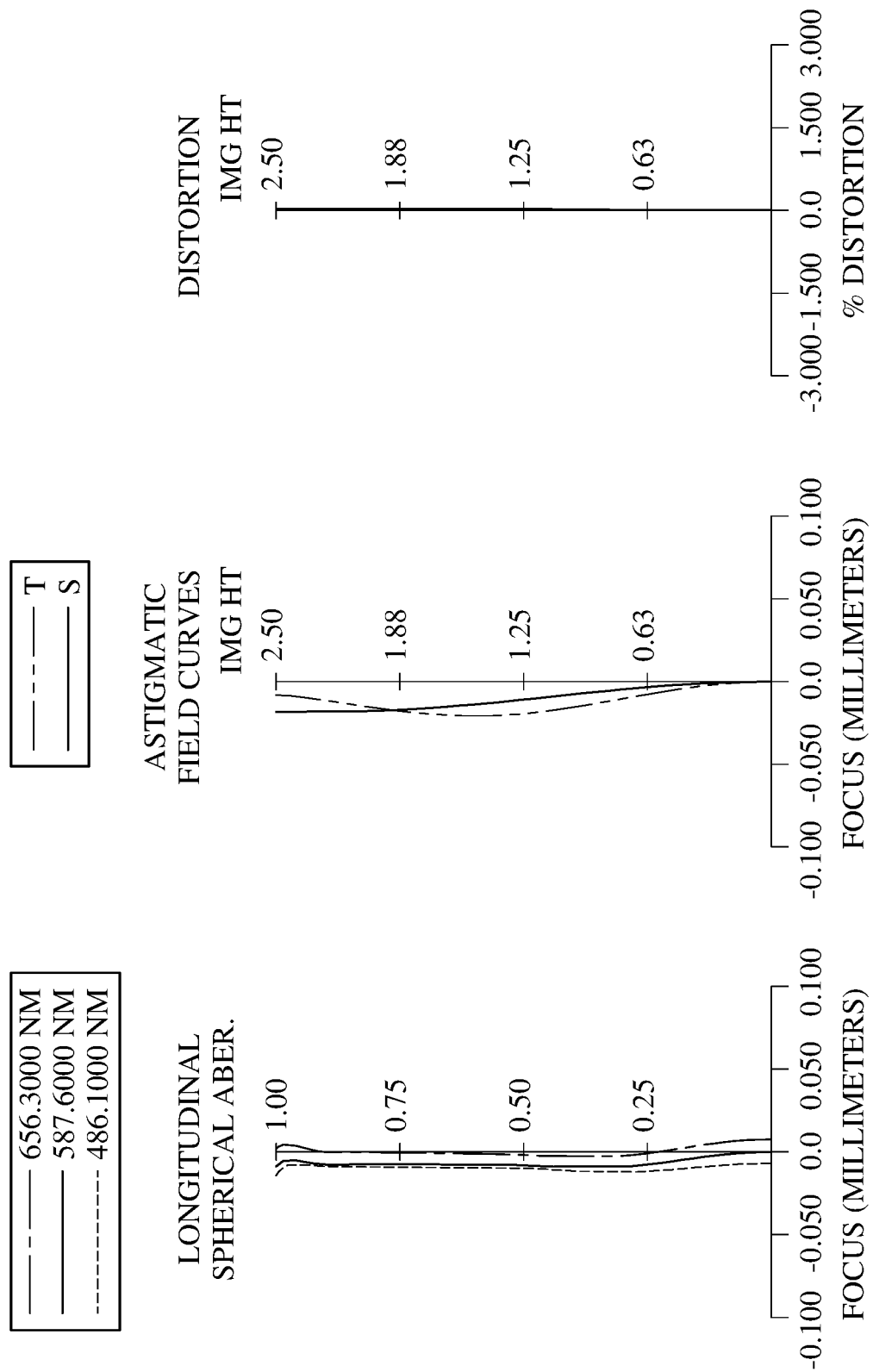
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens assembly (its reference numeral is omitted) of the present disclosure and an image sensor 190. The imaging lens assembly includes, in order from an object side to an image side, a stop 101, a first lens element 110, a second lens element 120, a third lens element 130, an aperture stop 100, a fourth lens element 140, a fifth lens element 150, a sixth lens element 160, a glass element 170 and an image surface 180. The imaging lens assembly includes six lens elements (110, 120, 130, 140, 150 and 160) with no additional lens element disposed between each of the adjacent six lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has at least one concave critical point in an off-axis region thereof.

The third lens element 130 with positive refractive power has an object-side surface 131 being convex in a paraxial region thereof and an image-side surface 132 being concave in a paraxial region thereof. The third lens element 130 is made of glass material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The image-side surface 142 of the fourth lens element 140 has at least one inflection point.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one inflection point. The image-side surface 162 of the sixth lens element 160 has at least one critical point in an off-axis region thereof.

The glass element 170 is made of glass material and located between the sixth lens element 160 and the image surface 180, and will not affect the focal length of the imaging lens assembly. The image sensor 190 is disposed on or near the image surface 180 of the imaging lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging lens assembly of the image capturing unit according to the 1st embodiment, when a focal length of the imaging lens assembly is f, an f-number of the imaging lens assembly is Fno, and half of a maximum field of view of the imaging lens assembly is HFOV, these parameters have the following values: f=14.44 millimeters (mm), Fno=3.46, HFOV=9.8 degrees (deg.).

When an Abbe number of the first lens element 110 is V1, and a refractive index of the first lens element 110 is N1, the following condition is satisfied: V1/N1=36.46.

When an Abbe number of the second lens element 120 is V2, and a refractive index of the second lens element 120 is N2, the following condition is satisfied: V2/N2=17.78.

When an Abbe number of the third lens element 130 is V3, and a refractive index of the third lens element 130 is N3, the following condition is satisfied: V3/N3=46.81.

When an Abbe number of the fourth lens element 140 is V4, and a refractive index of the fourth lens element 140 is N4, the following condition is satisfied: V4/N4=25.95.

When an Abbe number of the fifth lens element 150 is V5, and a refractive index of the fifth lens element 150 is N5, the following condition is satisfied: V5/N5=11.65.

When an Abbe number of the sixth lens element 160 is V6, and a refractive index of the sixth lens element 160 is N6, the following condition is satisfied: V6/N6=23.91.

When the Abbe number of the second lens element 120 is V2, and the Abbe number of the fifth lens element 150 is V5, the following condition is satisfied: V2+V5=47.95.

When a minimum value among Abbe numbers of all lens elements of the imaging lens assembly is Vmin, the following condition is satisfied: Vmin=19.5. In this embodiment, among the first lens element 110, the second lens element 120, the third lens element 130, the fourth lens element 140, the fifth lens element 150 and the sixth lens element 160, the Abbe number of the fifth lens element 150 is smaller than the Abbe numbers of the other lens elements, and Vmin is equal to the Abbe number of the fifth lens element 150.

When an axial distance between the object-side surface 111 of the first lens element 110 and the image-side surface 162 of the sixth lens element 160 is Td, and an axial distance between the image-side surface 162 of the sixth lens element 160 and the image surface 180 is BL, the following condition is satisfied: Td/BL=0.77.

When a maximum value among refractive indices of all lens elements of the imaging lens assembly is Nmax, the following condition is satisfied: Nmax=1.669. In this embodiment, among the first lens element 110, the second lens element 120, the third lens element 130, the fourth lens element 140, the fifth lens element 150 and the sixth lens element 160, the refractive index of the fifth lens element 150 is larger than the refractive indices of the other lens elements, and Nmax is equal to the refractive index of the fifth lens element 150.

When a central thickness of the first lens element 110 is CT1, and a central thickness of the second lens element 120 is CT2, the following condition is satisfied: CT1/CT2=5.87.

When the central thickness of the first lens element 110 is CT1, and a central thickness of the third lens element 130 is CT3, the following condition is satisfied: CT1/CT3=2.14.

When the central thickness of the first lens element 110 is CT1, and a central thickness of the fourth lens element 140 is CT4, the following condition is satisfied: CT1/CT4=3.23.

When the central thickness of the first lens element 110 is CT1, and a central thickness of the fifth lens element 150 is CT5, the following condition is satisfied: CT1/CT5=4.23.

When the central thickness of the first lens element 110 is CT1, and a central thickness of the sixth lens element 160 is CT6, the following condition is satisfied: CT1/CT6=7.00.

When a sum of central thicknesses of all lens elements of the imaging lens assembly is ΣCT, and the central thickness of the first lens element 110 is CT1, the following condition is satisfied: ΣCT/CT1=2.33. In this embodiment, ΣCT is the sum of the central thicknesses of the first lens element 110, the second lens element 120, the third lens element 130, the fourth lens element 140, the fifth lens element 150 and the sixth lens element 160.

When an axial distance between the object-side surface 131 of the third lens element 130 and the image-side surface 162 of the sixth lens element 160 is Dr5r12, and the axial distance between the object-side surface 111 of the first lens element 110 and the image-side surface 162 of the sixth lens element 160 is Td, the following condition is satisfied: Dr5r12/Td=0.57.

When an axial distance between the object-side surface 141 of the fourth lens element 140 and the image-side surface 162 of the sixth lens element 160 is Dr7r12, and the axial distance between the object-side surface 111 of the first lens element 110 and the image-side surface 162 of the sixth lens element 160 is Td, the following condition is satisfied: Dr7r12/Td=0.37.

When a focal length of the first lens element 110 is f1, and a focal length of the fourth lens element 140 is f4, the following condition is satisfied: |f1/f4|=0.55.

When the focal length of the first lens element 110 is f1, a focal length of the fifth lens element 150 is f5, and a focal length of the sixth lens element 160 is f6, the following condition is satisfied: |f1/f5|+|f1/f6|=0.79.

When the focal length of the imaging lens assembly is f, the focal length of the first lens element 110 is f1, a focal length of the second lens element 120 is f2, a focal length of the third lens element 130 is f3, the focal length of the fourth lens element 140 is f4, the focal length of the fifth lens element 150 is f5, and the focal length of the sixth lens element 160 is f6, the following condition is satisfied: |f/f1|+|f/f2|+|f/f3|+|f/f4|+|f/f5|+|f/f6|=9.04.

When an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following condition is satisfied: (T34+T56)/T45=1.05. In this embodiment, an axial distance between two adjacent lens elements is an air gap in a paraxial region between the two adjacent lens elements.

When an axial distance between the object-side surface 111 of the first lens element 110 and the image surface 180 is TL, the following condition is satisfied: TL=14.53 [mm].

When the axial distance between the object-side surface 111 of the first lens element 110 and the image surface 180 is TL, and the focal length of the imaging lens assembly is f, the following condition is satisfied: TL/f=1.01.

When the axial distance between the image-side surface 162 of the sixth lens element 160 and the image surface 180 is BL, and a sum of axial distances between each of all adjacent lens elements of the imaging lens assembly is ΣAT, the following condition is satisfied: BL/ΣAT=5.81. In this embodiment, ΣAT is the sum of the axial distances between the first lens element 110 and the second lens element 120, the second lens element 120 and the third lens element 130, the third lens element 130 and the fourth lens element 140, the fourth lens element 140 and the fifth lens element 150, and the fifth lens element 150 and the sixth lens element 160.

When a maximum effective radius of the object-side surface 111 of the first lens element 110 is Y11, the following condition is satisfied: Y11=2.16 [mm].

When the maximum effective radius of the object-side surface 111 of the first lens element 110 is Y11, and a maximum effective radius of the image-side surface 112 of the first lens element 110 is Y12, the following condition is satisfied: Y11/Y12=1.29.

When the maximum effective radius of the object-side surface 111 of the first lens element 110 is Y11, and a maximum effective radius of the object-side surface 121 of the second lens element 120 is Y21, the following condition is satisfied: Y11/Y21=1.31.

When the maximum effective radius of the object-side surface 111 of the first lens element 110 is Y11, and a maximum effective radius of the image-side surface 122 of the second lens element 120 is Y22, the following condition is satisfied: Y11/Y22=1.44.

When the maximum effective radius of the object-side surface 111 of the first lens element 110 is Y11, and a maximum effective radius of the object-side surface 131 of the third lens element 130 is Y31, the following condition is satisfied: Y11/Y31=1.44.

When the maximum effective radius of the object-side surface 111 of the first lens element 110 is Y11, and a maximum effective radius of the image-side surface 132 of the third lens element 130 is Y32, the following condition is satisfied: Y11/Y32=1.60.

When the maximum effective radius of the object-side surface 111 of the first lens element 110 is Y11, and a maximum effective radius of the object-side surface 141 of the fourth lens element 140 is Y41, the following condition is satisfied: Y11/Y41=1.64.

When the maximum effective radius of the object-side surface 111 of the first lens element 110 is Y11, and a maximum effective radius of the image-side surface 142 of the fourth lens element 140 is Y42, the following condition is satisfied: Y11/Y42=1.70.

When the maximum effective radius of the object-side surface 111 of the first lens element 110 is Y11, and a maximum effective radius of the object-side surface 151 of the fifth lens element 150 is Y51, the following condition is satisfied: Y11/Y51=1.68.

When the maximum effective radius of the object-side surface 111 of the first lens element 110 is Y11, and a maximum effective radius of the image-side surface 152 of the fifth lens element 150 is Y52, the following condition is satisfied: Y11/Y52=1.56.

When the maximum effective radius of the object-side surface 111 of the first lens element 110 is Y11, and a maximum effective radius of the object-side surface 161 of the sixth lens element 160 is Y61, the following condition is satisfied: Y11/Y61=1.52.

When the maximum effective radius of the object-side surface 111 of the first lens element 110 is Y11, and a maximum effective radius of the image-side surface 162 of the sixth lens element 160 is Y62, the following condition is satisfied: Y11/Y62=1.41.

The detailed optical data of the 1st embodiment are shown in Table 1 and the aspheric surface data are shown in Table 2 below.

TABLE 1

1st Embodiment
f = 14.44 mm, Fno = 3.46, HFOV = 9.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.850 | | | | |
| 2 | Lens 1 | 3.195 | (ASP) | 2.100 | Plastic | 1.534 | 55.9 | 6.47 |
| 3 | | 32.920 | (ASP) | 0.153 | | | | |
| 4 | Lens 2 | 9.758 | (ASP) | 0.358 | Plastic | 1.603 | 28.5 | −6.12 |
| 5 | | 2.640 | (ASP) | 0.111 | | | | |
| 6 | Lens 3 | 4.536 | (ASP) | 0.980 | Glass | 1.507 | 70.5 | 9.90 |
| 7 | | 44.039 | (ASP) | 0.119 | | | | |
| 8 | Ape. Stop | Plano | | 0.135 | | | | |
| 9 | Lens 4 | 18.901 | (ASP) | 0.650 | Plastic | 1.559 | 40.4 | −11.81 |
| 10 | | 4.830 | (ASP) | 0.562 | | | | |
| 11 | Lens 5 | −6.408 | (ASP) | 0.497 | Plastic | 1.669 | 19.5 | 15.32 |
| 12 | | −4.065 | (ASP) | 0.335 | | | | |
| 13 | Lens 6 | −11.272 | (ASP) | 0.300 | Plastic | 1.566 | 37.4 | −17.46 |
| 14 | | 80.984 | (ASP) | 0.640 | | | | |
| 15 | Glass Element | Plano | | 5.000 | Glass | 1.517 | 64.2 | — |
| 16 | | Plano | | 2.586 | | | | |
| 17 | Image | Plano | | 0.000 | | | | |

Note:
Reference wavelength is 587.6 nm (d-line).
An effective radius of the stop 101 (Surface 1) is 2.160 mm.
An effective radius of the image-side surface 162 (Surface 14) is 1.530 mm.

TABLE 2

Aspheric Coefficients

| Surface # | 2 | 3 | 4 | 5 | 6 |
|---|---|---|---|---|---|
| k = | 5.3188E−01 | −7.4290E+01 | 2.4608E+01 | 1.0849E+00 | 0.0000E+00 |
| A4 = | −9.6604E−04 | 1.1076E−02 | −3.9567E−02 | −6.2616E−02 | 4.8597E−04 |
| A6 = | −3.1751E−04 | −2.8334E−03 | 1.9130E−02 | 2.7676E−02 | −1.6663E−04 |
| A8 = | 5.5435E−05 | 1.6634E−03 | −7.8227E−03 | −1.3196E−02 | 9.9594E−05 |
| A10 = | −1.3662E−05 | −5.3488E−04 | 1.7144E−03 | 3.4670E−03 | 3.6552E−05 |
| A12 = | 8.5264E−07 | 8.5104E−05 | −1.8590E−04 | −5.4201E−04 | 1.9341E−05 |

| Surface # | 7 | 9 | 10 | 11 | 12 |
|---|---|---|---|---|---|
| k = | 0.0000E+00 | −1.0000E+00 | 8.6917E+00 | 1.5869E+01 | −1.0000E+00 |
| A4 = | −5.8478E−04 | −5.0381E−03 | −3.8097E−03 | 2.8832E−02 | 4.1931E−02 |
| A6 = | −2.9268E−04 | 1.0616E−02 | −2.1148E−03 | −5.5559E−02 | −7.9360E−02 |
| A8 = | 5.8847E−05 | −9.4659E−04 | 6.1215E−03 | 4.3359E−02 | 6.0985E−02 |
| A10 = | 1.0462E−05 | −1.0483E−03 | −3.0049E−03 | −1.9070E−02 | −2.5458E−02 |

TABLE 2-continued

| Aspheric Coefficients | | | | |
|---|---|---|---|---|
| A12 = 4.0491E−05 | 1.7176E−04 | −4.1248E−04 | 3.6590E−03 | 4.5678E−03 |
| A14 = — | — | — | −1.5165E−04 | −1.0791E−04 |

| Surface # | 13 | 14 |
|---|---|---|
| k = | 1.5052E+01 | −1.0000E+00 |
| A4 = | −1.1723E−02 | −4.4287E−02 |
| A6 = | −7.4196E−02 | −1.7083E−02 |
| A8 = | 6.8926E−02 | 1.8030E−02 |
| A10 = | −2.9681E−02 | −4.2875E−03 |
| A12 = | 5.1464E−03 | −2.1643E−03 |
| A14 = | −3.8408E−04 | 1.1888E−03 |
| A16 = | 6.9239E−05 | −1.5832E−04 |

In Table 1, the curvature radius, the thickness and the focal length are shown in millimeters (mm). Surface numbers 0-17 represent the surfaces sequentially arranged from the object side to the image side along the optical axis. In Table 2, k represents the conic coefficient of the equation of the aspheric surface profiles. A4-16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
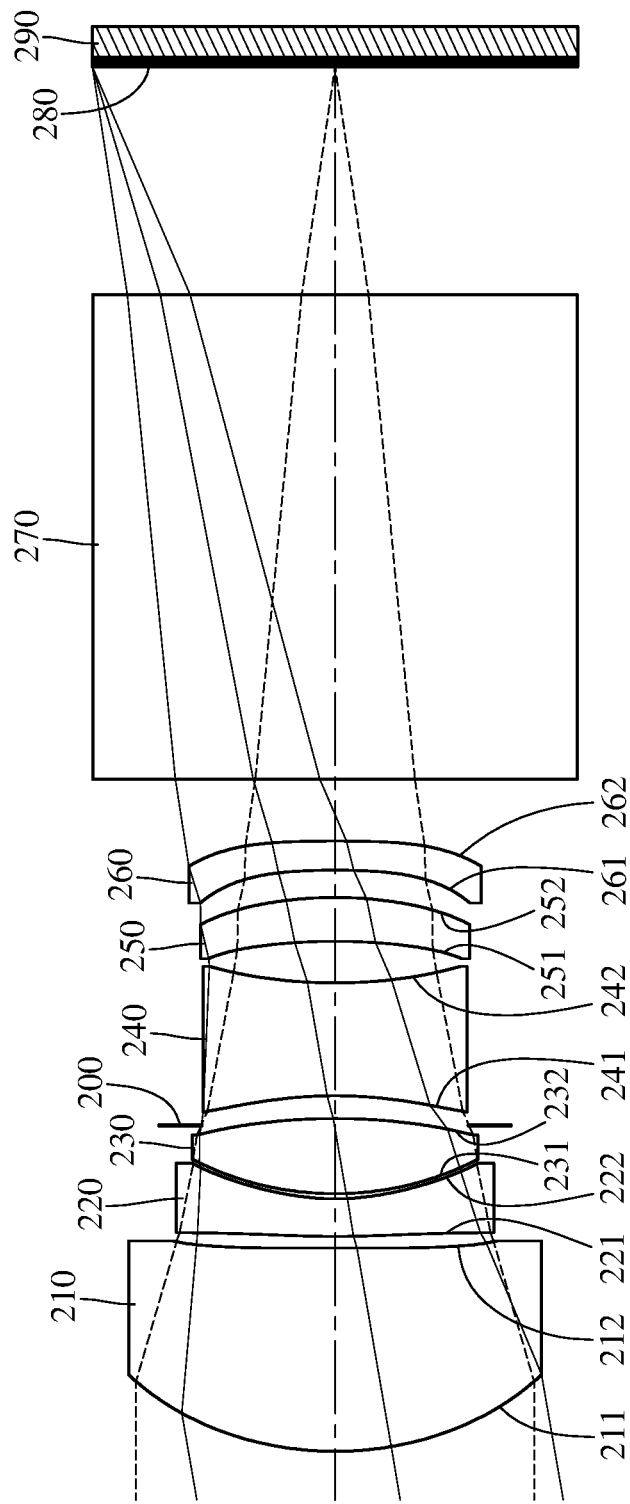
FIG. 3 is a schematic view of an image capturing unit according to the 2nd embodiment of the present disclosure.
Figure 4:
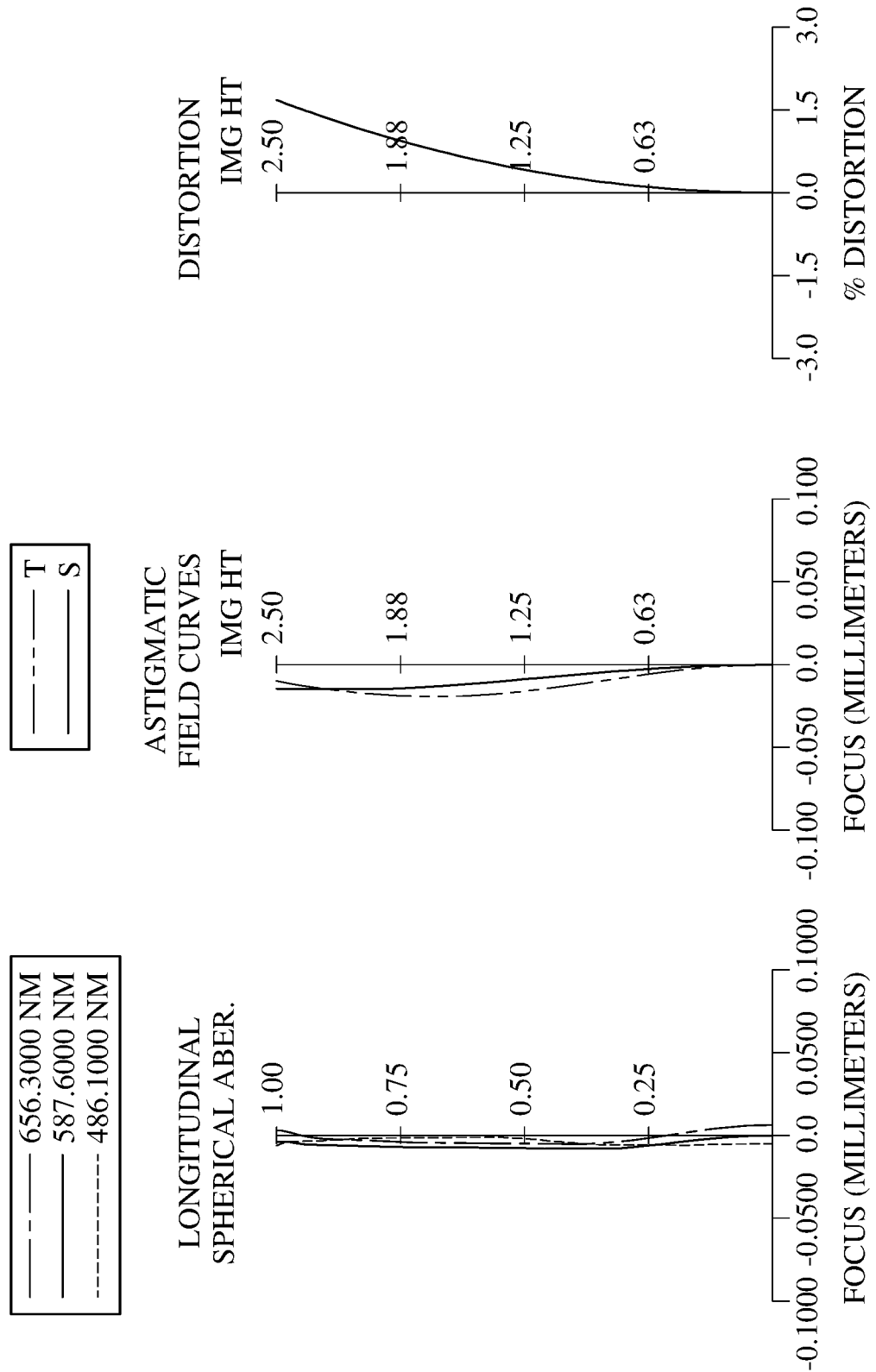
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens assembly (its reference numeral is omitted) of the present disclosure and an image sensor 290. The imaging lens assembly includes, in order from an object side to an image side, a first lens element 210, a second lens element 220, a third lens element 230, an aperture stop 200, a fourth lens element 240, a fifth lens element 250, a sixth lens element 260, a glass element 270 and an image surface 280. The imaging lens assembly includes six lens elements (210, 220, 230, 240, 250 and 260) with no additional lens element disposed between each of the adjacent six lens elements.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of glass material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has at least one inflection point. The image-side surface 242 of the fourth lens element 240 has at least one inflection point.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric.

The glass element 270 is made of glass material and located between the sixth lens element 260 and the image surface 280, and will not affect the focal length of the imaging lens assembly. The image sensor 290 is disposed on or near the image surface 280 of the imaging lens assembly.

The detailed optical data of the 2nd embodiment are shown in Table 3 and the aspheric surface data are shown in Table 4 below.

TABLE 3

2nd Embodiment
f = 14.20 mm, Fno = 3.46, HFOV = 9.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.463 | (ASP) | 2.100 | Plastic | 1.550 | 50.0 | 6.13 |
| 2 | | −100.000 | (ASP) | 0.119 | | | | |
| 3 | Lens 2 | 9.891 | (ASP) | 0.388 | Glass | 1.693 | 33.7 | −4.95 |

TABLE 3-continued

2nd Embodiment
f = 14.20 mm, Fno = 3.46, HFOV = 9.8 deg.

| Surface # | | Curvature Radius | | Thickness | Material | Index | Abbe # | Focal Length |
|---|---|---|---|---|---|---|---|---|
| 4 | | 2.507 | (ASP) | 0.053 | | | | |
| 5 | Lens 3 | 3.272 | (ASP) | 0.776 | Plastic | 1.544 | 56.0 | 4.09 |
| 6 | | −6.397 | (ASP) | −0.071 | | | | |
| 7 | Ape. Stop | Plano | | 0.306 | | | | |
| 8 | Lens 4 | −4.863 | (ASP) | 1.166 | Plastic | 1.583 | 30.2 | −4.19 |
| 9 | | 5.329 | (ASP) | 0.429 | | | | |
| 10 | Lens 5 | −5.942 | (ASP) | 0.453 | Plastic | 1.705 | 14.0 | 14.34 |
| 11 | | −3.860 | (ASP) | 0.282 | | | | |
| 12 | Lens 6 | −7.249 | (ASP) | 0.300 | Plastic | 1.583 | 30.2 | −18.54 |
| 13 | | −22.400 | (ASP) | 0.640 | | | | |
| 14 | Glass Element | Plano | | 5.000 | Glass | 1.517 | 64.2 | — |
| 15 | | Plano | | 2.355 | | | | |
| 16 | Image | Plano | | 0.000 | | | | |

Note:
Reference wavelength is 587.6 nm (d-line).
An effective radius of the object-side surface 211 (Surface 1) is 2.160 mm.

TABLE 4

Aspheric Coefficients

| Surface # | 1 | 2 | 3 | 4 | 5 |
|---|---|---|---|---|---|
| k = | 6.7480E−01 | −9.0000E+01 | 2.5378E+01 | 9.1386E−01 | 0.0000E+00 |
| A4 = | −4.9193E−04 | 1.2521E−02 | −3.9301E−02 | −6.3279E−02 | 1.0043E−03 |
| A6 = | −2.5449E−04 | −2.8188E−03 | 1.9216E−02 | 2.8024E−02 | −3.2206E−05 |
| A8 = | 6.3957E−05 | 1.5727E−03 | −7.7735E−03 | −1.2949E−02 | 1.0664E−04 |
| A10 = | −1.3150E−05 | −5.2985E−04 | 1.7285E−03 | 3.5668E−03 | 3.1013E−05 |
| A12 = | 1.0565E−06 | 9.1252E−05 | −1.7229E−04 | −4.9195E−04 | −2.5287E−05 |

| Surface # | 6 | 8 | 9 | 10 | 11 |
|---|---|---|---|---|---|
| k = | 0.0000E+00 | −1.0000E+00 | 8.8655E+00 | 1.2107E+01 | −1.0000E+00 |
| A4 = | −1.3901E−03 | −6.8626E−03 | −4.7740E−03 | 3.2953E−02 | 3.9942E−02 |
| A6 = | −5.0890E−04 | 9.6165E−03 | −4.6067E−03 | −5.4513E−02 | −7.8487E−02 |
| A8 = | 1.9759E−04 | −1.1510E−03 | 8.0885E−03 | 4.3890E−02 | 6.1384E−02 |
| A10 = | −9.6803E−05 | −4.9308E−04 | −3.7432E−03 | −1.8197E−02 | −2.5647E−02 |
| A12 = | −1.8337E−06 | 2.2479E−04 | −3.8217E−05 | 2.8682E−03 | 4.5507E−03 |
| A14 = | — | — | — | −1.6885E−04 | −1.6745E−04 |

| Surface # | 12 | 13 |
|---|---|---|
| k = | 1.5383E+01 | −9.0000E+01 |
| A4 = | −1.4043E−02 | −4.0391E−02 |
| A6 = | −7.4269E−02 | −1.6660E−02 |
| A8 = | 6.9198E−02 | 1.7882E−02 |
| A10 = | −2.9374E−02 | −4.2647E−03 |
| A12 = | 5.0408E−03 | −2.0957E−03 |
| A14 = | −4.1676E−04 | 1.1998E−03 |
| A16 = | 9.1399E−05 | −1.6244E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

2nd Embodiment

| f [mm] | 14.20 | Dr7r12/Td | 0.42 |
|---|---|---|---|
| Fno | 3.46 | |f1/f4| | 1.46 |
| HFOV [deg.] | 9.8 | |f1/f5| + |f1/f6| | 0.76 |

-continued

2nd Embodiment

| V1/N1 | 32.26 | |f/f1| + |f/f2| + |f/f3| + |f/f4| + |f/f5| + |f/f6| | 13.80 |
|---|---|---|---|
| V2/N2 | 19.93 | (T34 + T56)/T45 | 1.21 |
| V3/N3 | 36.26 | TL [mm] | 14.30 |
| V4/N4 | 19.11 | TL/f | 1.01 |
| V5/N5 | 8.21 | BL/ΣAT | 7.15 |
| V6/N6 | 19.11 | Y11 [mm] | 2.13 |
| V2 + V5 | 47.74 | Y11/Y12 | 1.27 |
| Vmin | 14.0 | Y11/Y21 | 1.30 |
| Td/BL | 0.79 | Y11/Y22 | 1.45 |
| Nmax | 1.705 | Y11/Y31 | 1.45 |
| CT1/CT2 | 5.41 | Y11/Y32 | 1.49 |
| CT1/CT3 | 2.71 | Y11/Y41 | 1.57 |
| CT1/CT4 | 1.80 | Y11/Y42 | 1.64 |
| CT1/CT5 | 4.64 | Y11/Y51 | 1.64 |

-continued

| 2nd Embodiment | | | |
|---|---|---|---|
| CT1/CT6 | 7.00 | Y11/Y52 | 1.54 |
| ΣCT/CT1 | 2.47 | Y11/Y61 | 1.53 |
| Dr5r12/Td | 0.58 | Y11/Y62 | 1.41 |

3rd Embodiment

Figure 5:
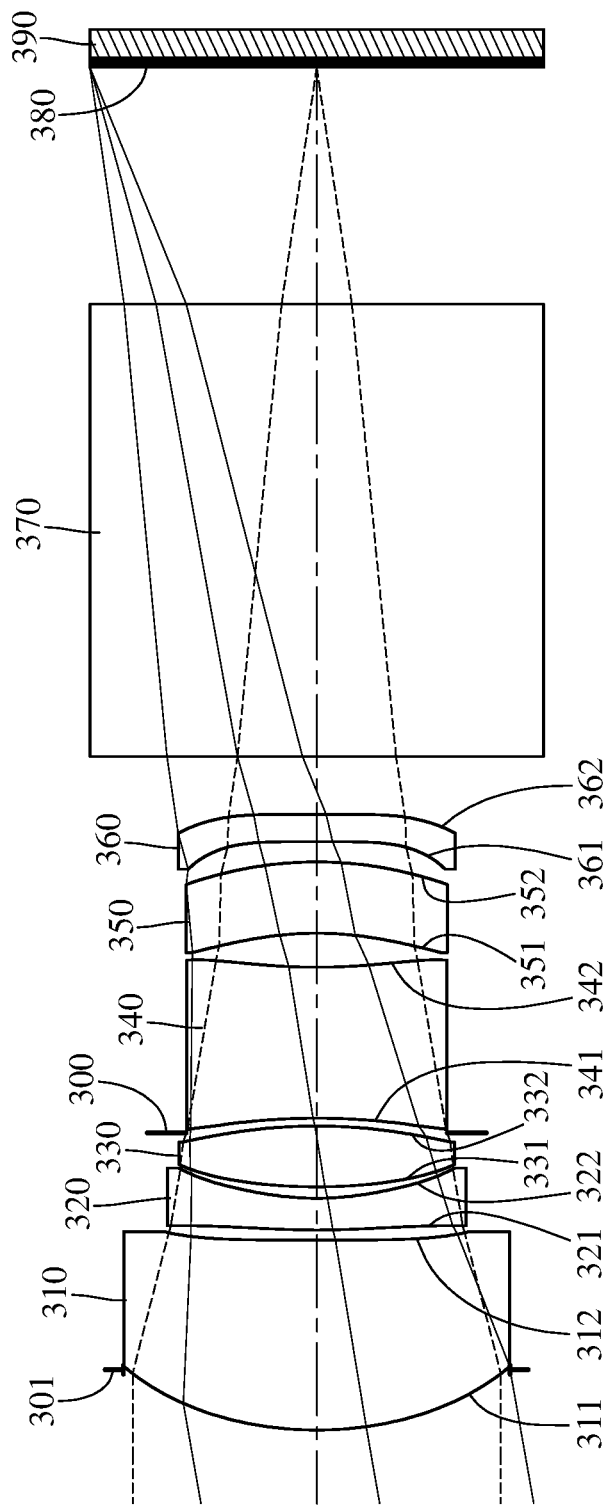
FIG. 5 is a schematic view of an image capturing unit according to the 3rd embodiment of the present disclosure.
Figure 6:
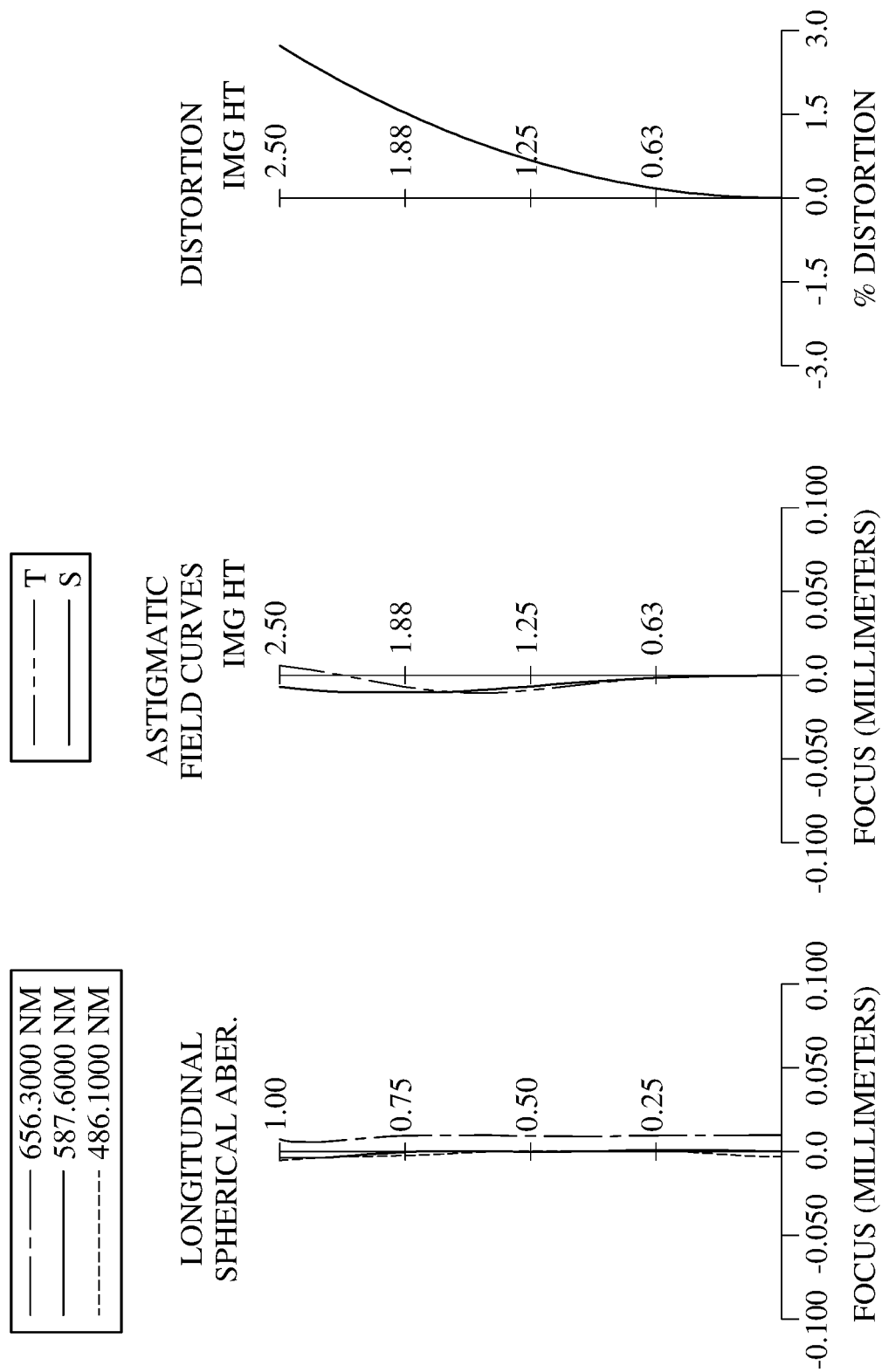
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens assembly (its reference numeral is omitted) of the present disclosure and an image sensor 390. The imaging lens assembly includes, in order from an object side to an image side, a stop 301, a first lens element 310, a second lens element 320, a third lens element 330, an aperture stop 300, a fourth lens element 340, a fifth lens element 350, a sixth lens element 360, a glass element 370 and an image surface 380. The imaging lens assembly includes six lens elements (310, 320, 330, 340, 350 and 360) with no additional lens element disposed between each of the adjacent six lens elements.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has at least one concave critical point in an off-axis region thereof.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has at least one inflection point. The image-side surface 342 of the fourth lens element 340 has at least one inflection point. The image-side surface 342 of the fourth lens element 340 has at least one critical point in an off-axis region thereof.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 362 of the sixth lens element 360 has at least one inflection point. The object-side surface 361 of the sixth lens element 360 has at least one critical point in an off-axis region thereof. The image-side surface 362 of the sixth lens element 360 has at least one critical point in an off-axis region thereof.

The glass element 370 is made of glass material and located between the sixth lens element 360 and the image surface 380, and will not affect the focal length of the imaging lens assembly. The image sensor 390 is disposed on or near the image surface 380 of the imaging lens assembly.

The detailed optical data of the 3rd embodiment are shown in Table 5 and the aspheric surface data are shown in Table 6 below.

TABLE 5

3rd Embodiment
f = 13.82 mm, Fno = 3.40, HFOV = 10.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.690 | | | | |
| 2 | Lens 1 | 4.002 | (ASP) | 2.100 | Plastic | 1.544 | 56.0 | 7.14 |
| 3 | | −109.611 | (ASP) | 0.110 | | | | |
| 4 | Lens 2 | 8.373 | (ASP) | 0.350 | Plastic | 1.566 | 37.4 | −8.55 |
| 5 | | 3.021 | (ASP) | 0.127 | | | | |
| 6 | Lens 3 | 6.112 | (ASP) | 0.672 | Plastic | 1.544 | 56.0 | 5.58 |
| 7 | | −5.804 | (ASP) | −0.077 | | | | |
| 8 | Ape. Stop | Plano | | 0.163 | | | | |
| 9 | Lens 4 | −7.861 | (ASP) | 1.668 | Plastic | 1.559 | 40.4 | −6.07 |
| 10 | | 6.425 | (ASP) | 0.376 | | | | |
| 11 | Lens 5 | −3.546 | (ASP) | 0.788 | Plastic | 1.705 | 14.0 | −440.07 |
| 12 | | −3.917 | (ASP) | 0.222 | | | | |
| 13 | Lens 6 | 96.866 | (ASP) | 0.300 | Plastic | 1.614 | 26.0 | −55.72 |
| 14 | | 25.244 | (ASP) | 0.640 | | | | |

TABLE 5-continued

3rd Embodiment
f = 13.82 mm, Fno = 3.40, HFOV = 10.0 deg.

| Surface # | | Curvature Radius | Thickness | Material | Index | Abbe # | Focal Length |
|---|---|---|---|---|---|---|---|
| 15 | Glass Element | Plano | 5.000 | Glass | 1.517 | 64.2 | — |
| 16 | | Plano | 2.618 | | | | |
| 17 | Image | Plano | 0.000 | | | | |

Note:
Reference wavelength is 587.6 nm (d-line).
An effective radius of the stop 301 (Surface 1) is 2.130 mm.
An effective radius of the image-side surface 362 (Surface 14) is 1.530 mm.

TABLE 6

Aspheric Coefficients

| Surface # | 2 | 3 | 4 | 5 | 6 |
|---|---|---|---|---|---|
| k = | 1.2195E+00 | −9.0000E+01 | 1.4350E+01 | 1.1426E+00 | 0.0000E+00 |
| A4 = | 3.0067E−04 | 1.5786E−02 | −4.0092E−02 | −5.9417E−02 | 5.3768E−03 |
| A6 = | −1.8367E−04 | −3.1323E−03 | 1.8872E−03 | 3.1201E−02 | 8.6495E−04 |
| A8 = | 4.9942E−05 | 1.3846E−03 | −7.7143E−03 | −1.2559E−02 | 2.8222E−04 |
| A10 = | −7.5420E−06 | −4.1790E−04 | 1.7157E−03 | 3.4903E−03 | 2.3125E−04 |
| A12 = | 4.8448E−07 | 7.1498E−05 | −1.6139E−04 | −4.0377E−04 | −4.9632E−05 |

| Surface # | 7 | 9 | 10 | 11 | 12 |
|---|---|---|---|---|---|
| k = | 0.0000E+00 | −1.0000E+00 | 3.7094E+00 | 3.9357E+00 | −1.0000E+00 |
| A4 = | −6.3668E−05 | −1.1009E−02 | −9.5023E−02 | 5.1955E−02 | 3.5574E−02 |
| A6 = | 1.1700E−03 | 8.4339E−03 | −1.5085E−02 | −4.6470E−02 | −6.7942E−02 |
| A8 = | 6.4537E−04 | −1.2494E−03 | 1.0602E−02 | 4.2722E−02 | 6.1284E−02 |
| A10 = | −3.4630E−04 | −1.0636E−05 | −3.2062E−03 | −1.6193E−02 | −2.7170E−02 |
| A12 = | 4.6847E−05 | 4.4472E−05 | 5.7240E−05 | 2.2522E−03 | 5.6042E−03 |
| A14 = | — | — | — | 8.6783E−05 | −4.3142E−04 |

| Surface # | 13 | 14 |
|---|---|---|
| k = | −9.0000E+01 | −9.0000E+01 |
| A4 = | −3.8688E−02 | −4.5390E−02 |
| A6 = | −7.7062E−02 | −1.9310E−02 |
| A8 = | 6.8119E−02 | 1.8450E−02 |
| A10 = | −2.7488E−02 | −3.7775E−03 |
| A12 = | 4.6923E−03 | −2.0274E−03 |
| A14 = | −7.3110E−04 | 1.0766E−03 |
| A16 = | 1.7521E−04 | −1.3619E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| f [mm] | 13.82 | Dr7r12/Td | 0.49 |
|---|---|---|---|
| Fno | 3.40 | |f1/f4| | 1.18 |
| HFOV [deg.] | 10.0 | |f1/f5| + |f1/f6| | 0.14 |
| V1/N1 | 36.26 | |f/f1| + |f/f2| + |f/f3| + |f/f4| + |f/f5| + |f/f6| | 8.58 |
| V2/N2 | 23.91 | (T34 + T56)/T45 | 0.82 |
| V3/N3 | 36.26 | TL [mm] | 15.06 |
| V4/N4 | 25.95 | TL/f | 1.09 |
| V5/N5 | 8.21 | BL/ΣAT | 8.97 |
| V6/N6 | 16.09 | Y11 [mm] | 2.13 |

-continued

3rd Embodiment

| V2 + V5 | 51.44 | Y11/Y12 | 1.27 |
|---|---|---|---|
| Vmin | 14.0 | Y11/Y21 | 1.29 |
| Td/BL | 0.82 | Y11/Y22 | 1.40 |
| Nmax | 1.705 | Y11/Y31 | 1.40 |
| CT1/CT2 | 6.00 | Y11/Y32 | 1.44 |
| CT1/CT3 | 3.13 | Y11/Y41 | 1.48 |
| CT1/CT4 | 1.26 | Y11/Y42 | 1.54 |
| CT1/CT5 | 2.66 | Y11/Y51 | 1.55 |
| CT1/CT6 | 7.00 | Y11/Y52 | 1.48 |
| ΣCT/CT1 | 2.80 | Y11/Y61 | 1.50 |
| Dr5r12/Td | 0.60 | Y11/Y62 | 1.39 |

4th Embodiment

Figure 7:
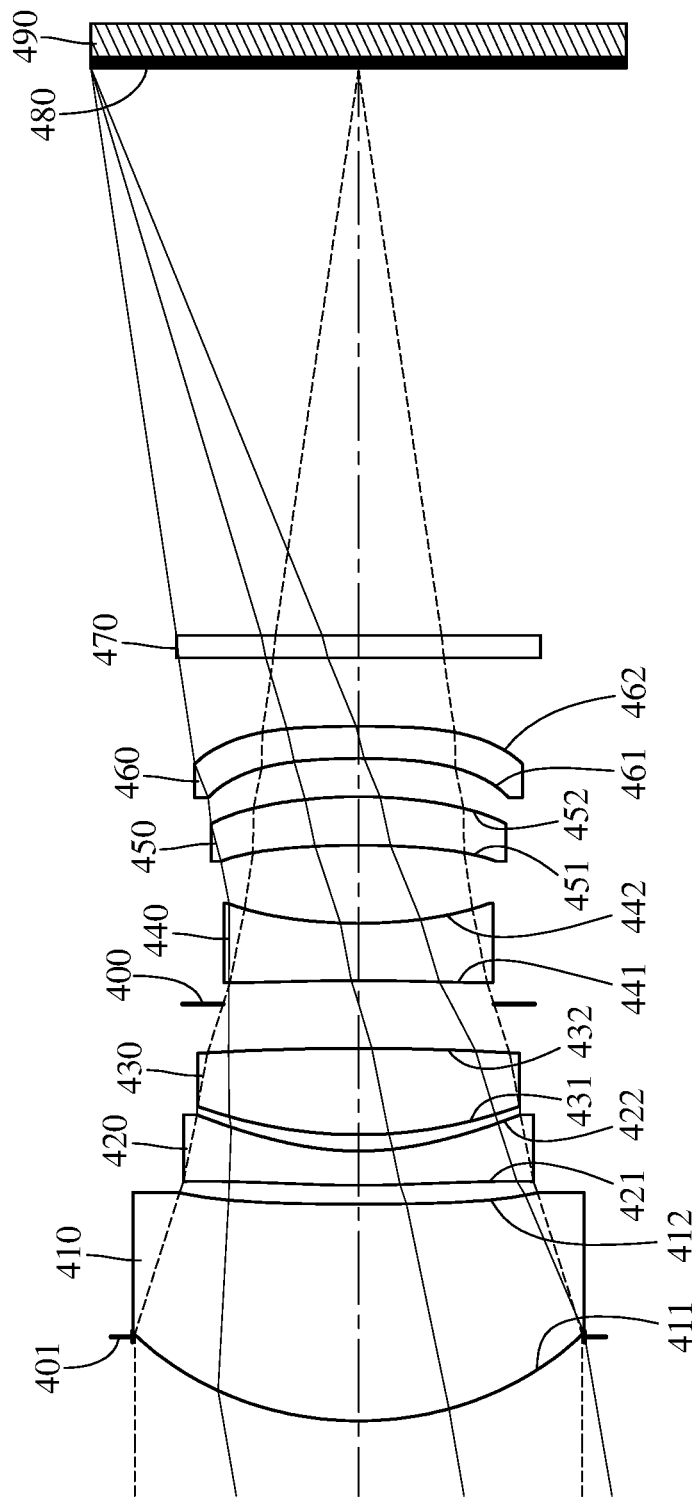
FIG. 7 is a schematic view of an image capturing unit according to the 4th embodiment of the present disclosure.
Figure 8:
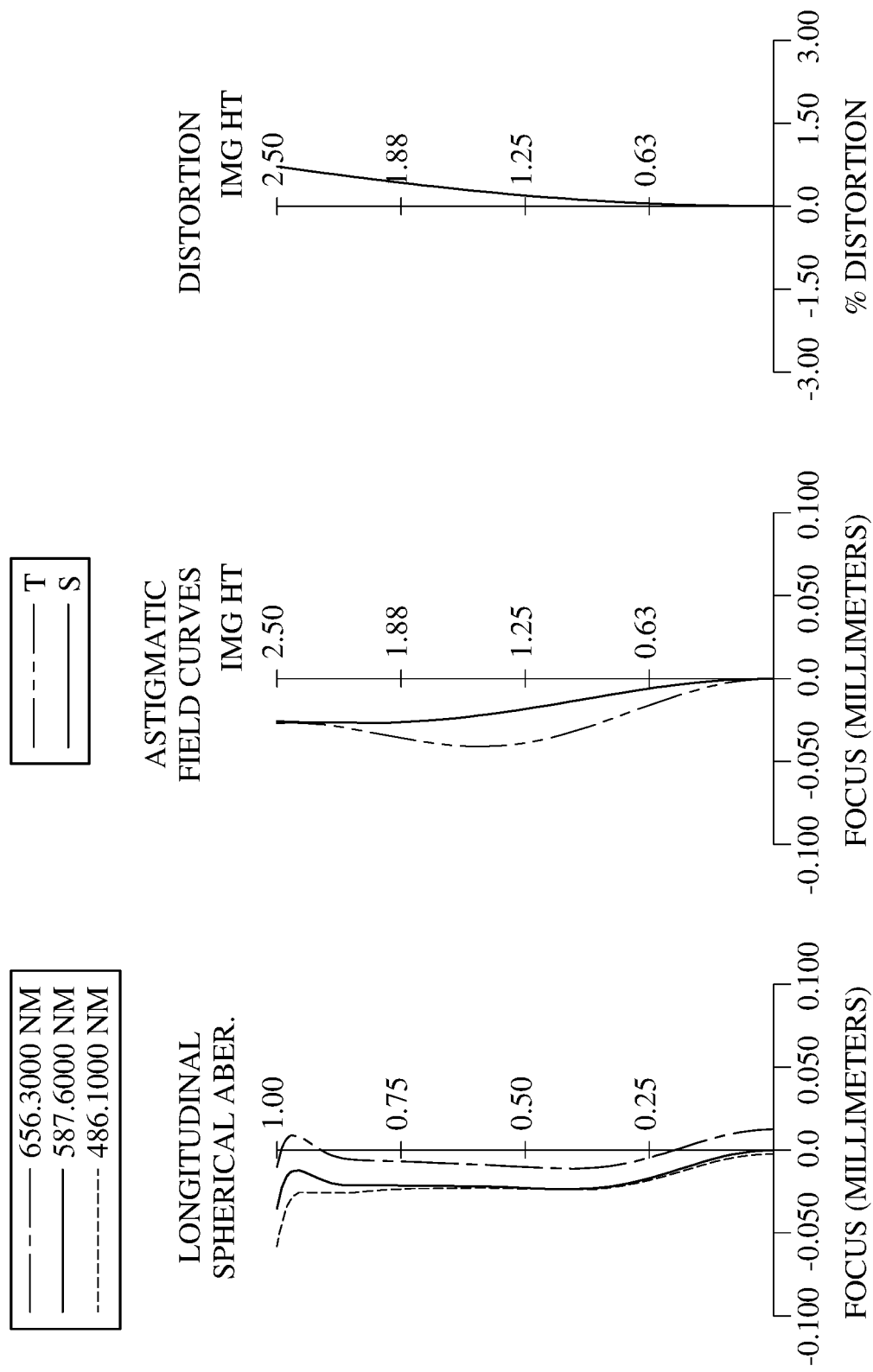
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens assembly (its reference numeral is omitted) of the present disclosure and an image sensor 490. The imaging lens assembly includes, in order from an object side to an image side, a stop 401, a first lens element 410, a second lens element 420, a third lens element 430, an aperture stop 400, a fourth lens element 440, a fifth lens element 450, a sixth lens element 460, an IR-cut filter 470 and an image surface 480. The imaging lens assembly includes six lens elements (410, 420, 430, 440, 450 and 460) with no additional lens element disposed between each of the adjacent six lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has at least one concave critical point in an off-axis region thereof.

The third lens element 430 with positive refractive power has an object-side surface 431 being convex in a paraxial region thereof and an image-side surface 432 being convex in a paraxial region thereof. The third lens element 430 is made of glass material and has the object-side surface 431 and the image-side surface 432 being both spherical. The object-side surface 431 of the third lens element 430 has at least one inflection point.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric.

The IR-cut filter 470 is made of glass material and located between the sixth lens element 460 and the image surface 480, and will not affect the focal length of the imaging lens assembly. The image sensor 490 is disposed on or near the image surface 480 of the imaging lens assembly.

The detailed optical data of the 4th embodiment are shown in Table 7 and the aspheric surface data are shown in Table 8 below.

TABLE 7

4th Embodiment
f = 14.47 mm, Fno = 3.46, HFOV = 9.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.800 | | | | |
| 2 | Lens 1 | 3.198 | (ASP) | 2.028 | Plastic | 1.545 | 56.1 | 6.28 |
| 3 | | 37.828 | (ASP) | 0.176 | | | | |
| 4 | Lens 2 | 9.806 | (ASP) | 0.320 | Plastic | 1.614 | 26.0 | −5.91 |
| 5 | | 2.615 | (ASP) | 0.153 | | | | |
| 6 | Lens 3 | 4.387 | (SPH) | 0.810 | Glass | 1.488 | 70.4 | 7.63 |
| 7 | | −22.977 | (SPH) | 0.412 | | | | |
| 8 | Ape. Stop | Plano | | 0.220 | | | | |
| 9 | Lens 4 | −22.421 | (ASP) | 0.536 | Plastic | 1.544 | 56.0 | −7.14 |
| 10 | | 4.734 | (ASP) | 0.730 | | | | |
| 11 | Lens 5 | −7.660 | (ASP) | 0.455 | Plastic | 1.669 | 19.5 | 14.03 |
| 12 | | −4.319 | (ASP) | 0.357 | | | | |
| 13 | Lens 6 | −6.754 | (ASP) | 0.300 | Plastic | 1.544 | 56.0 | −21.22 |
| 14 | | −16.531 | (ASP) | 0.640 | | | | |
| 15 | IR-cut Filter | Plano | | 0.210 | Glass | 1.517 | 64.2 | — |
| 16 | | Plano | | 5.308 | | | | |
| 17 | Image | Plano | | 0.000 | | | | |

Note:
Reference wavelength is 587.6 nm (d-line).
An effective radius of the stop 401 (Surface 1) is 2.110 mm.
An effective radius of the image-side surface 462 (Surface 14) is 1.530 mm.

TABLE 8

Aspheric Coefficients

| Surface # | 2 | 3 | 4 | 5 | 9 |
|---|---|---|---|---|---|
| k = | 5.2567E−01 | 1.0000E+01 | 2.5909E+01 | 1.0559E+00 | −1.0000E+00 |
| A4 = | −1.2400E−03 | 1.0793E−02 | −3.9140E−02 | −6.1123E−02 | −3.1299E−03 |
| A6 = | −3.3481E−04 | −3.0966E−03 | 1.9375E−02 | 2.6902E−02 | 1.0057E−02 |

TABLE 8-continued

| Aspheric Coefficients | | | | | |
|---|---|---|---|---|---|
| A8 = | 4.7922E−05 | 1.7667E−03 | −7.8822E−03 | −1.3215E−02 | −9.4849E−04 |
| A10 = | −1.2888E−05 | −5.4602E−04 | 1.7124E−03 | 3.4101E−03 | −1.4774E−03 |
| A12 = | 8.3598E−07 | 8.1906E−05 | −1.8780E−04 | −5.3079E−04 | 2.6554E−04 |

| Surface # | 10 | 11 | 12 | 13 | 14 |
|---|---|---|---|---|---|
| k = | 8.9346E+00 | 2.2221E+01 | −1.0000E+00 | 9.8230E+00 | −7.9264E+01 |
| A4 = | −5.2823E−03 | 2.8514E−02 | 4.0343E−02 | −9.9439E−03 | −4.4266E−02 |
| A6 = | −8.0661E−04 | −5.5474E−02 | −7.7303E−02 | −7.4282E−02 | −1.7973E−02 |
| A8 = | 5.3618E−03 | 4.2691E−02 | 5.8791E−02 | 6.9102E−02 | 1.7757E−02 |
| A10 = | −3.2795E−03 | −1.7836E−02 | −2.4013E−02 | −3.0083E−02 | −4.2558E−03 |
| A12 = | −1.5939E−04 | 2.9263E−03 | 3.7842E−03 | 4.9153E−03 | −2.1862E−03 |
| A14 = | — | — | — | −3.6555E−04 | 1.1773E−03 |
| A16 = | — | — | — | 6.9239E−05 | −1.5742E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 14.47 | Dr7r12/Td | 0.37 |
| Fno | 3.46 | |f1/f4| | 0.88 |
| HFOV [deg.] | 9.8 | |f1/f5| + |f1/f6| | 0.74 |
| V1/N1 | 36.30 | |f/f1| + |f/f2| + |f/f3| + |f/f4| + |f/f5| + |f/f6| | 10.39 |
| V2/N2 | 16.09 | (T34 + T56)/T45 | 1.35 |
| V3/N3 | 47.34 | TL [mm] | 12.66 |
| V4/N4 | 36.26 | TL/f | 0.87 |
| V5/N5 | 11.65 | BL/ΣAT | 3.01 |
| V6/N6 | 36.26 | Y11 [mm] | 2.11 |
| V2 + V5 | 45.42 | Y11/Y12 | 1.26 |
| Vmin | 19.5 | Y11/Y21 | 1.29 |
| Td/BL | 1.05 | Y11/Y22 | 1.40 |
| Nmax | 1.669 | Y11/Y31 | 1.40 |
| CT1/CT2 | 6.34 | Y11/Y32 | 1.50 |
| CT1/CT3 | 2.50 | Y11/Y41 | 1.68 |
| CT1/CT4 | 3.78 | Y11/Y42 | 1.71 |
| CT1/CT5 | 4.46 | Y11/Y51 | 1.64 |
| CT1/CT6 | 6.76 | Y11/Y52 | 1.53 |
| ΣCT/CT1 | 2.19 | Y11/Y61 | 1.50 |
| Dr5r12/Td | 0.59 | Y11/Y62 | 1.38 |

5th Embodiment

Figure 9:
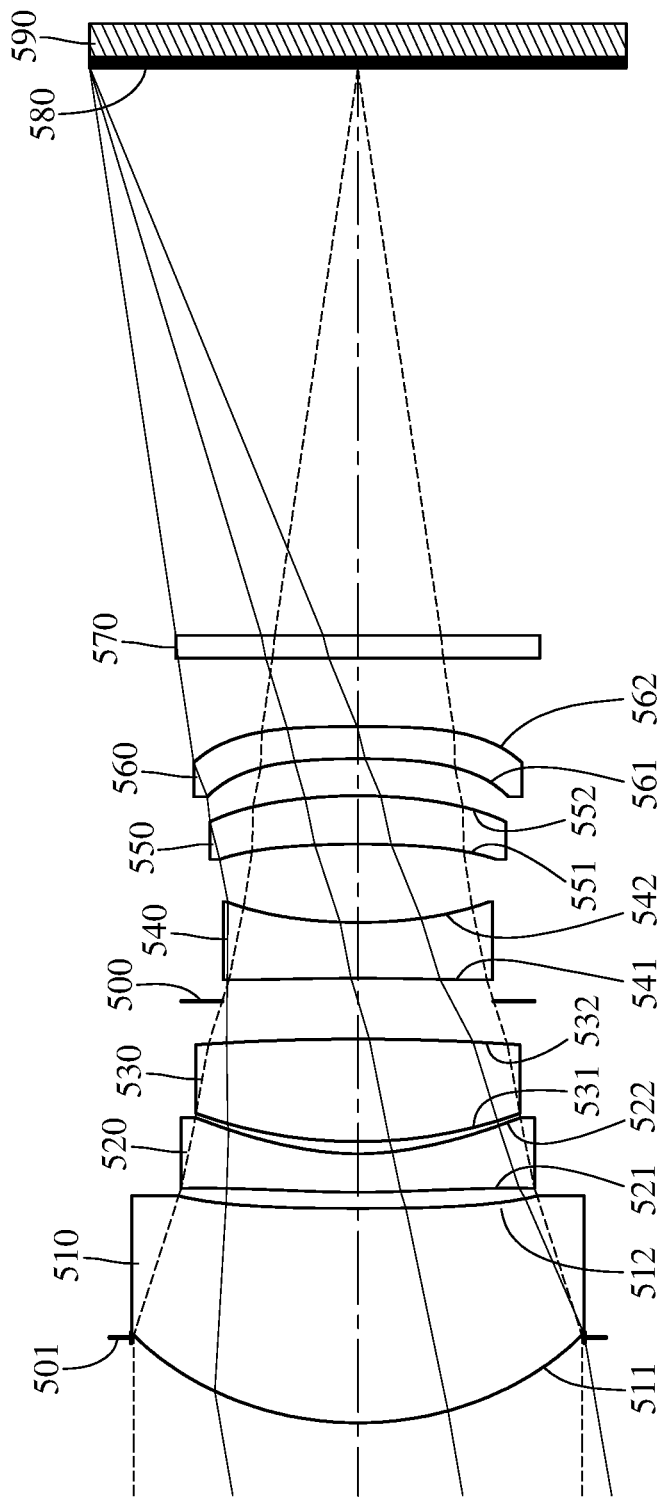
FIG. 9 is a schematic view of an image capturing unit according to the 5th embodiment of the present disclosure.
Figure 10:
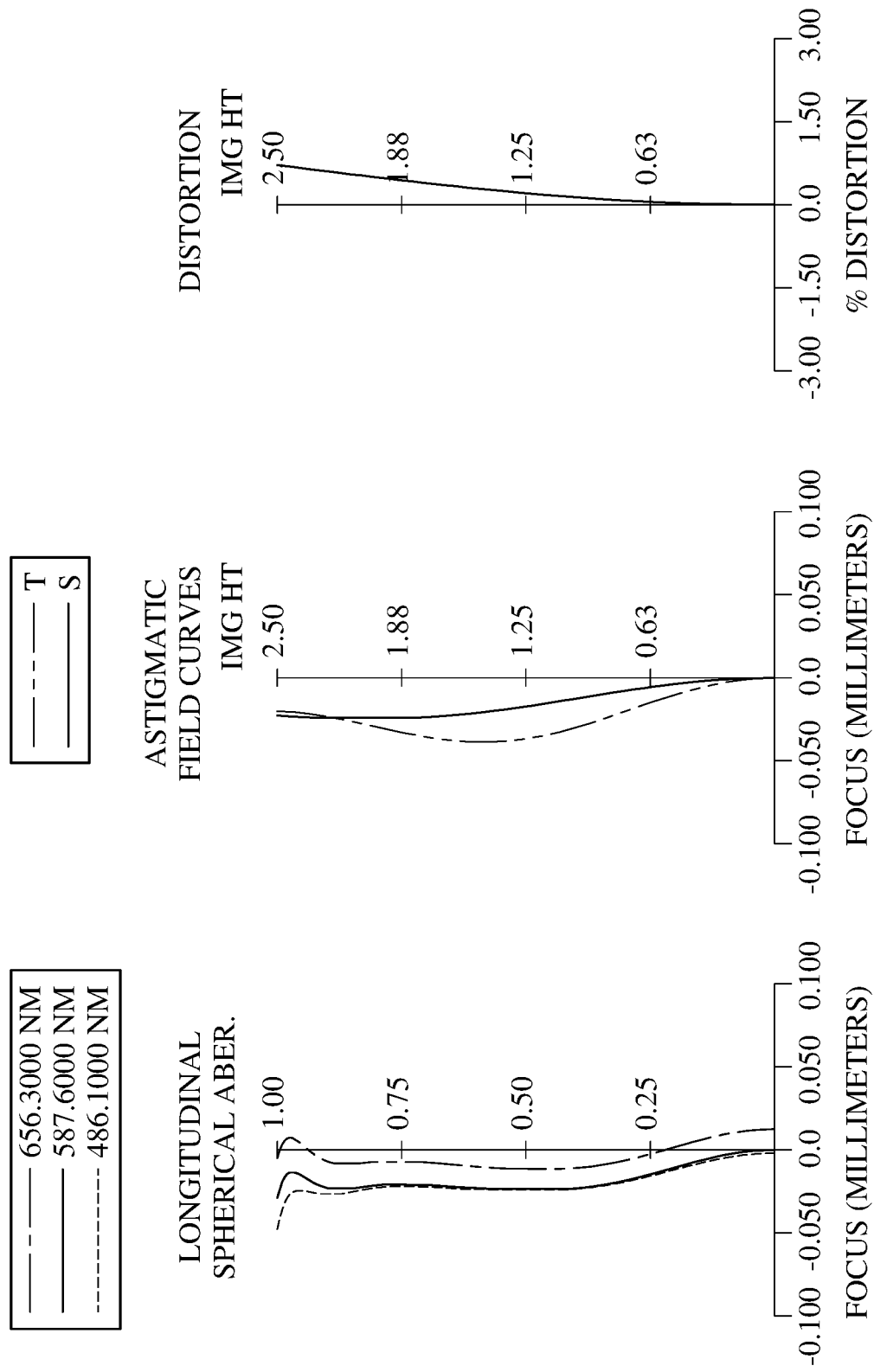
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens assembly (its reference numeral is omitted) of the present disclosure and an image sensor 590. The imaging lens assembly includes, in order from an object side to an image side, a stop 501, a first lens element 510, a second lens element 520, a third lens element 530, an aperture stop 500, a fourth lens element 540, a fifth lens element 550, a sixth lens element 560, an IR-cut filter 570 and an image surface 580. The imaging lens assembly includes six lens elements (510, 520, 530, 540, 550 and 560) with no additional lens element disposed between each of the adjacent six lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has at least one concave critical point in an off-axis region thereof.

The third lens element 530 with positive refractive power has an object-side surface 531 being convex in a paraxial region thereof and an image-side surface 532 being convex in a paraxial region thereof. The third lens element 530 is made of glass material and has the object-side surface 531 and the image-side surface 532 being both spherical.

The fourth lens element 540 with negative refractive power has an object-side surface 541 being concave in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has at least one inflection point. The object-side surface 541 of the fourth lens element 540 has at least one critical point in an off-axis region thereof.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric.

The IR-cut filter 570 is made of glass material and located between the sixth lens element 560 and the image surface 580, and will not affect the focal length of the imaging lens assembly. The image sensor 590 is disposed on or near the image surface 580 of the imaging lens assembly.

The detailed optical data of the 5th embodiment are shown in Table 9 and the aspheric surface data are shown in Table 10 below.

TABLE 9

5th Embodiment
f = 14.46 mm, Fno = 3.46, HFOV = 9.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.820 | | | | |
| 2 | Lens 1 | 3.194 | (ASP) | 2.003 | Plastic | 1.545 | 56.1 | 6.35 |
| 3 | | 32.573 | (ASP) | 0.151 | | | | |
| 4 | Lens 2 | 9.678 | (ASP) | 0.359 | Plastic | 1.614 | 26.0 | −6.01 |
| 5 | | 2.632 | (ASP) | 0.113 | | | | |
| 6 | Lens 3 | 4.457 | (SPH) | 0.960 | Glass | 1.488 | 70.4 | 7.63 |
| 7 | | −20.886 | (SPH) | 0.353 | | | | |
| 8 | Ape. Stop | Plano | | 0.213 | | | | |
| 9 | Lens 4 | −28.341 | (ASP) | 0.521 | Plastic | 1.544 | 56.0 | −7.15 |
| 10 | | 4.538 | (ASP) | 0.732 | | | | |
| 11 | Lens 5 | −8.132 | (ASP) | 0.452 | Plastic | 1.669 | 19.5 | 14.29 |
| 12 | | −4.492 | (ASP) | 0.345 | | | | |
| 13 | Lens 6 | −7.701 | (ASP) | 0.300 | Plastic | 1.544 | 56.0 | −21.06 |
| 14 | | −23.818 | (ASP) | 0.640 | | | | |
| 15 | IR-cut Filter | Plano | | 0.210 | Glass | 1.517 | 64.2 | — |
| 16 | | Plano | | 5.300 | | | | |
| 17 | Image | Plano | | 0.000 | | | | |

Note:
Reference wavelength is 587.6 nm (d-line).
An effective radius of the stop 501 (Surface 1) is 2.110 mm.
An effective radius of the image-side surface 562 (Surface 14) is 1.530 mm.

TABLE 10

Aspheric Coefficients

| Surface # | 2 | 3 | 4 | 5 | 9 |
|---|---|---|---|---|---|
| k = | 5.4787E−01 | 1.0000E+01 | 2.4876E+01 | 1.0802E+00 | −1.0000E+00 |
| A4 = | −9.9427E−04 | 1.1258E−02 | −3.9521E−02 | −6.2335E−02 | −4.3195E−03 |
| A6 = | −3.8060E−04 | −3.0160E−03 | 1.9312E−02 | 2.7291E−02 | 1.0287E−02 |
| A8 = | 5.7651E−05 | 1.6867E−03 | −7.8124E−02 | −1.3208E−02 | −8.7703E−04 |
| A10 = | −1.4400E−05 | −5.3336E−04 | 1.7167E−03 | 3.4641E−03 | −1.2831E−03 |
| A12 = | 8.9748E−07 | 8.3214E−05 | −1.8886E−04 | −5.4031E−04 | 2.3728E−04 |

| Surface # | 10 | 11 | 12 | 13 | 14 |
|---|---|---|---|---|---|
| k = | 8.1452E+00 | 2.4568E+01 | −1.0000E+00 | 1.3462E+01 | −2.1853E+01 |
| A4 = | −5.9677E−03 | 2.8973E−02 | 4.1168E−02 | −1.1998E−02 | −4.4266E−02 |
| A6 = | −1.5061E−03 | −5.7534E−02 | −7.8950E−02 | −7.4282E−02 | −1.7973E−02 |
| A8 = | 4.7083E−03 | 4.3754E−02 | 6.0197E−02 | 6.9102E−02 | 1.7757E−02 |
| A10 = | −2.5235E−03 | −1.9271E−02 | −2.5381E−02 | −3.0083E−02 | −4.2558E−03 |
| A12 = | −1.3053E−04 | 3.9923E−03 | 4.5783E−03 | 4.9153E−03 | −2.1862E−03 |
| A14 = | — | −1.5165E−04 | −1.3696E−04 | −3.6555E−04 | 1.1773E−03 |
| A16 = | — | — | — | 6.9239E−05 | −1.5742E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again. Moreover, these parameters can be calculated from Table 9 and Table 10 as the following values and satisfy the following conditions:

| 5th Embodiment | | | |
|---|---|---|---|
| f [mm] | 14.46 | Dr7r12/Td | 0.36 |
| Fno | 3.46 | $|f1/f4|$ | 0.89 |
| HFOV [deg.] | 9.8 | $|f1/f5| + |f1/f6|$ | 0.75 |
| V1/N1 | 36.30 | $|f/f1| + |f/f2| + |f/f3| + |f/f4| + |f/f5| + |f/f6|$ | 10.30 |

-continued

| 5th Embodiment | | | |
|---|---|---|---|
| V2/N2 | 16.09 | (T34 + T56)/T45 | 1.24 |
| V3/N3 | 47.34 | TL [mm] | 12.65 |
| V4/N4 | 36.26 | TL/f | 0.87 |
| V5/N5 | 11.65 | BL/ΣAT | 3.22 |
| V6/N6 | 36.26 | Y11 [mm] | 2.11 |
| V2 + V5 | 45.42 | Y11/Y12 | 1.26 |

-continued

| 5th Embodiment | | | |
|---|---|---|---|
| Vmin | 19.5 | Y11/Y21 | 1.28 |
| Td/BL | 1.06 | Y11/Y22 | 1.39 |
| Nmax | 1.669 | Y11/Y31 | 1.40 |
| CT1/CT2 | 5.58 | Y11/Y32 | 1.51 |
| CT1/CT3 | 2.09 | Y11/Y41 | 1.68 |
| CT1/CT4 | 3.84 | Y11/Y42 | 1.72 |
| CT1/CT5 | 4.43 | Y11/Y51 | 1.64 |
| CT1/CT6 | 6.68 | Y11/Y52 | 1.53 |
| ΣCT/CT1 | 2.29 | Y11/Y61 | 1.50 |
| Dr5r12/Td | 0.60 | Y11/Y62 | 1.38 |

6th Embodiment

Figure 11:
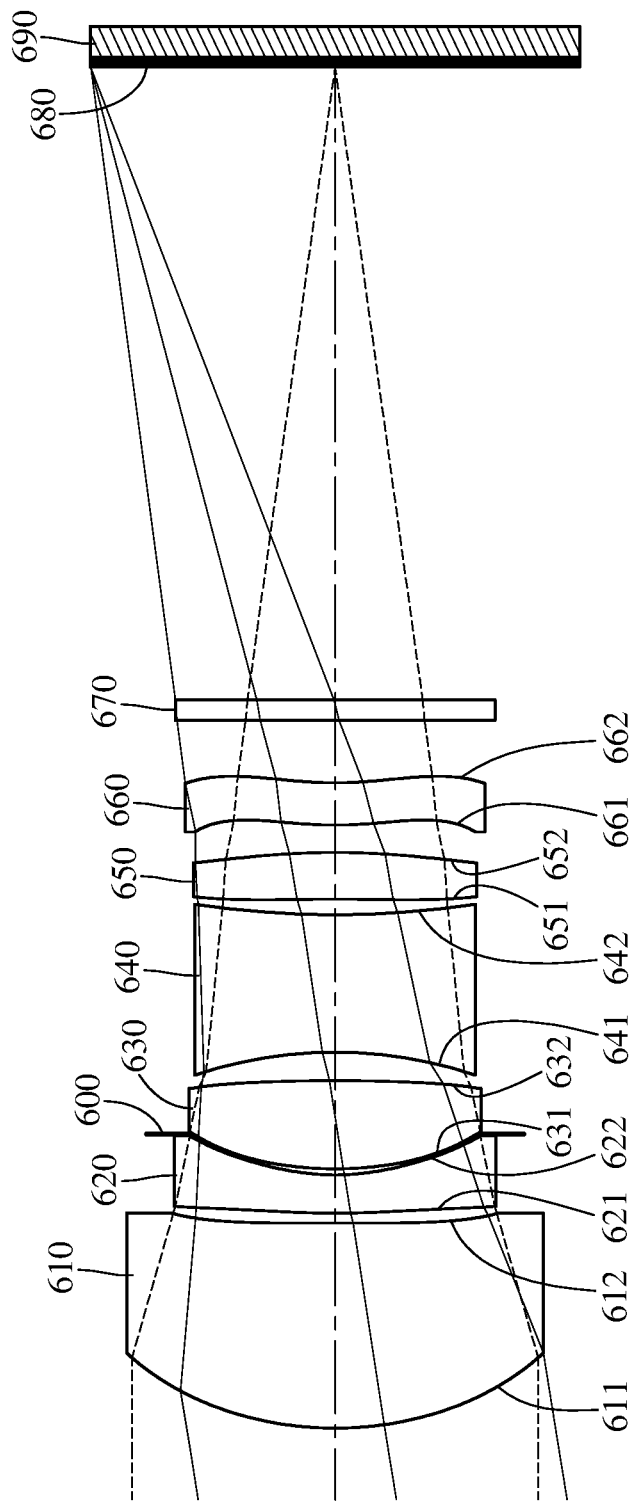
FIG. 11 is a schematic view of an image capturing unit according to the 6th embodiment of the present disclosure.
Figure 12:
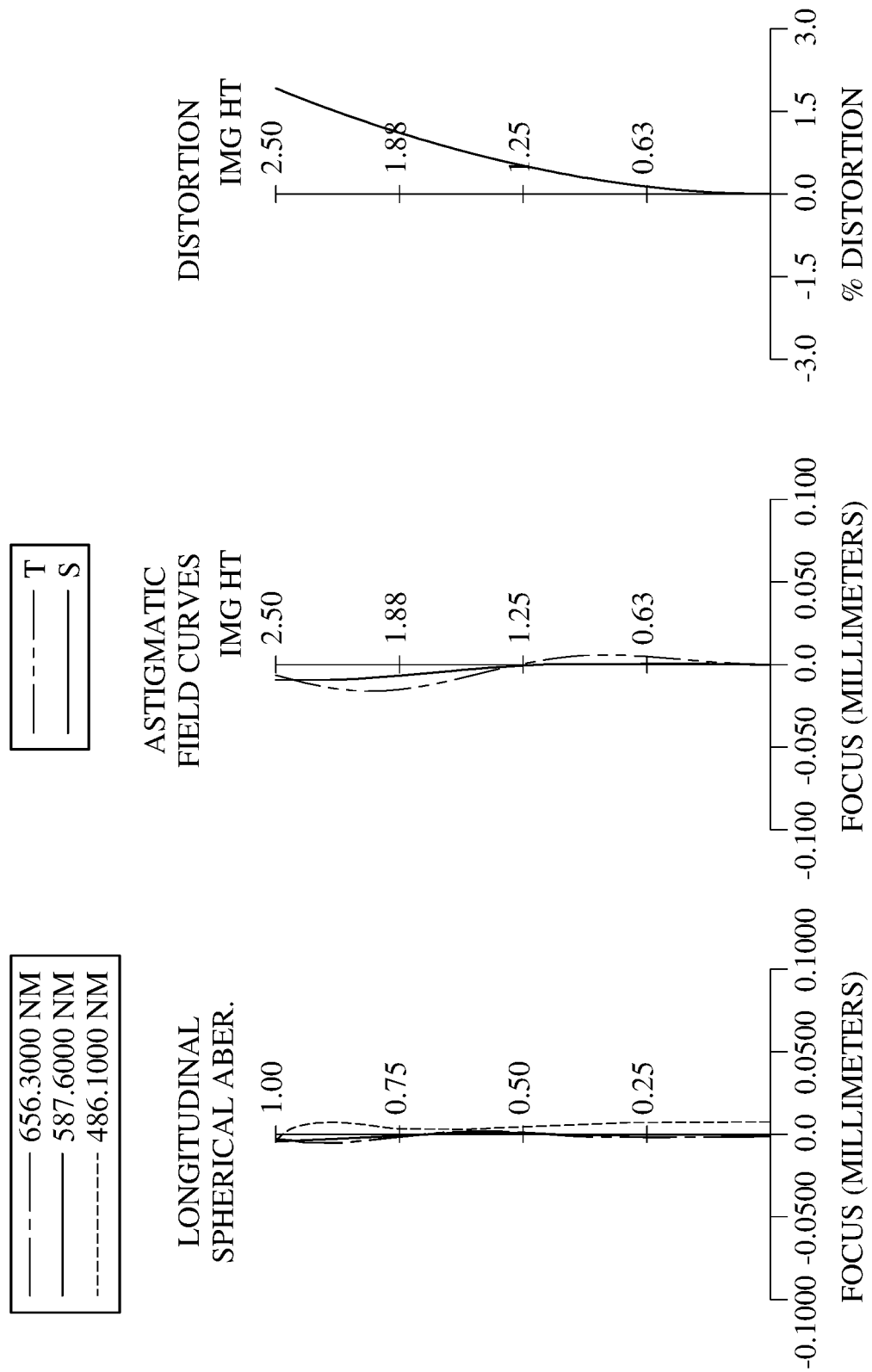
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens assembly (its reference numeral is omitted) of the present disclosure and an image sensor 690. The imaging lens assembly includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680. The imaging lens assembly includes six lens elements (610, 620, 630, 640, 650 and 660) with no additional lens element disposed between each of the adjacent six lens elements.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of glass material and has the object-side surface 641 and the image-side surface 642 being both spherical.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has at least one inflection point. The image-side surface 652 of the fifth lens element 650 has at least one inflection point. The object-side surface 651 of the fifth lens element 650 has at least one critical point in an off-axis region thereof.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one inflection point. The image-side surface 662 of the sixth lens element 660 has at least one inflection point. The object-side surface 661 of the sixth lens element 660 has at least one critical point in an off-axis region thereof. The image-side surface 662 of the sixth lens element 660 has at least one critical point in an off-axis region thereof.

The IR-cut filter 670 is made of glass material and located between the sixth lens element 660 and the image surface 680, and will not affect the focal length of the imaging lens assembly. The image sensor 690 is disposed on or near the image surface 680 of the imaging lens assembly.

The detailed optical data of the 6th embodiment are shown in Table 11 and the aspheric surface data are shown in Table 12 below.

TABLE 11

6th Embodiment
f = 15.16 mm, Fno = 3.65, HFOV = 9.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.597 | (ASP) | 2.100 | Plastic | 1.544 | 56.0 | 6.40 |
| 2 | | −86.874 | (ASP) | 0.100 | | | | |
| 3 | Lens 2 | 8.206 | (ASP) | 0.392 | Plastic | 1.583 | 30.2 | −5.96 |
| 4 | | 2.397 | (ASP) | 0.418 | | | | |
| 5 | Ape. Stop | Plano | | −0.356 | | | | |
| 6 | Lens 3 | 3.756 | (ASP) | 0.903 | Plastic | 1.544 | 56.0 | 5.80 |
| 7 | | −18.042 | (ASP) | 0.291 | | | | |
| 8 | Lens 4 | −4.501 | (SPH) | 1.407 | Glass | 1.699 | 30.1 | −4.23 |
| 9 | | 9.697 | (SPH) | 0.159 | | | | |
| 10 | Lens 5 | −20.637 | (ASP) | 0.479 | Plastic | 1.705 | 14.0 | 15.13 |
| 11 | | −7.100 | (ASP) | 0.280 | | | | |
| 12 | Lens 6 | 4.068 | (ASP) | 0.433 | Plastic | 1.584 | 28.2 | 515.44 |
| 13 | | 3.961 | (ASP) | 0.640 | | | | |

TABLE 11-continued

6th Embodiment
f = 15.16 mm, Fno = 3.65, HFOV = 9.2 deg.

| Surface # | | Curvature Radius | Thickness | Material | Index | Abbe # | Focal Length |
|---|---|---|---|---|---|---|---|
| 14 | IR-cut Filter | Plano | 0.210 | Glass | 1.517 | 64.2 | — |
| 15 | | Plano | 6.478 | | | | |
| 16 | Image | Plano | 0.000 | | | | |

Note:
Reference wavelength is 587.6 nm (d-line).
An effective radius of the object-side surface 611 (Surface 1) is 2.130 mm.
An effective radius of the image-side surface 662 (Surface 13) is 1.530 mm.

TABLE 12

Aspheric Coefficients

| Surface # | 1 | 2 | 3 | 4 | 6 |
|---|---|---|---|---|---|
| k = | 6.5414E−01 | 1.0000E+01 | 1.5761E+01 | 8.2880E−01 | 0.0000E+00 |
| A4 = | −1.4849E−05 | 1.6698E−02 | −3.9489E−02 | −6.6862E−02 | 8.1352E−03 |
| A6 = | −5.8894E−05 | −2.1221E−03 | 1.8676E−02 | 2.9584E−02 | 3.5096E−03 |
| A8 = | 4.5996E−05 | 1.0844E−03 | −7.5885E−03 | −1.2755E−02 | 9.7907E−07 |
| A10 = | −9.6495E−06 | −4.3800E−04 | 1.7021E−03 | 3.3849E−03 | 2.1214E−04 |
| A12 = | 9.6901E−07 | 8.8476E−05 | −1.5341E−04 | −5.3258E−04 | −1.3644E−04 |

| Surface # | 7 | 10 | 11 | 12 | 13 |
|---|---|---|---|---|---|
| k = | 0.0000E+00 | −1.9007E+01 | −1.0000E+00 | −2.5201E+01 | −1.0855E+01 |
| A4 = | 4.3451E−03 | 4.5772E−02 | 4.1364E−02 | −9.5493E−03 | −3.9328E−02 |
| A6 = | −7.4659E−03 | −5.1548E−02 | −7.1129E−02 | −8.2393E−02 | −1.7191E−02 |
| A8 = | 3.0163E−03 | 4.0394E−02 | 6.3146E−02 | 6.9430E−02 | 1.6180E−02 |
| A10 = | −4.1770E−04 | −1.5774E−02 | −2.6426E−02 | −2.8339E−02 | −3.7919E−03 |
| A12 = | −1.1639E−04 | 2.6918E−03 | 4.6943E−03 | 4.3463E−03 | −1.8046E−03 |
| A14 = | — | −1.0550E−04 | −1.9522E−04 | −1.2912E−04 | 1.0659E−03 |
| A16 = | — | — | — | 3.1442E−05 | −1.4776E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 15.16 | Dr7r12/Td | 0.42 |
| Fno | 3.65 | |f1/f4| | 1.51 |
| HFOV [deg.] | 9.2 | |f1/f5| + |f1/f6| | 0.44 |
| V1/N1 | 36.26 | |f/f1| + |f/f2| + |f/f3| + |f/f4| + |f/f5| + |f/f6| | 12.14 |
| V2/N2 | 19.11 | (T34 + T56)/T45 | 3.59 |
| V3/N3 | 36.26 | TL [mm] | 13.93 |
| V4/N4 | 17.70 | TL/f | 0.92 |
| V5/N5 | 8.21 | BL/ΣAT | 8.21 |
| V6/N6 | 17.83 | Y11 [mm] | 2.13 |
| V2 + V5 | 44.24 | Y11/Y12 | 1.28 |
| Vmin | 14.0 | Y11/Y21 | 1.30 |
| Td/BL | 0.90 | Y11/Y22 | 1.44 |
| Nmax | 1.705 | Y11/Y31 | 1.43 |
| CT1/CT2 | 5.36 | Y11/Y32 | 1.46 |
| CT1/CT3 | 2.33 | Y11/Y41 | 1.50 |
| CT1/CT4 | 1.49 | Y11/Y42 | 1.48 |
| CT1/CT5 | 4.38 | Y11/Y51 | 1.47 |
| CT1/CT6 | 4.85 | Y11/Y52 | 1.47 |
| ΣCT/CT1 | 2.72 | Y11/Y61 | 1.48 |
| Dr5r12/Td | 0.60 | Y11/Y62 | 1.39 |

7th Embodiment

Figure 13:
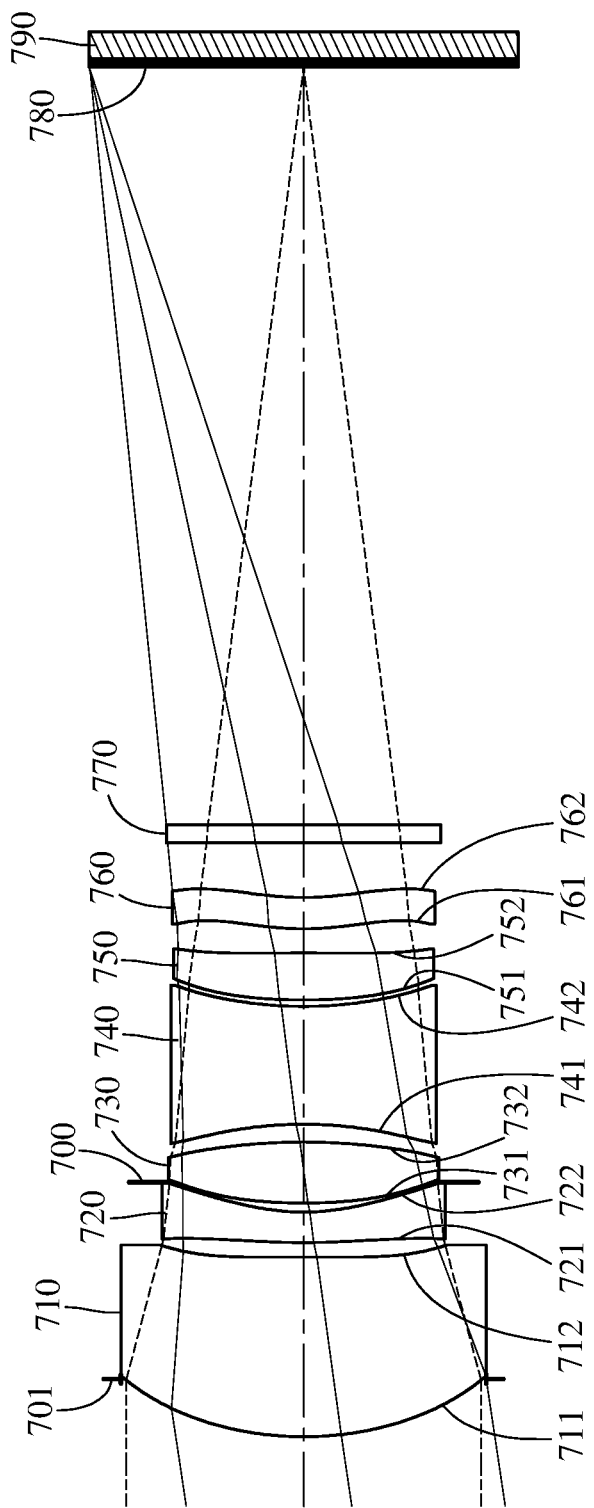
FIG. 13 is a schematic view of an image capturing unit according to the 7th embodiment of the present disclosure.
Figure 14:
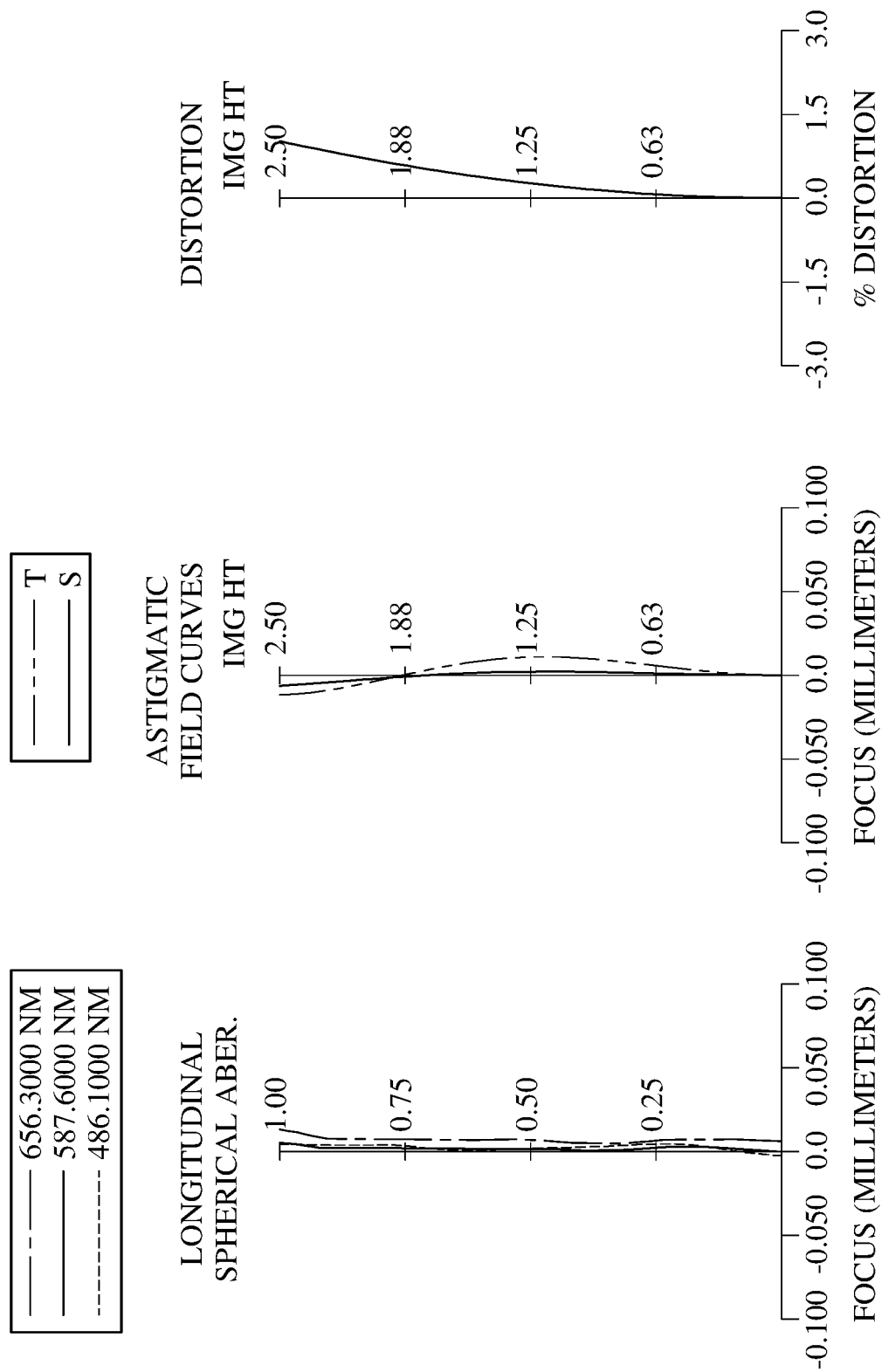
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens assembly (its reference numeral is omitted) of the present disclosure and an image sensor 790. The imaging lens assembly includes, in order from an object side to an image side, a stop 701, a first lens element 710, a second lens element 720, an aperture stop 700, a third lens element 730, a fourth lens element 740, a fifth lens element 750, a sixth lens element 760, an IR-cut filter 770 and an image surface 780. The imaging lens assembly includes six lens elements (710, 720, 730, 740, 750 and 760) with no additional lens element disposed between each of the adjacent six lens elements.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of glass material and has the object-side surface 721 and the image-side surface 722 being both aspheric. The object-side surface 721 of the second lens element 720 has at least one concave critical point in an off-axis region thereof.

The third lens element 730 with positive refractive power has an object-side surface 731 being convex in a paraxial region thereof and an image-side surface 732 being convex in a paraxial region thereof. The third lens element 730 is made of glass material and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of glass material and has the object-side surface 741 and the image-side surface 742 being both aspheric. The object-side surface 741 of the fourth lens element 740 has at least one inflection point.

The fifth lens element 750 with positive refractive power has an object-side surface 751 being convex in a paraxial region thereof and an image-side surface 752 being convex in a paraxial region thereof. The fifth lens element 750 is made of glass material and has the object-side surface 751 and the image-side surface 752 being both aspheric. The image-side surface 752 of the fifth lens element 750 has at least one inflection point. The image-side surface 752 of the fifth lens element 750 has at least one critical point in an off-axis region thereof.

The sixth lens element 760 with positive refractive power has an object-side surface 761 being convex in a paraxial region thereof and an image-side surface 762 being concave in a paraxial region thereof. The sixth lens element 760 is made of glass material and has the object-side surface 761 and the image-side surface 762 being both aspheric. The object-side surface 761 of the sixth lens element 760 has at least one inflection point. The image-side surface 762 of the sixth lens element 760 has at least one inflection point. The object-side surface 761 of the sixth lens element 760 has at least one critical point in an off-axis region thereof. The image-side surface 762 of the sixth lens element 760 has at least one critical point in an off-axis region thereof.

The IR-cut filter 770 is made of glass material and located between the sixth lens element 760 and the image surface 780, and will not affect the focal length of the imaging lens assembly. The image sensor 790 is disposed on or near the image surface 780 of the imaging lens assembly.

The detailed optical data of the 7th embodiment are shown in Table 13 and the aspheric surface data are shown in Table 14 below.

TABLE 13

7th Embodiment
f = 16.57 mm, Fno = 4.00, HFOV = 8.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.690 | | | | |
| 2 | Lens 1 | 3.912 | (ASP) | 2.100 | Plastic | 1.544 | 56.0 | 6.72 |
| 3 | | −45.677 | (ASP) | 0.168 | | | | |
| 4 | Lens 2 | 7.925 | (ASP) | 0.356 | Glass | 1.693 | 33.7 | −5.54 |
| 5 | | 2.539 | (ASP) | 0.349 | | | | |
| 6 | Ape. Stop | Plano | | −0.243 | | | | |
| 7 | Lens 3 | 6.292 | (ASP) | 0.713 | Glass | 1.587 | 59.5 | 5.81 |
| 8 | | −7.129 | (ASP) | 0.208 | | | | |
| 9 | Lens 4 | −4.845 | (ASP) | 1.377 | Glass | 1.723 | 29.2 | −3.14 |
| 10 | | 4.760 | (ASP) | 0.076 | | | | |
| 11 | Lens 5 | 8.004 | (ASP) | 0.549 | Glass | 2.002 | 20.7 | 6.14 |
| 12 | | −25.600 | (ASP) | 0.282 | | | | |
| 13 | Lens 6 | 3.363 | (ASP) | 0.366 | Glass | 1.756 | 45.6 | 80.65 |
| 14 | | 3.392 | (ASP) | 0.640 | | | | |
| 15 | IR-cut Filter | Plano | | 0.210 | Glass | 1.517 | 64.2 | — |
| 16 | | Plano | | 8.852 | | | | |
| 17 | Image | Plano | | 0.000 | | | | |

Note:
Reference wavelength is 587.6 nm (d-line).
An effective radius of the stop 701 (Surface 1) is 2.130 mm.
An effective radius of the image-side surface 762 (Surface 14) is 1.530 mm.

TABLE 14

Aspheric Coefficients

| Surface # | 2 | 3 | 4 | 5 | 7 |
|---|---|---|---|---|---|
| k = | 9.9825E−01 | 1.0000E+01 | 1.4880E+01 | 6.4121E−01 | 0.0000E+00 |
| A4 = | −2.8156E−04 | 2.3455E−02 | −4.1065E−02 | −6.8362E−02 | 1.1764E−02 |
| A6 = | 1.0381E−04 | −9.1608E−04 | 1.8500E−02 | 2.8664E−02 | 3.9540E−03 |
| A8 = | 6.2020E−06 | 9.9126E−04 | −7.6847E−03 | −1.2873E−02 | −1.0016E−03 |
| A10 = | −6.0094E−06 | −4.8367E−04 | 1.6495E−03 | 3.2506E−03 | 3.0057E−05 |
| A12 = | 1.5015E−06 | 8.2367E−05 | −1.7495E−04 | −5.5918E−04 | −1.4842E−04 |

TABLE 14-continued

| Aspheric Coefficients | | | | |
|---|---|---|---|---|
| A14 = −2.5840E−07 | −1.0950E−07 | −5.6231E−06 | 1.9346E−05 | −2.1199E−06 |
| A16 = 2.0849E−08 | −2.8326E−06 | 1.2765E−06 | 1.3355E−05 | 8.1071E−06 |

| Surface # | 8 | 9 | 10 | 11 | 12 |
|---|---|---|---|---|---|
| k = | 0.0000E+00 | 0.0000E+00 | 0.0000E+00 | 1.1819E+01 | −1.0000E+00 |
| A4 = | 5.9022E−03 | −3.2802E−03 | −3.8102E−03 | 4.5519E−02 | 5.2152E−02 |
| A6 = | −8.1938E−03 | 2.6602E−03 | −1.6165E−03 | −5.0263E−02 | −6.9758E−02 |
| A8 = | 4.3297E−03 | −4.2710E−04 | 3.3180E−03 | 3.9705E−02 | 6.2372E−02 |
| A10 = | −5.5664E−04 | 5.1950E−04 | −3.2859E−04 | −1.5543E−02 | −2.6634E−02 |
| A12 = | −2.0603E−04 | 3.8739E−05 | −1.6992E−04 | 2.6047E−03 | 4.8579E−03 |
| A14 = | 2.1728E−05 | −1.0953E−04 | −7.4283E−05 | −1.1451E−04 | −2.0970E−04 |
| A16 = | 4.2534E−06 | 2.5387E−05 | 2.9460E−05 | −3.0390E−06 | −1.0827E−05 |

| Surface # | 13 | 14 |
|---|---|---|
| k = | −1.4400E+01 | −7.4707E+00 |
| A4 = | 4.0392E−03 | −3.5686E−02 |
| A6 = | −7.8642E−02 | −1.5809E−02 |
| A8 = | 6.8548E−02 | 1.6446E−02 |
| A10 = | −2.8434E−02 | −3.9222E−03 |
| A12 = | 4.6287E−03 | −1.8231E−03 |
| A14 = | 5.1402E−06 | 1.0701E−03 |
| A16 = | −3.9505E−05 | −1.4779E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 16.57 | Dr7r12/Td | 0.42 |
| Fno | 4.00 | |f1/f4| | 2.14 |
| HFOV [deg.] | 8.5 | |f1/f5| + |f1/f6| | 1.18 |
| V1/N1 | 36.26 | |f/f1| + |f/f2| + |f/f3| + |f/f4| + |f/f5| + |f/f6| | 16.50 |
| V2/N2 | 19.93 | (T34 + T56)/T45 | 6.45 |
| V3/N3 | 37.48 | TL [mm] | 16.00 |
| V4/N4 | 16.97 | TL/f | 0.97 |
| V5/N5 | 10.32 | BL/ΣAT | 11.55 |
| V6/N6 | 25.97 | Y11 [mm] | 2.12 |
| V2 + V5 | 54.40 | Y11/Y12 | 1.27 |
| Vmin | 20.7 | Y11/Y21 | 1.29 |
| Td/BL | 0.65 | Y11/Y22 | 1.32 |
| Nmax | 2.002 | Y11/Y31 | 1.35 |
| CT1/CT2 | 5.90 | Y11/Y32 | 1.31 |
| CT1/CT3 | 2.95 | Y11/Y41 | 1.33 |
| CT1/CT4 | 1.53 | Y11/Y42 | 1.39 |
| CT1/CT5 | 3.83 | Y11/Y51 | 1.37 |
| CT1/CT6 | 5.74 | Y11/Y52 | 1.40 |
| ΣCT/CT1 | 2.60 | Y11/Y61 | 1.40 |
| Dr5r12/Td | 0.57 | Y11/Y62 | 1.38 |

8th Embodiment

Figure 15:
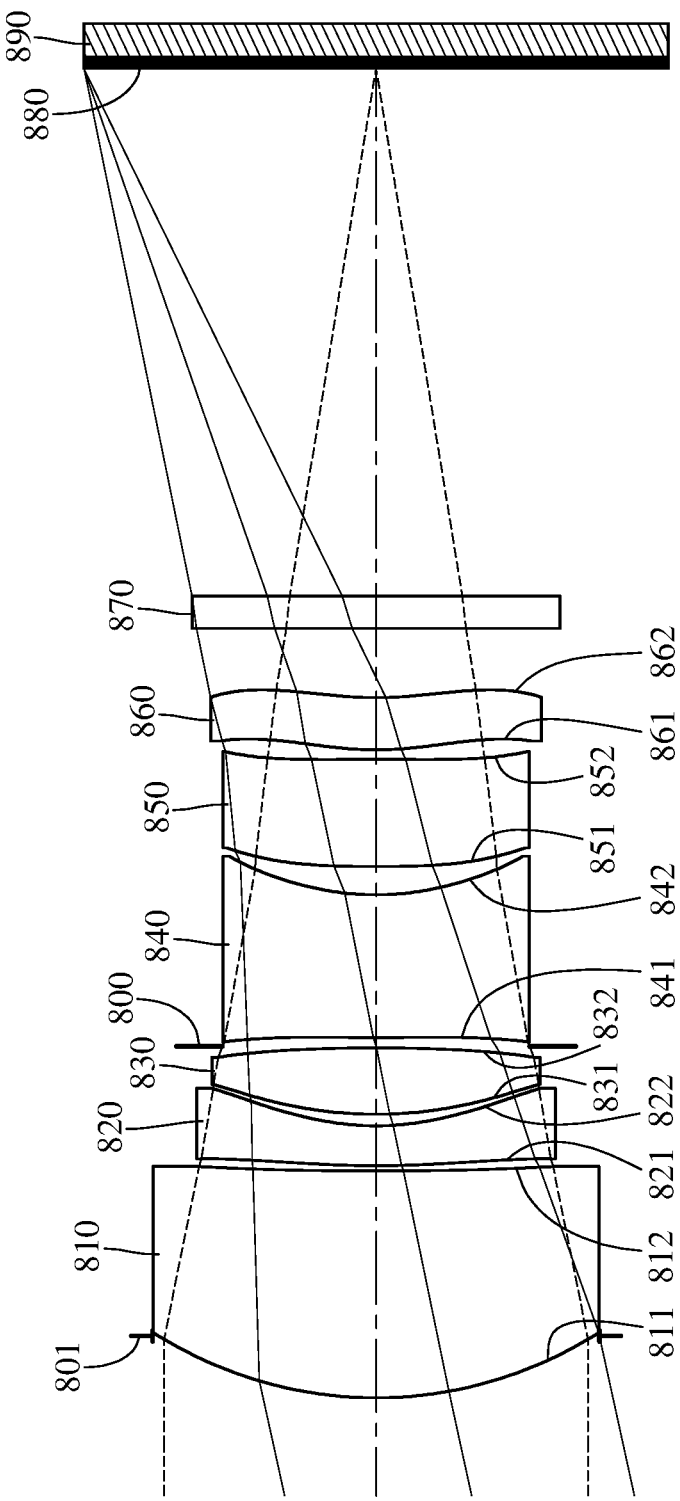
FIG. 15 is a schematic view of an image capturing unit according to the 8th embodiment of the present disclosure.
Figure 16:
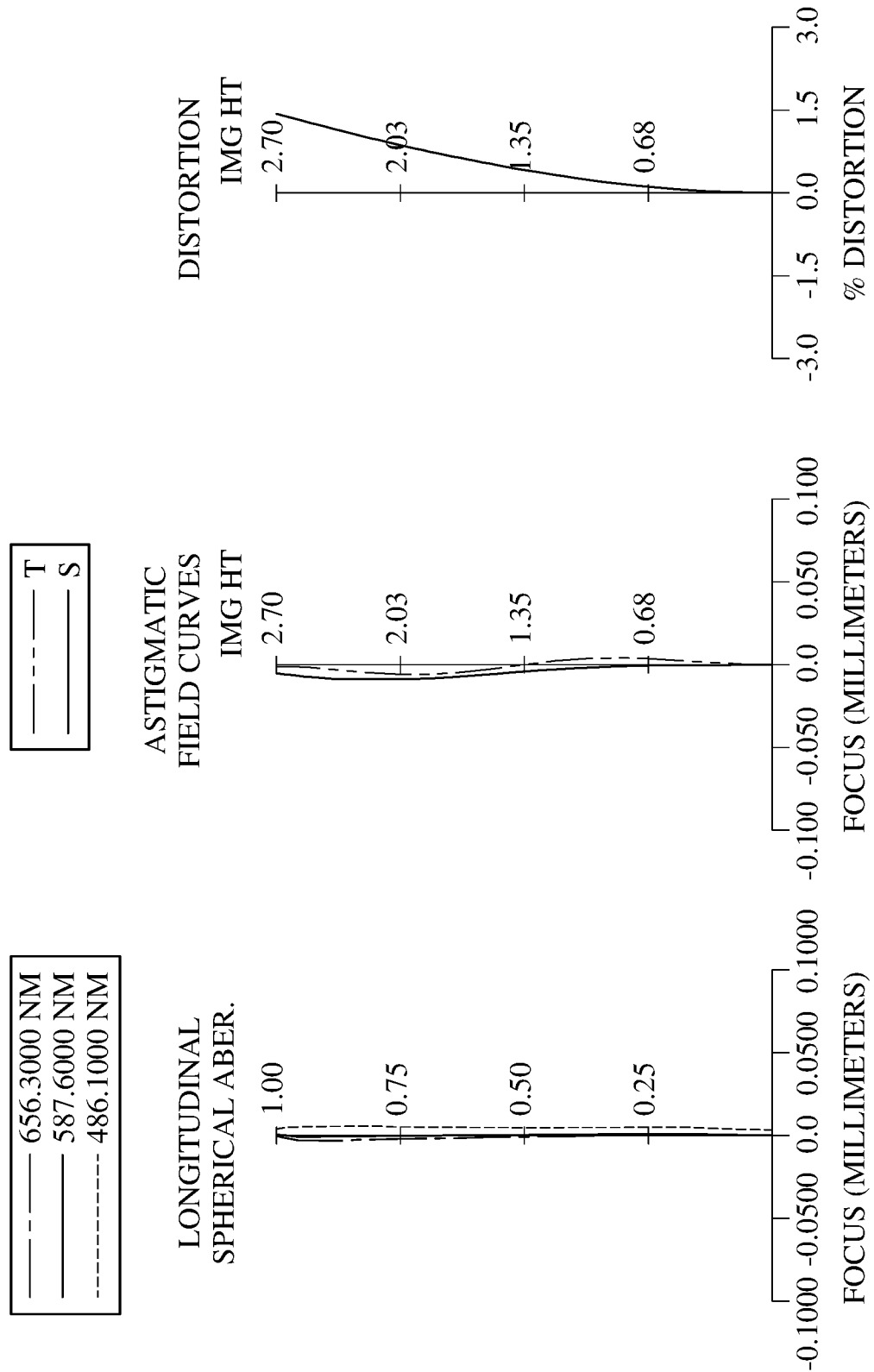
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens assembly (its reference numeral is omitted) of the present disclosure and an image sensor 890. The imaging lens assembly includes, in order from an object side to an image side, a stop 801, a first lens element 810, a second lens element 820, a third lens element 830, an aperture stop 800, a fourth lens element 840, a fifth lens element 850, a sixth lens element 860, an IR-cut filter 870 and an image surface 880. The imaging lens assembly includes six lens elements (810, 820, 830, 840, 850 and 860) with no additional lens element disposed between each of the adjacent six lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has at least one concave critical point in an off-axis region thereof.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has at least one inflection point. The object-side surface 841 of the fourth lens element 840 has at least one critical point in an off-axis region thereof.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric. The image-side surface 852 of the fifth lens element 850 has at least one inflection point. The image-side surface 852 of the fifth lens element 850 has at least one critical point in an off-axis region thereof.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has at least one inflection point. The image-side surface 862 of the sixth lens element 860 has at least one inflection point. The object-side surface 861 of the sixth lens element 860 has at least one critical point in an off-axis region thereof. The image-side surface 862 of the sixth lens element 860 has at least one critical point in an off-axis region thereof.

The IR-cut filter 870 is made of glass material and located between the sixth lens element 860 and the image surface 880, and will not affect the focal length of the imaging lens assembly. The image sensor 890 is disposed on or near the image surface 880 of the imaging lens assembly.

The detailed optical data of the 8th embodiment are shown in Table 15 and the aspheric surface data are shown in Table 16 below.

TABLE 15

8th Embodiment
f = 12.15 mm, Fno = 3.10, HFOV = 12.4 deg.

| Surface # |           | Curvature Radius |       | Thickness | Material | Index | Abbe # | Focal Length |
|-----------|-----------|------------------|-------|-----------|----------|-------|--------|--------------|
| 0         | Object    | Plano            |       | Infinity  |          |       |        |              |
| 1         | Stop      | Plano            |       | −0.596    |          |       |        |              |
| 2         | Lens 1    | 3.760            | (ASP) | 2.100     | Plastic  | 1.544 | 56.0   | 7.37         |
| 3         |           | 48.848           | (ASP) | 0.048     |          |       |        |              |
| 4         | Lens 2    | 7.956            | (ASP) | 0.369     | Plastic  | 1.583 | 30.2   | −6.14        |
| 5         |           | 2.424            | (ASP) | 0.108     |          |       |        |              |
| 6         | Lens 3    | 4.016            | (ASP) | 0.614     | Plastic  | 1.544 | 56.0   | 5.91         |
| 7         |           | −15.210          | (ASP) | 0.013     |          |       |        |              |
| 8         | Ape. Stop | Plano            |       | 0.082     |          |       |        |              |
| 9         | Lens 4    | 26.794           | (ASP) | 1.322     | Plastic  | 1.583 | 30.2   | −5.00        |
| 10        |           | 2.581            | (ASP) | 0.262     |          |       |        |              |
| 11        | Lens 5    | 19.485           | (ASP) | 0.992     | Plastic  | 1.679 | 18.4   | 18.13        |
| 12        |           | −32.755          | (ASP) | 0.088     |          |       |        |              |
| 13        | Lens 6    | 3.029            | (ASP) | 0.483     | Plastic  | 1.614 | 26.0   | 25.59        |
| 14        |           | 3.526            | (ASP) | 0.640     |          |       |        |              |
| 15        | IR-cut Filter | Plano        |       | 0.300     | Glass    | 1.517 | 64.2   | —            |
| 16        |           | Plano            |       | 4.885     |          |       |        |              |
| 17        | Image     | Plano            |       | 0.000     |          |       |        |              |

Note:
Reference wavelength is 587.6 nm (d-line).
An effective radius of the stop 801 (Surface 1) is 2.060 mm.
An effective radius of the image-side surface 862 (Surface 14) is 1.530 mm.

TABLE 16

Aspheric Coefficients

| Surface # | 2 | 3 | 4 | 5 | 6 |
|---|---|---|---|---|---|
| k =   | 6.7045E−01  | −4.6794E+01 | 1.6203E+01  | 6.8345E−01  | 0.0000E+00  |
| A4 =  | −2.0116E−03 | 4.8645E−03  | −3.7739E−02 | −6.3080E−02 | 4.5174E−03  |
| A6 =  | −2.6437E−04 | −2.8038E−03 | 1.8587E−02  | 2.7788E−02  | −2.5431E−03 |
| A8 =  | 1.7736E−06  | 1.4225E−03  | −7.8671E−03 | −1.4023E−02 | −8.5223E−05 |
| A10 = | 6.1120E−07  | −4.2238E−04 | 1.6082E−03  | 2.9802E−03  | −5.2810E−05 |
| A12 = | −4.3992E−07 | 4.5741E−05  | −1.6515E−04 | −3.8785E−04 | −3.3864E−05 |

| Surface # | 7 | 9 | 10 | 11 | 12 |
|---|---|---|---|---|---|
| k =   | 0.0000E+00  | −1.0000E+00 | −2.7997E+00 | 9.0000E+01  | −1.0000E+00 |
| A4 =  | 8.4180E−04  | −3.2464E−02 | 1.2030E−02  | 7.1369E−02  | 4.9060E−02  |
| A6 =  | −2.2821E−03 | 9.6011E−03  | −1.7327E−02 | −5.4481E−02 | −5.7686E−02 |
| A8 =  | −2.3898E−04 | −1.2627E−03 | 1.8368E−02  | 3.6285E−02  | 5.9017E−02  |
| A10 = | 1.9337E−04  | −4.0352E−04 | −7.0646E−03 | −1.3872E−02 | −2.7621E−02 |
| A12 = | −2.6851E−05 | 1.3091E−04  | 1.0913E−03  | 2.4425E−03  | 5.5049E−03  |
| A14 = | —           | —           | —           | −1.3971E−04 | −3.3622E−04 |

| Surface # | 13 | 14 |
|---|---|---|
| k =  | −1.3874E+01 | −1.9692E+01 |
| A4 = | −1.2494E−02 | −3.2860E−02 |

TABLE 16-continued

| Aspheric Coefficients | | |
| --- | --- | --- |
| A6 = | −6.7359E−02 | −1.6663E−02 |
| A8 = | 6.8520E−02 | 1.4395E−02 |
| A10 = | −3.0146E−02 | −2.9120E−03 |
| A12 = | 5.2959E−03 | −1.7909E−03 |
| A14 = | −1.1870E−04 | 9.4766E−04 |
| A16 = | −2.5616E−05 | −1.2836E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
| --- | --- | --- | --- |
| f [mm] | 12.15 | Dr7r12/Td | 0.49 |
| Fno | 3.10 | \|f1/f4\| | 1.47 |
| HFOV [deg.] | 12.4 | \|f1/f5\| + \|f1/f6\| | 0.69 |
| V1/N1 | 36.26 | \|f/f1\| + \|f/f2\| + \|f/f3\| + \|f/f4\| + \|f/f5\| + \|f/f6\| | 9.26 |
| V2/N2 | 19.11 | (T34 + T56)/T45 | 0.70 |
| V3/N3 | 36.26 | TL [mm] | 12.31 |
| V4/N4 | 19.11 | TL/f | 1.01 |
| V5/N5 | 10.98 | BL/ΣAT | 9.69 |
| V6/N6 | 16.09 | Y11 [mm] | 2.06 |
| V2 + V5 | 48.68 | Y11/Y12 | 1.22 |
| Vmin | 18.4 | Y11/Y21 | 1.24 |
| Td/BL | 1.11 | Y11/Y22 | 1.35 |
| Nmax | 1.679 | Y11/Y31 | 1.36 |
| CT1/CT2 | 5.69 | Y11/Y32 | 1.40 |
| CT1/CT3 | 3.42 | Y11/Y41 | 1.45 |
| CT1/CT4 | 1.59 | Y11/Y42 | 1.52 |
| CT1/CT5 | 2.12 | Y11/Y51 | 1.49 |
| CT1/CT6 | 4.35 | Y11/Y52 | 1.46 |
| ΣCT/CT1 | 2.80 | Y11/Y61 | 1.43 |
| Dr5r12/Td | 0.59 | Y11/Y62 | 1.35 |

9th Embodiment

Figure 17:
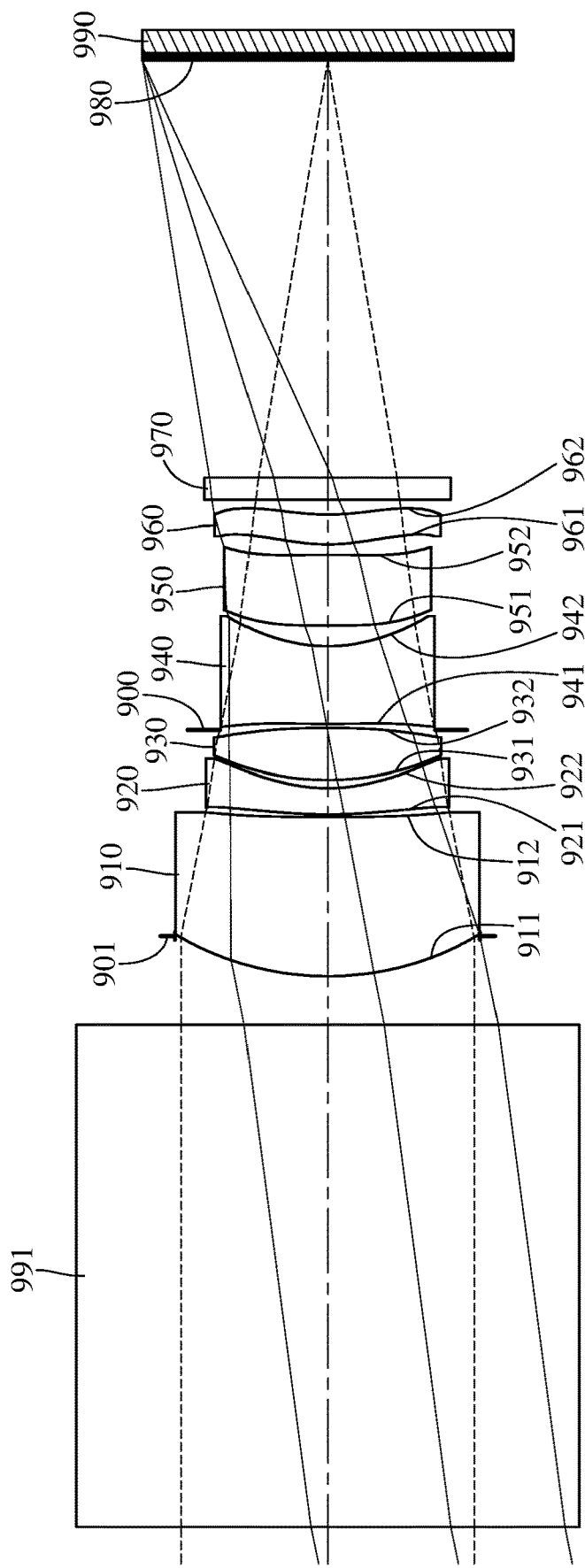
FIG. 17 is a schematic view of an image capturing unit according to the 9th embodiment of the present disclosure.
Figure 18:
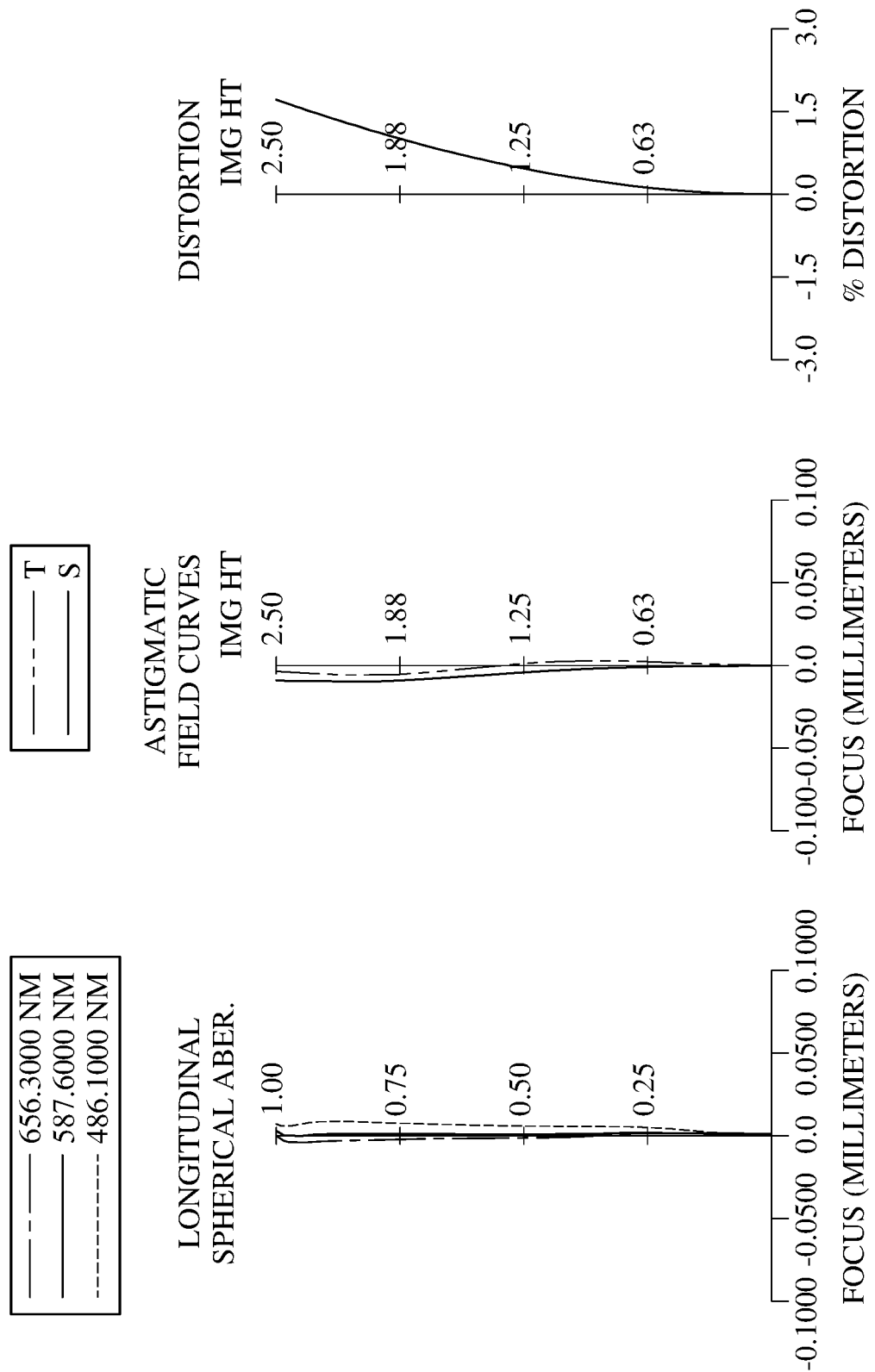
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens assembly (its reference numeral is omitted) of the present disclosure and an image sensor 990. The imaging lens assembly includes, in order from an object side to an image side, a prism 991, a stop 901, a first lens element 910, a second lens element 920, a third lens element 930, an aperture stop 900, a fourth lens element 940, a fifth lens element 950, a sixth lens element 960, an IR-cut filter 970 and an image surface 980. The imaging lens assembly includes six lens elements (910, 920, 930, 940, 950 and 960) with no additional lens element disposed between each of the adjacent six lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has at least one concave critical point in an off-axis region thereof.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has at least one inflection point. The object-side surface 941 of the fourth lens element 940 has at least one critical point in an off-axis region thereof.

The fifth lens element 950 with positive refractive power has an object-side surface 951 being convex in a paraxial region thereof and an image-side surface 952 being convex in a paraxial region thereof. The fifth lens element 950 is made of plastic material and has the object-side surface 951 and the image-side surface 952 being both aspheric. The image-side surface 952 of the fifth lens element 950 has at least one inflection point. The image-side surface 952 of the fifth lens element 950 has at least one critical point in an off-axis region thereof.

The sixth lens element 960 with positive refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has at least one inflection point. The image-side surface 962 of the sixth lens element 960 has at least one inflection point. The object-side surface 961 of the sixth lens element 960 has at least one critical point in an off-axis region thereof. The image-side surface 962 of the sixth lens element 960 has at least one critical point in an off-axis region thereof.

The IR-cut filter 970 is made of glass material and located between the sixth lens element 960 and the image surface 980, and will not affect the focal length of the imaging lens assembly. The image sensor 990 is disposed on or near the image surface 980 of the imaging lens assembly.

The detailed optical data of the 9th embodiment are shown in Table 17 and the aspheric surface data are shown in Table 18 below.

In the 9th embodiment, the equation of the aspheric surface profiles of the aforementioned lens elements is the same as the equation of the 1st embodiment. Also, the

TABLE 17

9th Embodiment
f = 12.09 mm, Fno = 3.05, HFOV = 11 5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Prism | Plano | | 6.800 | Glass | 1.517 | 64.2 | — |
| 2 | | Plano | | 1.200 | | | | |
| 3 | Stop | Plano | | −0.548 | | | | |
| 4 | Lens 1 | 4.041 | (ASP) | 2.157 | Plastic | 1.544 | 56.0 | 7.76 |
| 5 | | 76.835 | (ASP) | 0.035 | | | | |
| 6 | Lens 2 | 6.426 | (ASP) | 0.356 | Plastic | 1.583 | 30.2 | −6.59 |
| 7 | | 2.353 | (ASP) | 0.112 | | | | |
| 8 | Lens 3 | 4.059 | (ASP) | 0.700 | Plastic | 1.544 | 56.0 | 5.59 |
| 9 | | −11.419 | (ASP) | −0.027 | | | | |
| 10 | Ape. Stop | Plano | | 0.079 | | | | |
| 11 | Lens 4 | 13.084 | (ASP) | 1.058 | Plastic | 1.583 | 30.2 | −4.77 |
| 12 | | 2.221 | (ASP) | 0.278 | | | | |
| 13 | Lens 5 | 64.839 | (ASP) | 0.961 | Plastic | 1.679 | 18.4 | 19.30 |
| 14 | | −16.336 | (ASP) | 0.142 | | | | |
| 15 | Lens 6 | 2.725 | (ASP) | 0.395 | Plastic | 1.614 | 26.0 | 23.96 |
| 16 | | 3.161 | (ASP) | 0.200 | | | | |
| 17 | IR-cut Filter | Plano | | 0.300 | Glass | 1.517 | 64.2 | — |
| 18 | | Plano | | 5.653 | | | | |
| 19 | Image | Plano | | 0.000 | | | | |

Note:
Reference wavelength is 587.6 nm (d-line).
An effective radius of the stop 901 (Surface 3) is 2.060 mm.
An effective radius of the image-side surface 962 (Surface 16) is 1.530 mm.

TABLE 18

Aspheric Coefficients

| Surface # | 4 | 5 | 6 | 7 | 8 |
|---|---|---|---|---|---|
| k = | 1.1976E+00 | 1.0000E+01 | 9.8016E+00 | 5.7415E−01 | 0.0000E+00 |
| A4 = | −2.2756E−03 | 9.1717E−03 | −3.6481E−02 | −5.5584E−02 | 1.2503E−02 |
| A6 = | −2.4167E−04 | −1.9156E−03 | 1.8393E−02 | 2.7666E−02 | −2.2218E−03 |
| A8 = | −1.0344E−05 | 1.1728E−03 | −8.0153E−03 | −1.3996E−02 | 5.7148E−05 |
| A10 = | 5.2751E−06 | −3.8960E−04 | 1.5100E−03 | 2.7544E−03 | 3.4151E−05 |
| A12 = | −1.4023E−06 | 2.1439E−05 | −1.5701E−04 | −3.4812E−04 | −1.1351E−04 |

| Surface # | 9 | 11 | 12 | 13 | 14 |
|---|---|---|---|---|---|
| k = | 0.0000E+00 | −1.0000E+00 | −2.6674E+00 | 9.0000E+01 | −1.0000E+00 |
| A4 = | −7.1420E−03 | −4.9370E−02 | 1.7393E−02 | 1.0002E−01 | 6.7777E−02 |
| A6 = | −1.7364E−03 | 1.0094E−02 | −1.6967E−02 | −5.6506E−02 | −5.1802E−02 |
| A8 = | 7.4000E−04 | 7.8516E−04 | 1.3482E−02 | 3.5304E−02 | 5.4264E−02 |
| A10 = | 4.8608E−04 | −2.9692E−04 | −4.5864E−03 | −1.5296E−02 | −2.7463E−02 |
| A12 = | −1.6206E−04 | 1.8899E−05 | 6.6567E−04 | 3.3691E−03 | 5.7346E−03 |
| A14 = | — | — | — | −2.8133E−04 | −3.1979E−04 |

| Surface # | 15 | 16 |
|---|---|---|
| k = | −9.9774E+00 | −1.5333E+01 |
| A4 = | −1.0389E−02 | −3.4803E−02 |
| A6 = | −5.7016E−02 | −1.6464E−02 |
| A8 = | 6.1382E−02 | 1.5985E−02 |
| A10 = | −3.0489E−02 | −4.4964E−03 |
| A12 = | 6.2473E−03 | −1.7956E−03 |
| A14 = | −2.4162E−04 | 1.1924E−03 |
| A16 = | −6.3592E−05 | −1.8856E−04 | definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 12.09 | Dr7r12/Td | 0.45 |
| Fno | 3.05 | |f1/f4| | 1.63 |
| HFOV [deg.] | 11.5 | |f1/f5| + |f1/f6| | 0.73 |
| V1/N1 | 36.26 | |f/f1| + |f/f2| + |f/f3| + |f/f4| + |f/f5| + |f/f6| | 9.23 |
| V2/N2 | 19.11 | (T34 + T56)/T45 | 0.70 |
| V3/N3 | 36.26 | TL [mm] | 12.40 |
| V4/N4 | 19.11 | TL/f | 1.03 |
| V5/N5 | 10.98 | BL/ΣAT | 9.94 |
| V6/N6 | 16.09 | Y11 [mm] | 2.06 |
| V2 + V5 | 48.68 | Y11/Y12 | 1.23 |
| Vmin | 18.4 | Y11/Y21 | 1.25 |
| Td/BL | 1.02 | Y11/Y22 | 1.34 |
| Nmax | 1.679 | Y11/Y31 | 1.34 |
| CT1/CT2 | 6.06 | Y11/Y32 | 1.38 |
| CT1/CT3 | 3.08 | Y11/Y41 | 1.42 |
| CT1/CT4 | 2.04 | Y11/Y42 | 1.51 |
| CT1/CT5 | 2.24 | Y11/Y51 | 1.48 |
| CT1/CT6 | 5.46 | Y11/Y52 | 1.47 |
| ΣCT/CT1 | 2.61 | Y11/Y61 | 1.42 |
| Dr5r12/Td | 0.57 | Y11/Y62 | 1.34 |

10th Embodiment

FIG. 19 is a schematic view of a second lens element of an image capturing unit according to the 10th embodiment of the present disclosure. In this embodiment, an image capturing unit 10 includes the imaging lens assembly (not numbered) of the present disclosure, a lens barrel (not shown) and an image sensor (not shown). The imaging lens assembly is disposed in the lens barrel, and the image sensor is disposed on or near an image surface (not shown) of the imaging lens assembly. The imaging lens assembly includes a light blocking sheet (not shown) and a plurality of lens elements (not numbered). The lens elements include a second lens element 1020 which can be, for example, the second lens element 120 disclosed in the 1st embodiment, but the present disclosure is not limited thereto. The second lens element 1020 has two trimmed edges 1021 and 1022 at an outer diameter position thereof. In this embodiment, the outer diameter position means the outer perimeter of the optically effective area of the second lens element 1020.

FIG. 20 shows a schematic view of LRmin and LRmax of the second lens element in FIG. 19. When twice of a minimum distance from a center to the outer diameter position of the second lens element 1020 is LRmin, and twice of a maximum distance from the center to the outer diameter position of the second lens element 1020 is LRmax, the following conditions are satisfied: LRmin=4.50 [mm]; LRmax=5.40 [mm]; and LRmin/LRmax=0.83.

11th Embodiment

FIG. 21 is a schematic view of a first lens element of an image capturing unit according to the 11th embodiment of the present disclosure. In this embodiment, an image capturing unit 11 includes the imaging lens assembly (not numbered) of the present disclosure, a lens barrel (not shown) and an image sensor (not shown). The imaging lens assembly is disposed in the lens barrel, and the image sensor is disposed on or near an image surface (not shown) of the imaging lens assembly. The imaging lens assembly includes a light blocking sheet (not shown) and a plurality of lens elements (not numbered). The lens elements include a first lens element 1110 which can be, for example, the first lens element 110 disclosed in the 1st embodiment, but the present disclosure is not limited thereto. The first lens element 1110 has four trimmed edges 1111, 1112, 1113 and 1114 at an outer diameter position thereof.

FIG. 22 shows a schematic view of LRmin and LRmax of the first lens element in FIG. 21. When twice of a minimum distance from a center to the outer diameter position of the first lens element 1110 is LRmin, and twice of a maximum distance from the center to the outer diameter position of the first lens element 1110 is LRmax, the following conditions are satisfied: LRmin=4.70 [mm]; LRmax=5.40 [mm]; and LRmin/LRmax=0.87.

12th Embodiment

Figure 23:
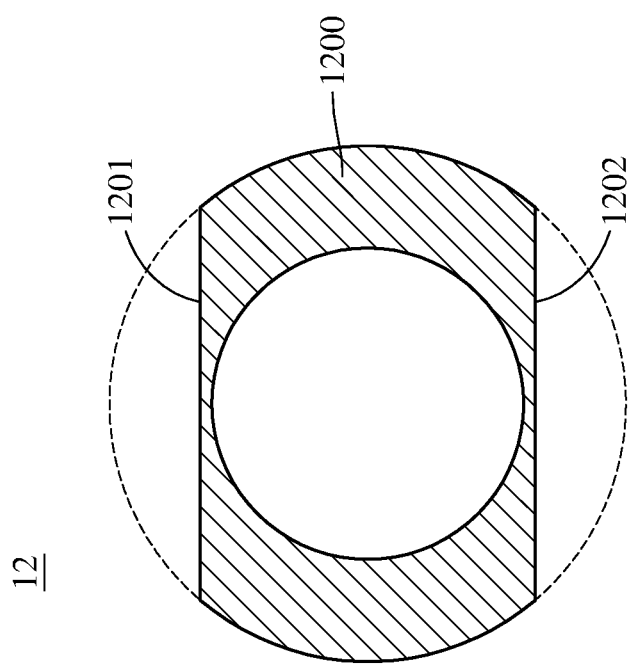
FIG. 23 is a schematic view of a light blocking sheet of an image capturing unit according to the 12th embodiment of the present disclosure.

FIG. 23 is a schematic view of a light blocking sheet of an image capturing unit according to the 12th embodiment of the present disclosure. In this embodiment, an image capturing unit 12 includes the imaging lens assembly (not numbered) of the present disclosure, a lens barrel (not shown) and an image sensor (not shown). The imaging lens assembly is disposed in the lens barrel, and the image sensor is disposed on or near an image surface (not shown) of the imaging lens assembly. The imaging lens assembly includes a light blocking sheet 1200 and a plurality of lens elements (not shown). The light blocking sheet 1200 can be, for example, the aperture stop disclosed in any one of the aforementioned embodiments, but the present disclosure is not limited thereto. The light blocking sheet 1200 has an opening (not numbered) at a central position and has two trimmed edges 1201 and 1202 at an outer diameter position thereof.

13th Embodiment

Figure 24:
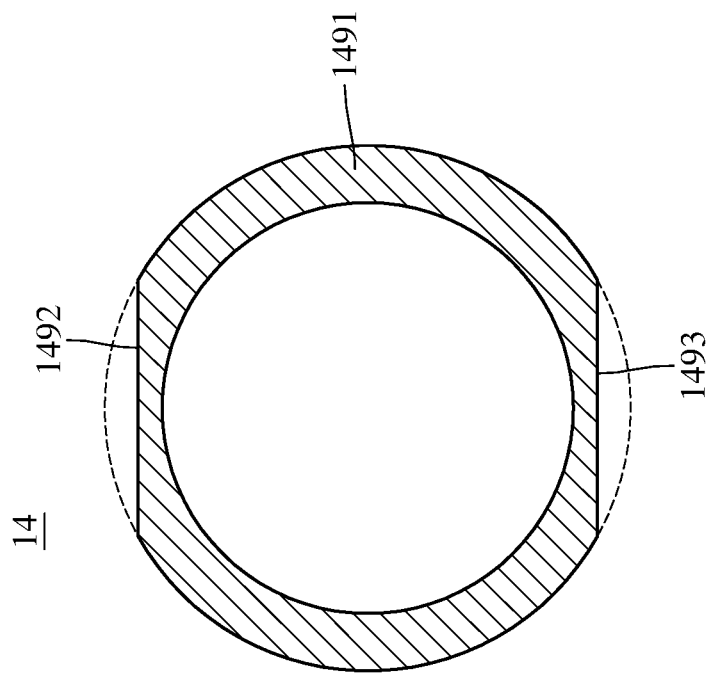
FIG. 24 is a schematic view of a lens barrel of an image capturing unit according to the 13th embodiment of the present disclosure.

FIG. 24 is a schematic view of a lens barrel of an image capturing unit according to the 13th embodiment of the present disclosure. In this embodiment, an image capturing unit 13 includes the imaging lens assembly (not shown) of the present disclosure, a lens barrel 1391 and an image sensor (not shown). The imaging lens assembly is disposed in the lens barrel 1391, and the image sensor is disposed on or near an image surface (not shown) of the imaging lens assembly. The lens barrel 1391 includes a retainer 1396. The lens barrel 1391 has an opening (not numbered) at a central position and has at least two trimmed edges at an outer diameter position thereof. Therefore, it is favorable for reducing one axial dimension of any single lens element so as to further miniaturizing the imaging lens assembly. Specifically, the lens barrel 1391 has two trimmed edges 1392 and 1393.

14th Embodiment

Figure 25:
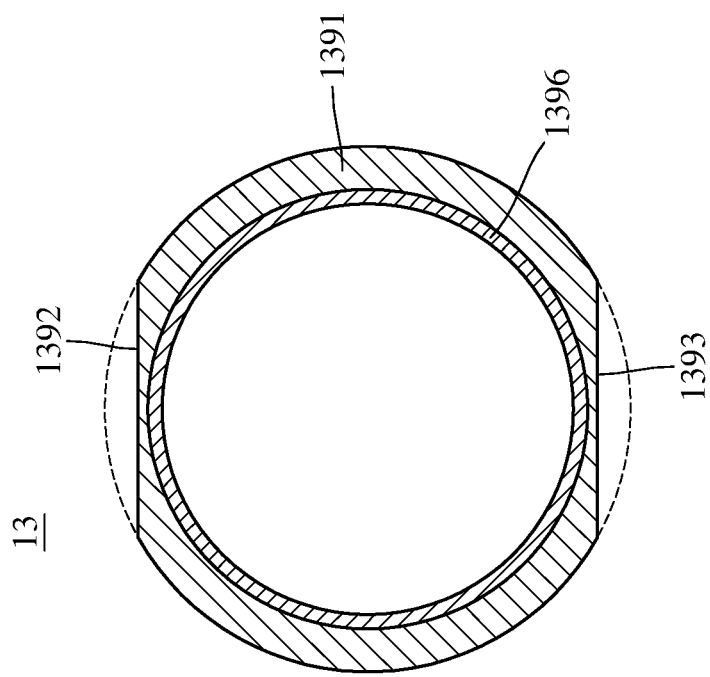
FIG. 25 is a schematic view of a lens barrel of an image capturing unit according to the 14th embodiment of the present disclosure.

FIG. 25 is a schematic view of a lens barrel of an image capturing unit according to the 14th embodiment of the present disclosure. In this embodiment, an image capturing unit 14 includes the imaging lens assembly (not shown) of the present disclosure, a lens barrel 1491 and an image sensor (not shown). The imaging lens assembly is disposed in the lens barrel 1491, and the image sensor is disposed on or near an image surface (not shown) of the imaging lens assembly. The lens barrel 1491 has an opening (not numbered) at a central position and has two trimmed edges 1492 and 1493 at an outer diameter position thereof.

15th Embodiment

Figure 26:
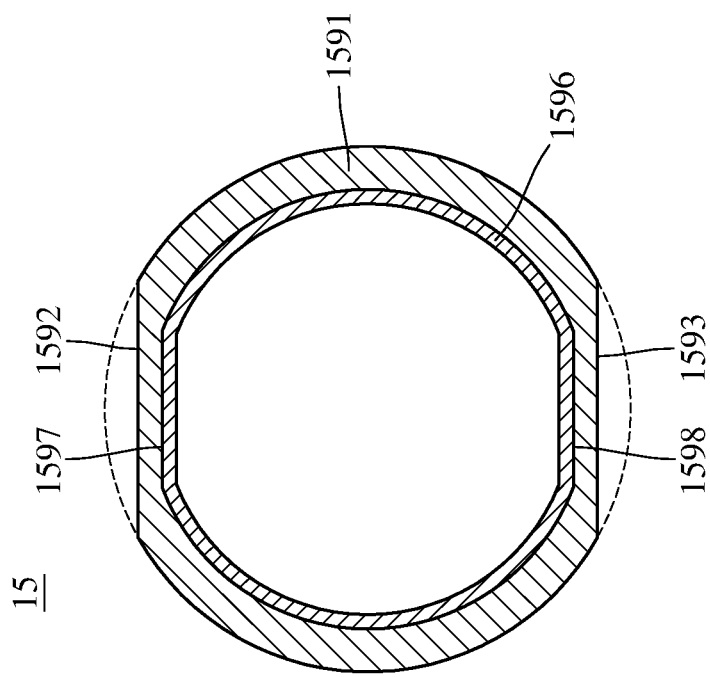
FIG. 26 is a schematic view of a lens barrel of an image capturing unit according to the 15th embodiment of the present disclosure.

FIG. 26 is a schematic view of a lens barrel of an image capturing unit according to the 15th embodiment of the present disclosure. In this embodiment, an image capturing unit 15 includes the imaging lens assembly (not shown) of the present disclosure, a lens barrel 1591 and an image sensor (not shown). The imaging lens assembly is disposed in the lens barrel 1591, and the image sensor is disposed on or near an image surface (not shown) of the imaging lens assembly. The lens barrel 1591 includes a retainer 1596. The lens barrel 1591 has an opening (not numbered) at a central position and has two trimmed edges 1592 and 1593 at an outer diameter position thereof. The retainer 1596 has two trimmed edges 1597 and 1598 at an outer diameter position thereof, and the trimmed edges 1597 and 1598 are respectively corresponding to the trimmed edges 1592 and 1593.

16th Embodiment

Figure 27:
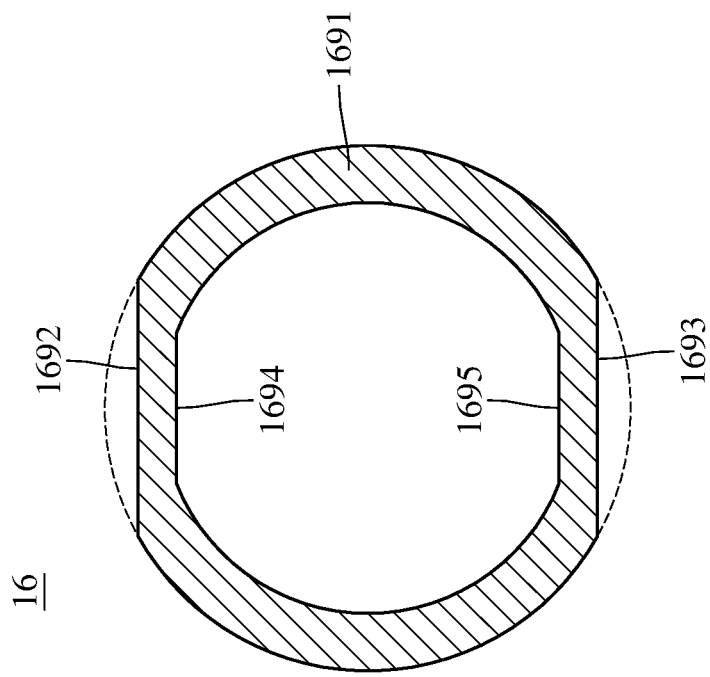
FIG. 27 is a schematic view of a lens barrel of an image capturing unit according to the 16th embodiment of the present disclosure.

FIG. 27 is a schematic view of a lens barrel of an image capturing unit according to the 16th embodiment of the present disclosure. In this embodiment, an image capturing unit 16 includes the imaging lens assembly (not shown) of the present disclosure, a lens barrel 1691 and an image sensor (not shown). The imaging lens assembly is disposed in the lens barrel 1691, and the image sensor is disposed on or near an image surface (not shown) of the imaging lens assembly. The lens barrel 1691 has an opening (not numbered) at a central position, two trimmed edges 1692 and 1693 at an outer diameter position thereof and two trimmed edges 1694 and 1695 at an inner diameter position thereof. In this embodiment, the inner diameter position means the inner perimeter of the optically effective area of the lens barrel 1691.

17th Embodiment

Figure 28:
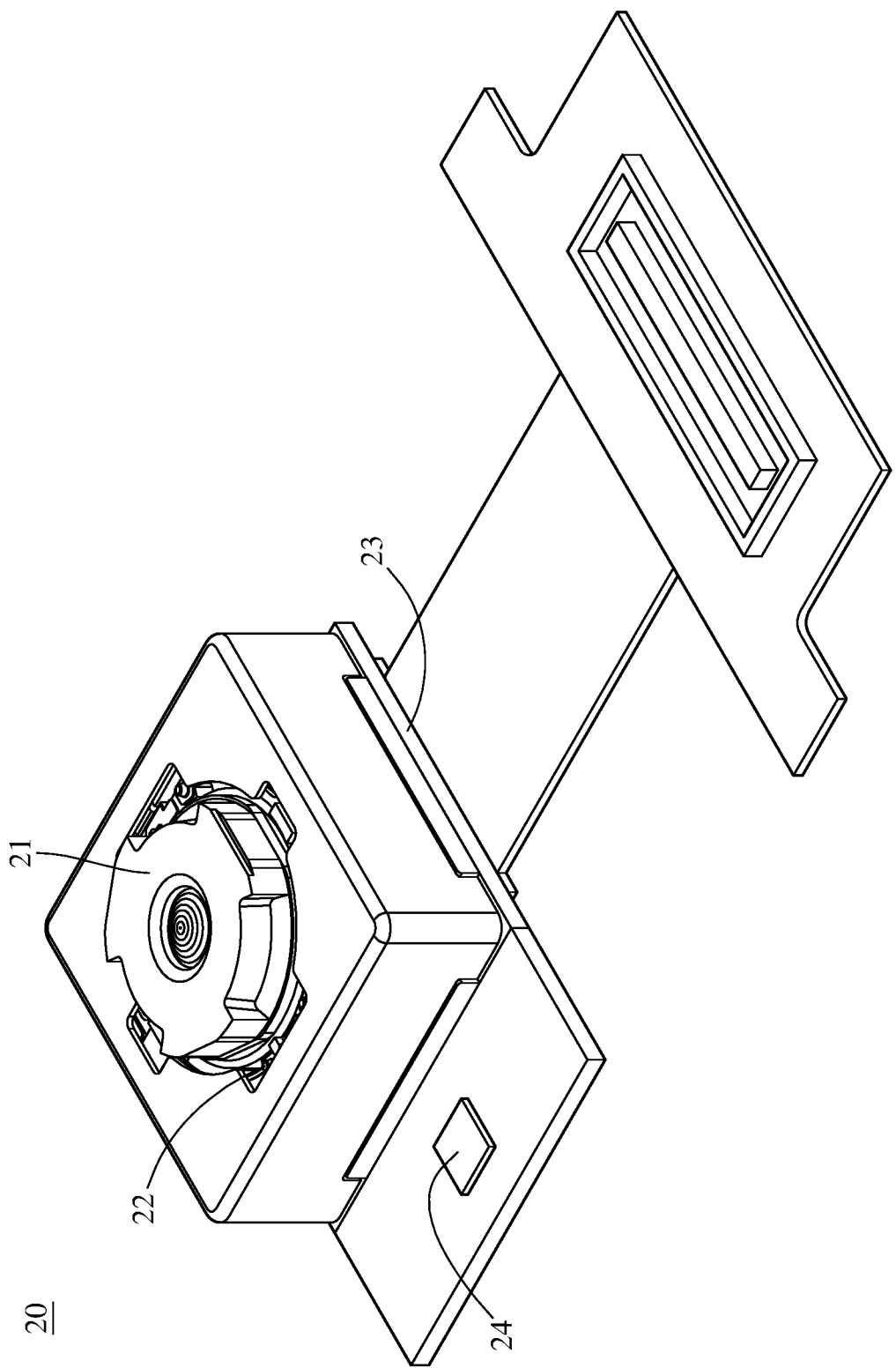
FIG. 28 is a perspective view of an image capturing unit according to the 17th embodiment of the present disclosure.

FIG. 28 is a perspective view of an image capturing unit according to the 17th embodiment of the present disclosure. In this embodiment, an image capturing unit 20 is a camera module including a lens unit 21, a driving device 22, an image sensor 23 and an image stabilizer 24. The lens unit 21 includes the imaging lens assembly disclosed in the 1st embodiment, a lens barrel and a holder member (their reference numerals are omitted) for holding the imaging lens assembly. The imaging light converges in the lens unit 21 of the image capturing unit 20 to generate an image with the driving device 22 utilized for image focusing on the image sensor 23, and the generated image is then digitally transmitted to other electronic component for further processing.

The driving device 22 can have auto focusing functionality, and different driving configurations can be obtained through the usages of voice coil motors (VCM), micro electro-mechanical systems (MEMS), piezoelectric systems, or shape memory alloy materials. The driving device 22 is favorable for obtaining a better imaging position of the lens unit 21, so that a clear image of the imaged object can be captured by the lens unit 21 with different object distances. The image sensor 23 (for example, CCD or CMOS), which can feature high photosensitivity and low noise, is disposed on the image surface of the imaging lens assembly to provide higher image quality.

The image stabilizer 24, such as an accelerometer, a gyro sensor and a Hall Effect sensor, is configured to work with the driving device 22 to provide optical image stabilization (OIS). The driving device 22 working with the image stabilizer 24 is favorable for compensating for pan and tilt of the lens unit 21 to reduce blurring associated with motion during exposure. In some cases, the compensation can be provided by electronic image stabilization (EIS) with image processing software, thereby improving image quality while in motion or low-light conditions.

18th Embodiment

Figure 29:
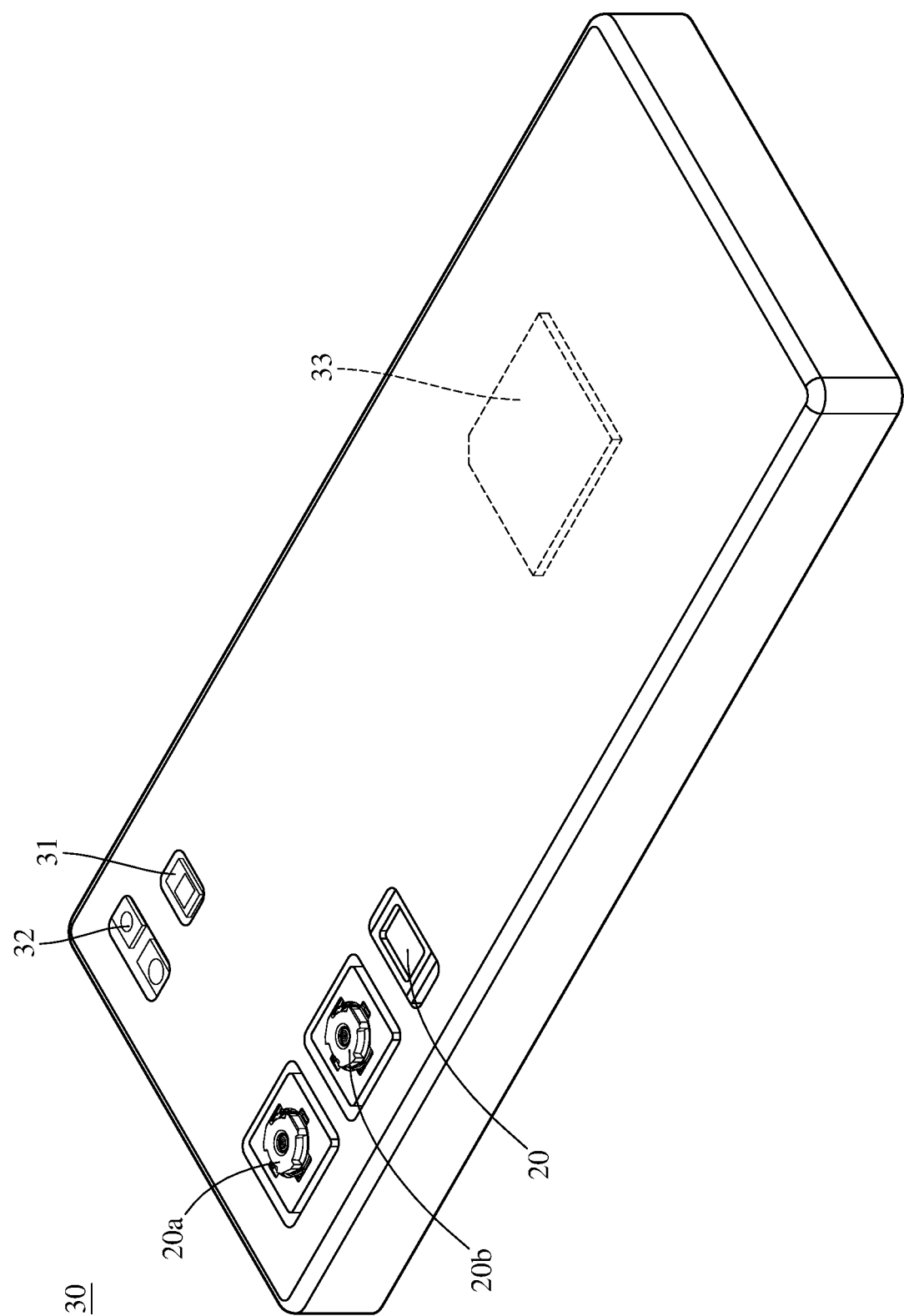
FIG. 29 is one perspective view of an electronic device according to the 18th embodiment of the present disclosure.
Figure 30:
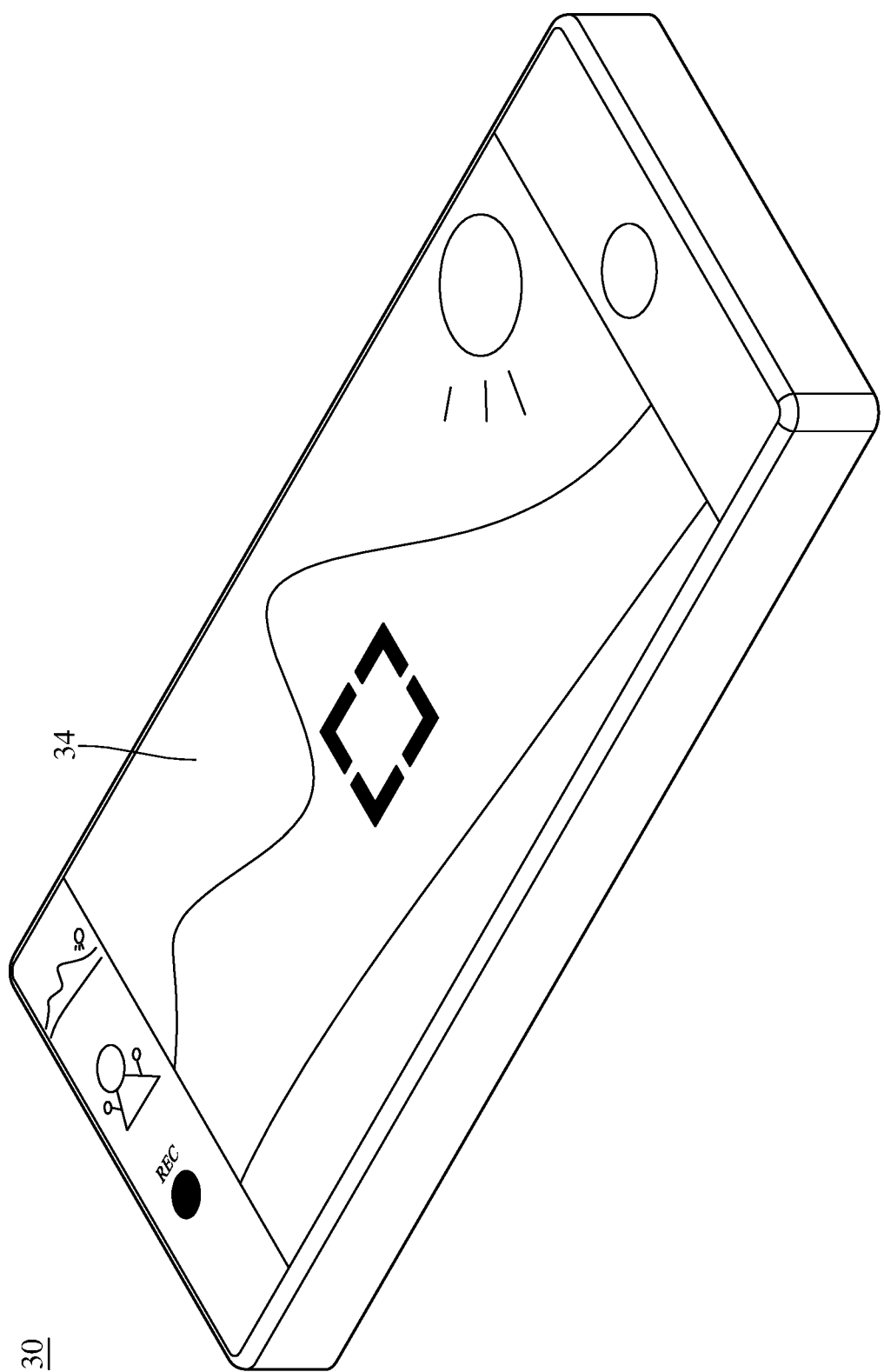
FIG. 30 is another perspective view of the electronic device in FIG. 29.
Figure 31:
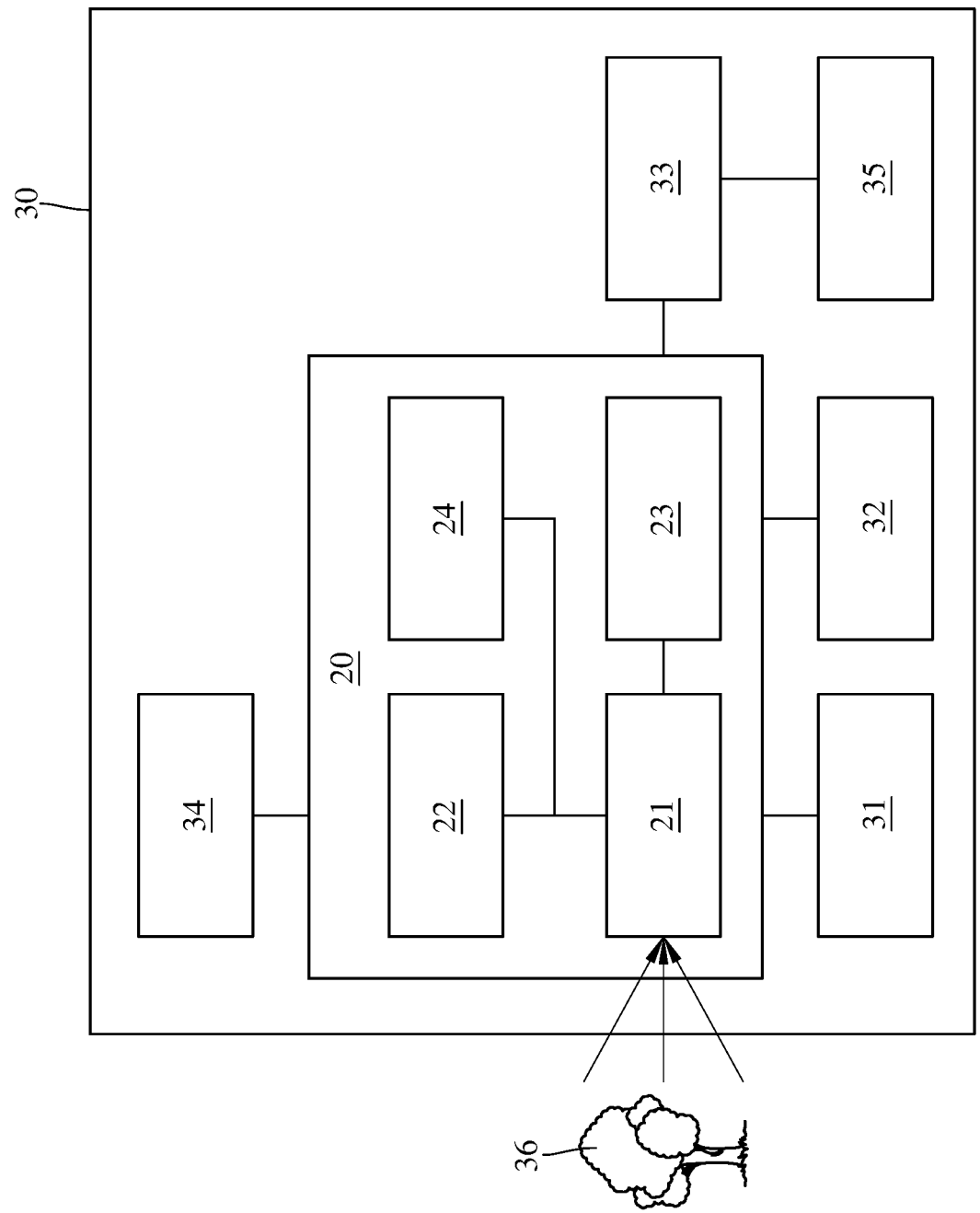
FIG. 31 is a block diagram of the electronic device in FIG. 29.

FIG. 29 is one perspective view of an electronic device according to the 18th embodiment of the present disclosure. FIG. 30 is another perspective view of the electronic device in FIG. 29. FIG. 31 is a block diagram of the electronic device in FIG. 29.

In this embodiment, an electronic device 30 is a smartphone including the image capturing unit 20 disclosed in the 17th embodiment, an image capturing unit 20a, an image capturing unit 20b, a flash module 31, a focus assist module 32, an image signal processor 33, a user interface 34 and an image software processor 35. The image capturing unit 20, the image capturing unit 20a and the image capturing unit 20b all face the same direction, and each of the image capturing units 20, 20a and 20b has a single focal point. Furthermore, the image capturing unit 20a and the image capturing unit 20b all have a configuration similar to that of the image capturing unit 20. In detail, each of the image capturing unit 20a and the image capturing unit 20b includes a lens unit, a driving device, an image sensor and an image stabilizer, and the lens unit includes a lens assembly, a lens barrel and a holder member for holding the lens assembly.

In this embodiment, the image capturing units 20, 20a and 20b have different fields of view. In detail, the image capturing unit 20 is a telephoto image capturing unit, the image capturing unit 20a is a wide-angle image capturing unit, and the image capturing unit 20b is a macro image capturing unit. Each two of the image capturing units 20, 20a and 20b can have maximum fields of view different by at least 15 degrees, and a maximum field of view of the image capturing unit 20 and a maximum field of view of the image capturing unit 20a can differ by at least 50 degrees. Moreover, the maximum field of view of the image capturing unit 20 and the maximum field of view of the image capturing unit 20a can differ by at least 75 degrees. Specifically, the maximum field of view of the image capturing unit 20 is 19.6 degrees, the maximum field of view of the image capturing unit 20a is 120.0 degrees, and a maximum field of view of the image capturing unit 20b is 72.0 degrees. Moreover, the maximum field of view of the image capturing unit 20 and the maximum field of view of the image capturing unit 20a differ by 100.4 degrees, the maximum field of view of the image capturing unit 20 and the maximum field of view of the image capturing unit 20b differ by 52.4 degrees, and the maximum field of view of the image capturing unit 20a and the maximum field of view of the image capturing unit 20b differ by 48.0 degrees. Accordingly, the electronic device 30 has various magnification ratios so as to meet the requirement of optical zoom functionality. In this embodiment, the electronic device 30 includes multiple image capturing units 20, 20a and 20b, but the present disclosure is not limited to the number and arrangement of image capturing units.

When a user captures images of an object 36, the light rays converge in the image capturing unit 20, the image capturing unit 20a or the image capturing unit 20b to generate an image(s), and the flash module 31 is activated for light supplement. The focus assist module 32 detects the object distance of the imaged object 36 to achieve fast auto focusing. The image signal processor 33 is configured to optimize the captured image to improve image quality. The light beam emitted from the focus assist module 32 can be either conventional infrared or laser. The user interface 34 can be a touch screen or a physical button. The user is able to interact with the user interface 34 and the image software processor 35 having multiple functions to capture images and complete image processing. The image processed by the image software processor 35 can be displayed on the user interface 34.

19th Embodiment

Figure 32:
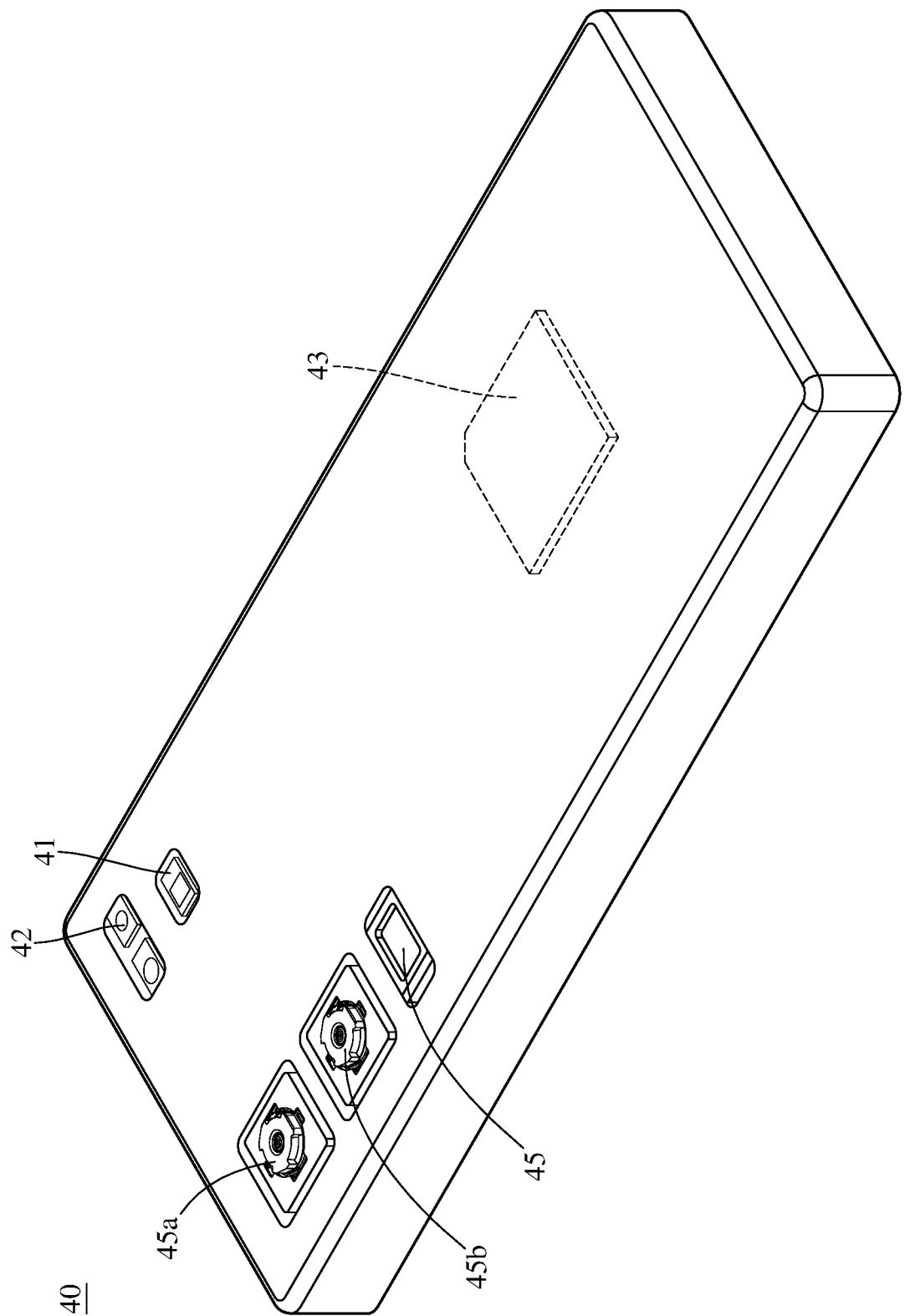
FIG. 32 is a perspective view of an electronic device according to the 19th embodiment of the present disclosure.

FIG. 32 is a perspective view of an electronic device according to the 19th embodiment of the present disclosure.

In this embodiment, an electronic device 40 is a smartphone including an image capturing unit 45, an image capturing unit 45a, an image capturing unit 45b, a flash module 41, a focus assist module 42, an image signal processor 43, a user interface (not shown) and an image software processor (not shown). In this embodiment, the image capturing unit 45, the image capturing unit 45a and the image capturing unit 45b are all camera modules and face the same direction, and each of the image capturing units 45, 45a and 45b has a single focal point. Each of the image capturing unit 45, the image capturing unit 45a and the image capturing unit 45b includes a lens unit, a driving device, an image sensor and an image stabilizer. The lens unit of the image capturing unit 45 includes the imaging lens assembly disclosed in the 8th embodiment, a lens barrel and a holder member for holding the imaging lens assembly. The lens units of the image capturing unit 45a and 45b each include a lens assembly, a lens barrel and a holder member for holding the lens assembly.

In this embodiment, the image capturing units 45, 45a and 45b have different fields of view. Specifically, the image capturing unit 45 is a telephoto image capturing unit and have a maximum field of view being 24.8 degrees, the image capturing unit 45a is a wide-angle image capturing unit and have a maximum field of view being 90.0 degrees, and the image capturing unit 45b is a macro image capturing unit and have a maximum field of view being 65.0 degrees. Moreover, the maximum field of view of the image capturing unit 45 and the maximum field of view of the image capturing unit 45a differ by 65.2 degrees, the maximum field of view of the image capturing unit 45 and the maximum field of view of the image capturing unit 45b differ by 40.2 degrees, and the maximum field of view of the image capturing unit 45a and the maximum field of view of the image capturing unit 45b differ by 25.0 degrees. Accordingly, the electronic device 40 has various magnification ratios so as to meet the requirement of optical zoom functionality. In this embodiment, the electronic device 40 includes multiple image capturing units 45, 45a and 45b, but the present disclosure is not limited to the number and arrangement of image capturing units.

The smartphone in this embodiment is only exemplary for showing the image capturing units 20 and 45 installed in an electronic device, and the present disclosure is not limited thereto. The image capturing units 20 and 45 can be optionally applied to systems with a movable focus. Furthermore, the image capturing units 20 and 45 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising a total of six lens elements, and the six lens elements being, in order from an object side to an image side, a first lens element, a second lens element, a third lens element, a fourth lens element, a fifth lens element and a sixth lens element;
   wherein the first lens element with positive refractive power has an object-side surface being convex in a paraxial region thereof;
   wherein an axial distance between the object-side surface of the first lens element and an image-side surface of the sixth lens element is Td, an axial distance between the image-side surface of the sixth lens element and an image surface is BL, a focal length of the first lens element is f1, a focal length of the fifth lens element is f5, a focal length of the sixth lens element is f6, a sum of central thicknesses of all lens elements of the imaging lens assembly is ΣCT, a central thickness of the first lens element is CT1, an axial distance between the third lens element and the fourth lens element is T34, an axial distance between the fourth lens element and the fifth lens element is T45, an axial distance between the fifth lens element and the sixth lens element is T56, and the following conditions are satisfied:

$0.50 < Td/BL < 1.40$;

$|f1|/|f5| + |f1/f6| < 1.40$;

$1.0 < \Sigma CT/CT1 < 2.90$; and $0.60 < (T34+T56)/T45 < 10$.

2. The imaging lens assembly of claim 1, wherein the third lens element has positive refractive power.

3. The imaging lens assembly of claim 1, wherein the axial distance between the object-side surface of the first lens element and the image-side surface of the sixth lens element is Td, the axial distance between the image-side surface of the sixth lens element and the image surface is BL, and the following condition is satisfied:

$0.60 < Td/BL < 1.20$.

4. The imaging lens assembly of claim 1, wherein the focal length of the first lens element is f1, the focal length of the fifth lens element is f5, the focal length of the sixth lens element is f6, and the following condition is satisfied:

$$|f1/f5|+|f1/f6|<1.0.$$

5. The imaging lens assembly of claim 1, wherein the central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and the following conditions are satisfied:

$$1.0<CT1/CT2;$$

$$1.0<CT1/CT3;$$

$$1.0<CT1/CT4;$$

$$1.0<CT1/CT5; \text{ and}$$

$$1.0<CT1/CT6.$$

6. The imaging lens assembly of claim 1, wherein at least one lens element is made of glass material, and at least one lens surface of at least one lens element is spherical.

7. The imaging lens assembly of claim 6, wherein the third lens element is made of glass material.

8. The imaging lens assembly of claim 7, wherein an axial distance between an object-side surface of the third lens element and the image-side surface of the sixth lens element is Dr5r12, the axial distance between the object-side surface of the first lens element and the image-side surface of the sixth lens element is Td, and the following condition is satisfied:

$$0.40<Dr5r12/Td<0.70.$$

9. The imaging lens assembly of claim 6, wherein the fourth lens element is made of glass material.

10. The imaging lens assembly of claim 9, wherein an axial distance between an object-side surface of the fourth lens element and the image-side surface of the sixth lens element is Dr7r12, the axial distance between the object-side surface of the first lens element and the image-side surface of the sixth lens element is Td, and the following condition is satisfied:

$$0.30<Dr7r12/Td<0.60.$$

11. The imaging lens assembly of claim 1, wherein the second lens element with negative refractive power has an object-side surface being convex in a paraxial region thereof and an image-side surface being concave in a paraxial region thereof.

12. The imaging lens assembly of claim 1, wherein an axial distance between the object-side surface of the first lens element and the image surface is TL, a focal length of the imaging lens assembly is f, and the following condition is satisfied:

$$0.60<TL/f\leq1.0.$$

13. The imaging lens assembly of claim 1, wherein the second lens element has an object-side surface being convex in a paraxial region thereof, and the object-side surface of the second lens element has at least one concave critical point in an off-axis region thereof.

14. The imaging lens assembly of claim 1, wherein the axial distance between the image-side surface of the sixth lens element and the image surface is BL, a sum of axial distances between each of all adjacent lens elements of the imaging lens assembly is ΣAT, and the following condition is satisfied:

$$3.0<BL/\Sigma AT.$$

15. The imaging lens assembly of claim 1, wherein the focal length of the first lens element is f1, a focal length of the fourth lens element is f4, and the following condition is satisfied:

$$|f1/f4|<1.35.$$

16. The imaging lens assembly of claim 1, wherein an Abbe number of the second lens element is V2, an Abbe number of the fifth lens element is V5, an f-number of the imaging lens assembly is Fno, and the following conditions are satisfied:

$$20<V2+V5<50; \text{ and}$$

$$2.0<Fno<4.50.$$

17. The imaging lens assembly of claim 1, wherein a maximum value among refractive indices of all lens elements of the imaging lens assembly is Nmax, a minimum value among Abbe numbers of all lens elements of the imaging lens assembly is Vmin, and the following conditions are satisfied:

$$N\max<1.75; \text{ and}$$

$$V\min<24.$$

18. The imaging lens assembly of claim 1, wherein a maximum effective radius of the object-side surface of the first lens element is Y11, a maximum effective radius of an image-side surface of the first lens element is Y12, a maximum effective radius of an object-side surface of the second lens element is Y21, a maximum effective radius of an image-side surface of the second lens element is Y22, a maximum effective radius of an object-side surface of the third lens element is Y31, a maximum effective radius of an image-side surface of the third lens element is Y32, a maximum effective radius of an object-side surface of the fourth lens element is Y41, a maximum effective radius of an image-side surface of the fourth lens element is Y42, a maximum effective radius of an object-side surface of the fifth lens element is Y51, a maximum effective radius of an image-side surface of the fifth lens element is Y52, a maximum effective radius of an object-side surface of the sixth lens element is Y61, a maximum effective radius of the image-side surface of the sixth lens element is Y62, and the following conditions are satisfied:

$$1.0<Y11/Y12;$$

$$1.0<Y11/Y21;$$

$$1.0<Y11/Y22;$$

$$1.0<Y11/Y31;$$

$$1.0<Y11/Y32;$$

$$1.0<Y11/Y41;$$

$$1.0<Y11/Y42;$$

$$1.0<Y11/Y51;$$

$$1.0<Y11/Y52;$$

$$1.0<Y11/Y61; \text{ and}$$

$$1.0<Y11/Y62.$$

19. The imaging lens assembly of claim 1, wherein a focal length of the imaging lens assembly is f, the focal length of the first lens element is f1, a focal length of the second lens element is f2, a focal length of the third lens element is f3, a focal length of the fourth lens element is f4, the focal length of the fifth lens element is f5, the focal length of the sixth lens element is f6, and the following condition is satisfied:

$8.0 < |f/f1| + |f/f2| + |f/f3| + |f/f4| + |f/f5| + |f/f6|$.

20. The imaging lens assembly of claim 1, wherein at least one lens element has at least two trimmed edges at an outer diameter position thereof.

21. The imaging lens assembly of claim 20, wherein twice of a minimum distance from a center to the outer diameter position of the at least one lens element is LRmin, twice of a maximum distance from the center to the outer diameter position of the at least one lens element is LRmax, and the following condition is satisfied:

$LRmin/LRmax < 0.90$.

22. The imaging lens assembly of claim 20, wherein each of at least two lens elements has at least two trimmed edges at the outer diameter position thereof.

23. The imaging lens assembly of claim 1, further comprising a reflector.

24. The imaging lens assembly of claim 23, wherein the reflector is disposed on the object side of the first lens element.

25. An image capturing unit, comprising:
the imaging lens assembly of claim 1; and
an image sensor disposed on the image surface of the imaging lens assembly.

26. An electronic device, comprising at least three image capturing units which face in a same direction and comprise the image capturing unit of claim 25, wherein maximum fields of view of the at least three image capturing units are different from one another, and a largest value and a smallest value of the maximum fields of view of the at least three image capturing units differ by at least 50 degrees.

27. An imaging lens assembly comprising a total of six lens elements, and the six lens elements being, in order from an object side to an image side, a first lens element, a second lens element, a third lens element, a fourth lens element, a fifth lens element and a sixth lens element;
wherein the first lens element with positive refractive power has an object-side surface being convex in a paraxial region thereof, the third lens element has positive refractive power, and there is at least one inflection point among the fourth lens element, the fifth lens element and the sixth lens element;
wherein an axial distance between the object-side surface of the first lens element and an image-side surface of the sixth lens element is Td, an axial distance between the image-side surface of the sixth lens element and an image surface is BL, a focal length of the first lens element is f1, a focal length of the fifth lens element is f5, a focal length of the sixth lens element is f6, a sum of central thicknesses of all lens elements of the imaging lens assembly is ΣCT, a central thickness of the first lens element is CT1, and the following conditions are satisfied:

$0.50 < Td/BL < 1.40$;

$|f1/f5| + |f1/f6| < 1.35$; and $1.0 < \Sigma CT/CT1 < 2.90$.

28. The imaging lens assembly of claim 27, wherein the central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and the following conditions are satisfied:

$1.0 < CT1/CT2$;

$1.0 < CT1/CT3$;

$1.0 < CT1/CT4$;

$1.0 < CT1/CT5$; and $1.0 < CT1/CT6$.

29. The imaging lens assembly of claim 27, wherein the axial distance between the image-side surface of the sixth lens element and the image surface is BL, a sum of axial distances between each of all adjacent lens elements of the imaging lens assembly is ΣAT, and the following condition is satisfied:

$3.0 < BL/\Sigma AT$.

30. The imaging lens assembly of claim 27, wherein an f-number of the imaging lens assembly is Fno, and the following condition is satisfied:

$2.0 < Fno < 4.50$.

31. The imaging lens assembly of claim 27, wherein a maximum effective radius of the object-side surface of the first lens element is Y11, a maximum effective radius of the image-side surface of the sixth lens element is Y62, an axial distance between the object-side surface of the first lens element and the image surface is TL, and the following conditions are satisfied:

$1.0 < Y11/Y62$;

$Y11 < 3.0$ [mm]; and $8$ [mm] $< TL < 20$ [mm].

32. The imaging lens assembly of claim 27, wherein the focal length of the first lens element is f1, the focal length of the fifth lens element is f5, the focal length of the sixth lens element is f6, and the following condition is satisfied:

$|f1/f5| + |f1/f6| < 1.0$.

33. The imaging lens assembly of claim 27, wherein at least one lens element is made of glass material, and at least one lens surface of at least one lens element is spherical.

34. The imaging lens assembly of claim 27, wherein the sum of central thicknesses of all lens elements of the imaging lens assembly is ΣCT, the central thickness of the first lens element is CT1, and the following condition is satisfied:

$1.25 < \Sigma CT/CT1 < 2.50$.

35. The imaging lens assembly of claim 27, wherein an axial distance between the object-side surface of the first lens element and the image surface is TL, a focal length of the imaging lens assembly is f, and the following condition is satisfied:

$0.60 < TL/f \leq 1.0$;

wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the i-th lens element is Ni, and at least one lens element of the imaging lens assembly satisfies the following condition:

$5 < Vi/Ni < 11.8$, wherein $i=1,2,3,4,5$, or 6.

36. The imaging lens assembly of claim 27, wherein the second lens element has an object-side surface being convex in a paraxial region thereof, and the object-side surface of the second lens element has at least one concave critical point in an off-axis region thereof.

37. The imaging lens assembly of claim 27, wherein there is at least one critical point in an off-axis region among the fourth lens element, the fifth lens element and the sixth lens element.

38. The imaging lens assembly of claim 27, wherein a focal length of the imaging lens assembly is f, the focal length of the first lens element is f1, a focal length of the second lens element is f2, a focal length of the third lens element is f3, a focal length of the fourth lens element is f4, the focal length of the fifth lens element is f5, the focal length of the sixth lens element is f6, and the following condition is satisfied:

$8.0 < |f/f1| + |f/f2| + |f/f3| + |f/f4| + |f/f5| + |f/f6|$.

39. An image capturing unit, comprising:
the imaging lens assembly of claim 27; and
an image sensor disposed on the image surface of the imaging lens assembly.

40. An electronic device, comprising at least three image capturing units which face in a same direction and comprise the image capturing unit of claim 39, wherein maximum fields of view of the at least three image capturing units are different from one another, and a largest value and a smallest value of the maximum fields of view of the at least three image capturing units differ by at least 50 degrees.

* * * * *